United States Patent
Stolte et al.

(10) Patent No.: US 10,353,922 B1
(45) Date of Patent: Jul. 16, 2019

(54) RENDERING MULTIDIMENSIONAL CUBE DATA

(75) Inventors: Ryan G. Stolte, New York, NY (US); Firas S. Rifai, San Francisco, CA (US)

(73) Assignee: BAY DYNAMICS, INC., New York, NY (US)

( * ) Notice: Subject to any disclaimer, the term of this patent is extended or adjusted under 35 U.S.C. 154(b) by 0 days.

(21) Appl. No.: 13/269,561

(22) Filed: Oct. 8, 2011

(51) Int. Cl.
  G06F 17/30 (2006.01)
  G06F 16/28 (2019.01)

(52) U.S. Cl.
  CPC .................. *G06F 16/283* (2019.01)

(58) Field of Classification Search
  USPC ........................................ 707/602
  See application file for complete search history.

(56) References Cited

U.S. PATENT DOCUMENTS

| | | | |
|---|---|---|---|
| 5,596,502 A | 1/1997 | Koski et al. |
| 6,134,541 A | 10/2000 | Castelli et al. |
| 6,477,536 B1 | 11/2002 | Pasumansky et al. |
| 6,581,068 B1 | 6/2003 | Bensoussan et al. |
| 6,707,454 B1 | 3/2004 | Barg et al. |
| 6,763,357 B1 | 7/2004 | Deshpande et al. |
| 6,775,675 B1 | 8/2004 | Nwabueze et al. |
| 6,877,006 B1 | 4/2005 | Vasudevan |
| 7,139,778 B2 | 11/2006 | Chaudhuri et al. |
| 7,181,440 B2 | 2/2007 | Cras et al. |
| 7,284,011 B1 | 10/2007 | Narayanaswamy et al. |
| 7,571,192 B2 | 8/2009 | Gupta et al. |
| 7,593,969 B2 | 9/2009 | Berger et al. |
| 7,664,777 B2 | 2/2010 | Cras et al. |
| 7,693,860 B2 | 4/2010 | Babanov et al. |
| 7,756,822 B2 | 7/2010 | Danner et al. |
| 7,774,303 B2 | 8/2010 | Shoup et al. |
| 8,170,981 B1 | 5/2012 | Tewksbary |
| 8,364,724 B2 | 1/2013 | Stolte et al. |
| 8,661,432 B2 | 2/2014 | Kriebel et al. |
| 8,799,207 B1 | 8/2014 | Stolte et al. |
| 8,799,209 B2 | 8/2014 | Bakalash et al. |
| 8,909,680 B1 | 12/2014 | Stolte et al. |
| 8,965,836 B1 | 2/2015 | Stolte et al. |
| 9,081,830 B1 | 7/2015 | Stolte et al. |
| 9,171,055 B1 | 10/2015 | Stolte et al. |
| 9,183,269 B1 | 11/2015 | Stolte et al. |
| 9,330,091 B1 | 5/2016 | Stolte et al. |
| 9,390,082 B1 | 7/2016 | Stolte et al. |
| 2001/0047353 A1 | 11/2001 | Talib et al. |
| 2002/0029207 A1 | 3/2002 | Bakalash et al. |
| 2002/0126545 A1 | 9/2002 | Warren et al. |
| 2002/0129003 A1 | 9/2002 | Bakalash et al. |

(Continued)

OTHER PUBLICATIONS

U.S. Appl. No. 13/269,559, filed Oct. 8, 2011, Stolte, Ryan G., et al.

(Continued)

*Primary Examiner* — Arpan P. Savla
*Assistant Examiner* — Bao Tran
(74) *Attorney, Agent, or Firm* — Adeli LLP

(57) ABSTRACT

Some embodiments provide a cube viewer that renders a view for a cube stored in a multidimensional data storage (MDDS). The cube viewer separately stores cube data and the presentation data that relates to the presentation of the cube. The cube viewer uses the separated cube and presentation data to generate the view of the cube.

29 Claims, 43 Drawing Sheets

(56) References Cited

U.S. PATENT DOCUMENTS

| | | | |
|---|---|---|---|
| 2002/0149604 A1 | 10/2002 | Wilkinson | |
| 2002/0169799 A1 | 11/2002 | Voshell | |
| 2003/0074631 A1* | 4/2003 | Minemoto | G06F 8/34 715/201 |
| 2003/0088540 A1 | 5/2003 | Edmunds et al. | |
| 2004/0006574 A1 | 1/2004 | Witkowski et al. | |
| 2004/0034616 A1 | 2/2004 | Witkowski et al. | |
| 2004/0205045 A1 | 10/2004 | Chen et al. | |
| 2004/0215626 A1 | 10/2004 | Colossi et al. | |
| 2005/0131924 A1 | 6/2005 | Jones | |
| 2005/0149550 A1 | 7/2005 | Berger et al. | |
| 2005/0228803 A1 | 10/2005 | Farmer et al. | |
| 2005/0262087 A1 | 11/2005 | Wu et al. | |
| 2005/0267868 A1* | 12/2005 | Liebl | G06F 17/30554 |
| 2006/0010058 A1 | 1/2006 | D'Hers et al. | |
| 2006/0010139 A1 | 1/2006 | Netz et al. | |
| 2006/0020619 A1 | 1/2006 | Netz et al. | |
| 2006/0020921 A1 | 1/2006 | Pasumansky et al. | |
| 2006/0033738 A1 | 2/2006 | Wilkinson | |
| 2006/0085742 A1* | 4/2006 | Harold | G06F 17/30557 715/249 |
| 2006/0116859 A1 | 6/2006 | Legault et al. | |
| 2006/0184518 A1 | 8/2006 | Petculescu et al. | |
| 2006/0200448 A1 | 9/2006 | Edmunds et al. | |
| 2006/0259509 A1* | 11/2006 | Stolte et al. | 707/102 |
| 2006/0271841 A1 | 11/2006 | Thanu et al. | |
| 2007/0022120 A1 | 1/2007 | Huang et al. | |
| 2007/0130116 A1 | 6/2007 | Cras et al. | |
| 2008/0196108 A1* | 8/2008 | Dent | G06F 17/30592 726/28 |
| 2008/0288448 A1 | 11/2008 | Agredano et al. | |
| 2008/0301086 A1 | 12/2008 | Gupta | |
| 2009/0043788 A1 | 2/2009 | Averbuch et al. | |
| 2009/0144313 A1 | 6/2009 | Hodge et al. | |
| 2010/0082524 A1 | 4/2010 | Barber | |
| 2010/0145984 A1* | 6/2010 | Palaniappan | G06F 17/30572 707/769 |
| 2010/0185581 A1 | 7/2010 | Bakalash et al. | |
| 2010/0250412 A1 | 9/2010 | Wagner | |
| 2011/0066457 A1 | 3/2011 | Chang et al. | |
| 2011/0153548 A1 | 6/2011 | Varghese et al. | |
| 2011/0173224 A1 | 7/2011 | Toledo et al. | |
| 2012/0066174 A1 | 3/2012 | Vasudevan | |
| 2013/0041915 A1 | 2/2013 | Meiniel et al. | |
| 2013/0054510 A1* | 2/2013 | Beaumont | G06F 17/30592 707/601 |
| 2014/0304823 A1* | 10/2014 | Landwehr, Jr. | H04L 63/10 726/26 |

OTHER PUBLICATIONS

U.S. Appl. No. 13/269,560, filed Oct. 8, 2011, Stolte, Ryan G., et al.
U.S. Appl. No. 13/269,562, filed Oct. 8, 2011, Stolte, Ryan G., et al.
U.S. Appl. No. 13/269,563, filed Oct. 8, 2011, Stolte, Ryan G., et al.
Portions of prosecution history of U.S. Appl. No. 13/269,559, Nov. 9, 2012, Stolte, Ryan G. et al.
Portions of prosecution history of U.S. Appl. No. 13/269,560, Nov. 21, 2012, Stolte, Ryan G., et al.
Updated portions of prosecution history of U.S. Appl. No. 13/269,560, Sep. 24, 2013, Stolte, Ryan G., et al.
Updated portions of prosecution history of U.S. Appl. No. 13/269,562, Aug. 21, 2013, Stolte, Ryan G., et al.
Updated portions of prosecution history of U.S. Appl. No. 13/269,559, Feb. 11, 2013, Stolte, Ryan G., et al.
Updated portions of prosecution history of U.S. Appl. No. 13/269,560, Feb. 21, 2013, Stolte, Ryan G., et al.
Portions of prosecution history of U.S. Appl. No. 13/269,562, Feb. 27, 2013, Stolte, Ryan G., et al.
Updated portions of prosecution history of U.S. Appl. No. 13/269,559, May 17, 2013, Stolte, Ryan G., et al.
Updated portions of prosecution history of U.S. Appl. No. 13/269,560, May 24, 2013, Stolte, Ryan G., et al.
Updated portions of prosecution history of U.S. Appl. No. 13/269,562, May 24, 2013, Stolte, Ryan G., et al.
Updated portions of prosecution history of U.S. Appl. No. 13/269,559, Aug. 29, 2014, Stolte, Ryan G., et al.
Updated portions of prosecution history of U.S. Appl. No. 13/269,560, Oct. 14, 2014, Stolte, Ryan G., et al.
Updated portions of prosecution history of U.S. Appl. No. 13/269,563, Aug. 11, 2014, Stolte, Ryan, G., et al.
Updated portions of prosecution history of U.S. Appl. No. 13/269,559, Jan. 6, 2014, Stolte, Ryan G., et al.
Updated portions of prosecution history of U.S. Appl. No. 13/269,560, Oct. 28, 2014, Stolte, Ryan G., et al.
Updated portions of prosecution history of U.S. Appl. No. 13/269,562, Dec. 16, 2014, Stolte, Ryan G., et al.
Updated portions of prosecution history of U.S. Appl. No. 13/269,563, Dec. 19, 2014, Stolte, Ryan, G., et al.
Updated portions of prosecution history of U.S. Appl. No. 13/269,559, May 9, 2014, Stolte, Ryan G., et al.
Updated portions of prosecution history of U.S. Appl. No. 13/269,562, Jul. 17, 2014, Stolte, Ryan G., et al.
Portions of prosecution history of U.S. Appl. No. 13/269,563, Jul. 17, 2014, Stolte, Ryan, G., et al.
Rainardi, Vincent, "Chapter 12: Multidimensional Database," Building a Data Warehouse: With Examples in SQL Server, Month Unknown, 2008, 36 pages, APRESS, New York, USA.
Updated portions of prosecution history of U.S. Appl. No. 13/269,559, Aug. 6, 2015, Stolte, Ryan G., et al,
Updated portions of prosecution history of U.S. Appl. No. 13/269,562, Jun. 12, 2015, Stolte, Ryan G., et al.
Updated portions of prosecution history of U.S. Appl. No. 13/269,563, May 7, 2015, Stolte, Ryan G., et al.
Non-Published commonly Owned U.S. Appl. No. 13/269,567, filed Oct. 8, 2011, 170 pages, Bay Dynamics, Inc.
Non-Published commonly Owned U.S. Appl. No. 15/089,260, filed Apr. 1, 2016, 164 pages, Bay Dynamics, Inc.
Non-Published commonly Owned U.S. Appl. No. 15/178,239, filed Jun. 9, 2016, 116 pages, Bay Dynamics, Inc.

* cited by examiner

| Computer - System Role | | ⊟ Server | | | | ⊟ x64-based PC | | | Total | | ⊟ Workstation | | Total | |
|---|---|---|---|---|---|---|---|---|---|---|---|---|---|---|
| Computer - System Type | | x64-based PC | | | | X86-based PC | | | | | | | | |
| Computer - Manufacturer | Computer - Model | Computer Count | Program Count | Computer Count | Program Count | Computer Count | Program Count | Computer Count | Program Count | Computer Count | Program Count | Computer Count | Program Count | |
| ⊟ (Blank) | | | | | | | | | | | | | 202 | 202 |
| ⊟ Dell Computer Corporation | | 6 | 609 | 4 | 398 | | | 10 | 1507 | 1 | | 10 | 1507 | |
| ⊟ Dell Inc. | ⊞ Latitude D630 | | | | | | | | | 6 | 251 | 6 | 251 | |
| | ⊞ Latitude E4300 | | | | | | | | | 3 | 651 | 3 | 651 | |
| | ⊞ Latitude E4310 | | | | | | | | | 4 | 691 | 4 | 691 | |
| | ⊞ Latitude Z600 | | | | | | | | | 1 | 109 | 1 | 109 | |
| | ⊞ OptiPlex 740 | | | 2 | 421 | | | 2 | 421 | | | 2 | 421 | |
| | ⊞ PowerEdge 2950 | 1 | 166 | | | | | 1 | 166 | | | 1 | 166 | |
| | ⊞ PowerEdge M610 | 10 | 743 | | | | | 10 | 743 | | | 10 | 743 | |
| | ⊞ PowerEdge R210 | 1 | 15 | | | | | 1 | 15 | | | 1 | 15 | |
| | ⊞ PowerEdge SC440 | 4 | 435 | 5 | 1018 | | | 9 | 1453 | | | 9 | 1453 | |
| | ⊞ PowerEdge T100 | 5 | 816 | 4 | 925 | | | 9 | 1741 | | | 9 | 1741 | |
| | ⊞ PowerEdge T300 | 2 | 122 | | | | | 2 | 122 | | | 2 | 122 | |
| | ⊞ Precision M4400 | | | | | | | | | 3 | 631 | 3 | 631 | |
| | ⊞ Precision M4500 | 1 | 76 | | | | | 1 | 76 | 3 | 776 | 4 | 852 | |
| | ⊞ Precision M6500 | | | | | | | | | 1 | 347 | 1 | 347 | |
| | Total | 24 | 2373 | 11 | 2364 | | | 35 | 4737 | 21 | 3456 | 56 | 8193 | |
| ⊟ Dell Inc | | | | 2 | 236 | | | 2 | 236 | | | 2 | 236 | |
| ⊟ FUJITSU | | | | | | | | | | 1 | 13 | 1 | 13 | |
| ⊟ Hewlett-Packard | | | | 2 | 450 | | | 2 | 450 | | | 2 | 450 | |
| ⊟ Iomega | | | | 1 | 221 | | | 1 | 221 | | | 1 | 221 | |
| ⊟ VMware, Inc. | | 9 | 659 | 15 | 1672 | | | 24 | 2331 | | | 24 | 2331 | |
| Total | | 39 | 3641 | 35 | 5341 | | | 74 | 9482 | 23 | 3671 | 97 | 13153 | |

```
1400
  ↘
1405
        ┌─────────────────────────────────────────────────────────────────┐
1410 ─── │ - <Cube>                                                         │
         │     <Name>SCCM Windows Computers</Name>                          │
         │     <ID>SCCM Windows Computers</ID>                              │
         │     <CreatedTimestamp>2011-06-09T17:08:01.716667</CreatedTimestamp> │
         │     <LastSchemaUpdate>2011-06-14T23:09:26.626667</LastSchemaUpdate> │
         │     <LastProcessed>2011-06-09T17:17:21.696667</LastProcessed>    │
         │     <State>Processed</State>                                     │
         │     <Language>1033</Language>                                    │
         │     <Collation>Latin1_General_CI_AS</Collation>                  │
         │     <Visible>true</Visible>                                      │
         │     <StorageMode>Molap</StorageMode>                             │
         │     <ProcessingMode>Regular</ProcessingMode>                     │
         │     <ProcessingPriority>0</ProcessingPriority>                   │
         │     <ScriptCacheProcessingMode>Regular</ScriptCacheProcessingMode> │
         │     <ScriptErrorHandlingMode>IgnoreNone</ScriptErrorHandlingMode> │
         │   + <ErrorConfiguration></ErrorConfiguration>                    │
         │     <EstimatedRows>0</EstimatedRows>                             │
         │   + <Source xsi:type="DataSourceViewBinding"></Source>           │
1420 ─── │   + <ProactiveCaching></ProactiveCaching>                        │
1422 ─── │   - <Dimensions>                                                 │
         │     - <Dimension>                                                │
1423 ─── │         <ID>SCCM Computer</ID>                                   │
1425 ─── │         <Name>Computer</Name>                                    │
         │         <DimensionID>SCCM Computer</DimensionID>                 │
         │         <Visible>true</Visible>                                  │
         │         <HierarchyUniqueNameStyle>IncludeDimensionName</HierarchyUniqueNameStyle> │
         │         <MemberUniqueNameStyle>Native</MemberUniqueNameStyle>    │
1426 ─── │         <AllMemberAggregationUsage>Default</AllMemberAggregationUsage> │
         │       - <Attributes>                                             │
         │         + <Attribute></Attribute>                                │
         │         + <Attribute Hierarchy="[Computer].[Computer - Current Time Zone]"></Attribute> │
         │         + <Attribute Hierarchy="[Computer].[Computer - Domain]"></Attribute> │
         │         + <Attribute Hierarchy="[Computer].[Computer - System Role]"></Attribute> │
         │         + <Attribute Hierarchy="[Computer].[Computer - Manufacturer]"></Attribute> │
1428 ─── │         + <Attribute Hierarchy="[Computer].[Computer - Model]"></Attribute> │
         │         + <Attribute Hierarchy="[Computer].[Computer - Name]"></Attribute> │
         │         + <Attribute Hierarchy="[Computer].[Computer - Number Of Processors]"></Attribute> │
         │         + <Attribute Hierarchy="[Computer].[Computer - Status]"></Attribute> │
         │         + <Attribute Hierarchy="[Computer].[Computer - System Type]"></Attribute> │
         │         + <Attribute Hierarchy="[Computer].[Computer - User Name]"></Attribute> │
         │         + <Attribute Hierarchy="[Computer].[Computer - Windows Update Agent Version]"></Attribute> │
         │         </Attributes>                                            │
1430 ─── │         <Hierarchies/>                                           │
         │       </Dimension>                                               │
1440 ─── │     + <Dimension></Dimension>                                    │
         │     </Dimensions>                                                │
1450 ─── │   + <Kpis></Kpis>                                                │
         │   + <MeasureGroups></MeasureGroups>                              │
         │   </Cube>                                                        │
         └─────────────────────────────────────────────────────────────────┘
```

*Figure 14*

```
1500
      <Axes>
1530  + <Axis Name="Axis0"></Axis>
1532  - <Axis Name="Axis1">
1610    - <Hierarchy Name="[Computer].[Computer - Manufacturer]" AllMembersLoaded="False">
          <Member Name="[Computer].[Computer - Manufacturer].[All]" Filter="None" Caption="All" Level="0"/>
        + <Member Name="[Computer].[Computer - Manufacturer].&[]" Filter="None" Caption="(Blank)" Level="1"></Member>
        + <Member Name="[Computer].[Computer - Manufacturer].&[Dell Computer Corporation]" Filter="None" Caption="Dell Computer Corporation" Level="1"></Member>
        + <Member Name="[Computer].[Computer - Manufacturer].&[Dell Inc]" Filter="None" Caption="Dell Inc" Level="1"></Member>
1620      <Member Name="[Computer].[Computer - Manufacturer].&[Dell Inc.]" Filter="None" Caption="Dell Inc." Level="1">
            <InstanceMembers MemberName="[Computer].[Computer - Manufacturer].&[Dell Inc.]" Expanded="false" Instance Loaded="false">
            </Instance>
          </Member>
        + <Member Name="[Computer].[Computer - Manufacturer].&[FUJITSU]" Filter="None" Caption="FUJITSU" Level="1"></Member>
        + <Member Name="[Computer].[Computer - Manufacturer].&[Hewlett-Packard]" Filter="None" Caption="Hewlett-Packard" Level="1"></Member>
        + <Member Name="[Computer].[Computer - Manufacturer].&[Iomega]" Filter="None" Caption="Iomega" Level="1"></Member>
        + <Member Name="[Computer].[Computer - Manufacturer].&[VMware, Inc.]" Filter="None" Caption="VMware, Inc." Level="1"></Member>
        </Hierarchy>
        <Hierarchy Name="[Computer].[Computer - Model]" AllMembersLoaded="False"/>
        <Hierarchy Name="[Computer].[Computer - Name]" AllMembersLoaded="False"/>
      </Axis>
1540  - <Axis Name="Axis2">
1542    - <Hierarchy Name="[Computer].[Computer - System Role]" AllMembersLoaded="False">
1630        <Member Name="[Computer].[Computer - System Role].[All]" Filter="None" Caption="All" Level="0"/>
1635      + <Member Name="[Computer].[Computer - System Role].&[Server]" Filter="None" Caption="Server" Level="1">
            <InstanceMembers MemberName="[Computer].[Computer - System Role].&[Server]" Expanded="false" Instance Loaded="false">
            </Instance>
          </Member>
1640    + <Member Name="[Computer].[Computer - System Role].&[Workstation]" Filter="None" Caption="Workstation" Level="1"></Member>
        </Hierarchy>
        <Hierarchy Name="[Computer].[Computer - System Type]" AllMembersLoaded="False"/>
      </Axis>
      + <Axis Name="SlicerAxis"></Axis>
      </Axes>
```

```
<Axes>
+ <Axis Name="Axis0"></Axis>
- <Axis Name="Axis1">
  + <Hierarchy Name="[Computer].[Computer - Manufacturer]" AllMembersLoaded="False"></Hierarchy>
  + <Hierarchy Name="[Computer].[Computer - Model]" AllMembersLoaded="False"></Hierarchy>
    <Hierarchy Name="[Computer].[Computer - Name]" AllMembersLoaded="False"/>
  </Axis>
- <Axis Name="Axis2">
  - <Hierarchy Name="[Computer].[Computer - System Role]" AllMembersLoaded="False">
      <Member Name="[Computer].[Computer - System Role].[All]" Filter="None" Caption="All" Level="0"/>
    - <Member Name="[Computer].[Computer - System Role].&[Server]" Filter="None" Caption="Server" Level="1">
      - <InstanceMembers Loaded="true" Expanded="true">
          <Instance MemberName="[Computer].[Computer - System Role].&[Server]"/>
        </Instance>
      </Member>
    + <Member Name="[Computer].[Computer - System Role].&[Workstation]" Filter="None" Caption="Workstation" Level="1"></Member>
    </Hierarchy>
  - <Hierarchy Name="[Computer].[Computer - System Type]" AllMembersLoaded="False">
      <Member Name="[Computer].[Computer - System Type].[All]" Filter="None" Caption="All" Level="0"/>
    + <Member Name="[Computer].[Computer - System Type].&[x64-based PC]" Filter="None" Caption="x64-based PC" Level="1"></Member>
    + <Member Name="[Computer].[Computer - System Type].&[X86-based PC]" Filter="None" Caption="X86-based PC" Level="1"></Member>
    </Hierarchy>
  </Axis>
+ <Axis Name="SlicerAxis"></Axis>
</Axes>
```

*Figure 18*

```
- <Axes>
+ <Axis Name="Axis0"></Axis>
- <Axis Name="Axis1">
+ <Hierarchy Name="[Computer].[Computer - Manufacturer]" AllMembersLoaded="False"></Hierarchy>
- <Hierarchy Name="[Computer].[Computer - Model]" AllMembersLoaded="False">
    <Member Name="[Computer].[Computer - Model].[All]" Filter="None" Caption="All" Level="0"/>
+   <Member Name="[Computer].[Computer - Model].&[Latitude D630]" Filter="None" Caption="Latitude D630" Level="1"></Member>
+   <Member Name="[Computer].[Computer - Model].&[Latitude E4300]" Filter="None" Caption="Latitude E4300" Level="1"></Member>
+   <Member Name="[Computer].[Computer - Model].&[Latitude E4310]" Filter="None" Caption="Latitude E4310" Level="1"></Member>
+   <Member Name="[Computer].[Computer - Model].&[Latitude Z600]" Filter="None" Caption="Latitude Z600" Level="1"></Member>
+   <Member Name="[Computer].[Computer - Model].&[OptiPlex 740]" Filter="None" Caption="OptiPlex 740" Level="1"></Member>
+   <Member Name="[Computer].[Computer - Model].&[PowerEdge 2950]" Filter="None" Caption="PowerEdge 2950" Level="1"></Member>
+   <Member Name="[Computer].[Computer - Model].&[PowerEdge M610]" Filter="None" Caption="PowerEdge M610" Level="1"></Member>
+   <Member Name="[Computer].[Computer - Model].&[PowerEdge R210]" Filter="None" Caption="PowerEdge R210" Level="1"></Member>
-   <Member Name="[Computer].[Computer - Model].&[PowerEdge SC440]" Filter="None" Caption="PowerEdge SC440" Level="1">
-     <Instance Loaded="true" Expanded="true">
      <InstanceMembers MemberName="[Computer].[Computer - Model].&[PowerEdge SC440]">
        <Instance Name="[Computer].[Computer - Manufacturer].&[Dell Inc.]"/>
      </InstanceMembers>
    </Instance>
  </Member>
- <Hierarchy Name="[Computer].[Computer - Name]" AllMembersLoaded="False">
    <Member Name="[Computer].[Computer - Name].[All]" Filter="None" Caption="All" Level="0"/>
+   <Member Name="[Computer].[Computer - Name].&[SVSFAPP009]" Filter="None" Caption="SVSFAPP009" Level="1"></Member>
+   <Member Name="[Computer].[Computer - Name].&[SVSFDLP004]" Filter="None" Caption="SVSFDLP004" Level="1"></Member>
+   <Member Name="[Computer].[Computer - Name].&[SVSFDS001]" Filter="None" Caption="SVSFDS001" Level="1"></Member>
+   <Member Name="[Computer].[Computer - Name].&[SVSFITA001]" Filter="None" Caption="SVSFITA001" Level="1"></Member>
+   <Member Name="[Computer].[Computer - Name].&[SVSFITA002]" Filter="None" Caption="SVSFITA002" Level="1"></Member>
+   <Member Name="[Computer].[Computer - Name].&[SVSFNS004]" Filter="None" Caption="SVSFNS004" Level="1"></Member>
+   <Member Name="[Computer].[Computer - Name].&[SVSFNS006]" Filter="None" Caption="SVSFNS006" Level="1"></Member>
+   <Member Name="[Computer].[Computer - Name].&[SVSFSEP001]" Filter="None" Caption="SVSFSEP001" Level="1"></Member>
+   <Member Name="[Computer].[Computer - Name].&[SVSFSP001]" Filter="None" Caption="SVSFSP001" Level="1"></Member>
  </Hierarchy>
</Axis>
+ <Axis Name="Axis2"></Axis>
+ <Axis Name="SlicerAxis"></Axis>
</Axes>
```

2010
+ <Cell Value="236"></Cell>
+ <Cell Value="56"></Cell>
+ <Cell Value="8193"></Cell>
− <Cell Value="35">
   <Member Name="[Computer].[Computer - Manufacturer].&[Dell Inc.]"/>
   <Member Name="[Computer].[Computer - System Role].&[Server]"/>
   <Member Name="[Measures].[Computer Count]"/>

2020
</Cell>
− <Cell Value="4737">
   <Member Name="[Computer].[Computer - Manufacturer].&[Dell Inc.]"/>
   <Member Name="[Computer].[Computer - System Role].&[Server]"/>
   <Member Name="[Measures].[Program Count]"/>

2030
</Cell>
− <Cell Value="21">
   <Member Name="[Computer].[Computer - Manufacturer].&[Dell Inc.]"/>
   <Member Name="[Computer].[Computer - System Role].&[Workstation]"/>
   <Member Name="[Measures].[Computer Count]"/>

2040
</Cell>
− <Cell Value="3456">
   <Member Name="[Computer].[Computer - Manufacturer].&[Dell Inc.]"/>
   <Member Name="[Computer].[Computer - System Role].&[Workstation]"/>
   <Member Name="[Measures].[Program Count]"/>
</Cell>
+ <Cell Value="1"></Cell>
+ <Cell Value="13"></Cell>

*Figure 20*

```
+ <Cell Value="9"></Cell>
+ <Cell Value="1453"></Cell>
- <Cell Value="9">
    <Member Name="[Computer].[Computer - Manufacturer].&[Dell Inc.]"/>
    <Member Name="[Computer].[Computer - Model].&[PowerEdge SC440]"/>
    <Member Name="[Computer].[Computer - System Role].&[Server]"/>
    <Member Name="[Measures].[Computer Count]"/>
  </Cell>
- <Cell Value="1453">
    <Member Name="[Computer].[Computer - Manufacturer].&[Dell Inc.]"/>
    <Member Name="[Computer].[Computer - Model].&[PowerEdge SC440]"/>
    <Member Name="[Computer].[Computer - System Role].&[Server]"/>
    <Member Name="[Measures].[Program Count]"/>
  </Cell>
+ <Cell Value="9"></Cell>
+ <Cell Value="1741"></Cell>
```

*Figure 21*

```
2000
   ↘
         + <Cell Value="15"></Cell>
2210     + <Cell Value="4"></Cell>
         - <Cell Value="435">
             <Member Name="[Computer].[Computer - Manufacturer].&[Dell Inc.]"/>
             <Member Name="[Computer].[Computer - Model].&[PowerEdge SC440]"/>
             <Member Name="[Computer].[Computer - System Role].&[Server]"/>
             <Member Name="[Computer].[Computer - System Type].&[x64-based PC]"/>
             <Member Name="[Measures].[Program Count]"/>
           </Cell>
         + <Cell Value="5"></Cell>
         + <Cell Value="816"></Cell>
         + <Cell Value="2"></Cell>
         + <Cell Value="122"></Cell>
         + <Cell Value="1"></Cell>
         + <Cell Value="76"></Cell>
         + <Cell Value="2"></Cell>
2220     + <Cell Value="421"></Cell>
         - <Cell Value="5">
             <Member Name="[Computer].[Computer - Manufacturer].&[Dell Inc.]"/>
             <Member Name="[Computer].[Computer - Model].&[PowerEdge SC440]"/>
             <Member Name="[Computer].[Computer - System Role].&[Server]"/>
             <Member Name="[Computer].[Computer - System Type].&[X86-based PC]"/>
             <Member Name="[Measures].[Computer Count]"/>
           </Cell>
         + <Cell Value="1018"></Cell>
         + <Cell Value="4"></Cell>
```

*Figure 22*

```
3100
 ↓
3110  -<root>
3120    +<xs:schema targetNamespace="urn:schemas-microsoft-com:xml-analysis:mddataset" elementFormDefault="qualified"></xs:schema>
3125    +<OlapInfo></OlapInfo>
3130    -<Axes>
3132      +<Axis name="Axis0"></Axis>
3135      -<Axis name="Axis1">
3138        -<Tuples>
              -<Tuple>
                -<Member Hierarchy="[Computer].[Computer - System Type]">
                   <UName>[Computer].[Computer - System Type].[All]</UName>
                   <Caption>All</Caption>
                   <LName>[Computer].[Computer - System Type].[(All)]</LName>
                   <LNum>0</LNum>
                   <DisplayInfo>3</DisplayInfo>
3140             </Member>
                -<Member Hierarchy="[Computer].[Computer - Manufacturer]">
                   <UName>[Computer].[Computer - Manufacturer].[All]</UName>
                   <Caption>All</Caption>
                   <LName>[Computer].[Computer - Manufacturer].[(All)]</LName>
                   <LNum>0</LNum>
                   <DisplayInfo>65545</DisplayInfo>
3142             </Member>
                -<Member Hierarchy="[Computer].[Computer - System Role]">
                   <UName>[Computer].[Computer - System Role].&[Server]</UName>
                   <Caption>Server</Caption>
                  +<LName></LName>
                   <LNum>1</LNum>
                   <DisplayInfo>0</DisplayInfo>
                 </Member>
               </Tuple>
             </Tuples>
3145       </Axis>
3150     +<Axis name="SlicerAxis"></Axis>
3152   </Axes>
       -<CellData>
         -<Cell CellOrdinal="0">
            <Value xsi:type="xsd:int">74</Value>
            <FmtValue>74</FmtValue>
3156      </Cell>
         -<Cell CellOrdinal="1">
            <Value xsi:type="xsd:int">9482</Value>
            <FmtValue>9482</FmtValue>
          </Cell>
       </CellData>
     </root>
```

*Figure 31*

RENDERING MULTIDIMENSIONAL CUBE DATA

BACKGROUND

Online analytical processing (OLAP) is an approach that allows users to view multidimensional data from different points of view. Typical applications of OLAP include financial reporting, management reporting, budgeting and forecasting, business reporting, and marketing.

The core of any OLAP system is an OLAP cube, which is a data structure that allows data to be manipulated and analyzed from different perspectives. OLAP cubes contain values (e.g., numeric values) called measures that are categorized by dimensions. A dimension is typically a set of data attributes (e.g., customer, product, date). The purpose of the dimension is to categorize each item in a data set into non-overlapping regions. This provides the means to "slice and dice" cube data in many different ways. In some cases, each dimension has one or more attributes, and may have one or more hierarchies applied to it. An attribute is a descriptive element that may have one or more predefined values. For example, a dimension for "date" may have an attribute for "Month" with values including "January", "February", "March", etc. A hierarchy is a series of parent-child relationships, where a parent member usually represents the consolidation of the members that are its children. For example, a dimension for "date" can have several alternative hierarchies such as "Day:Month:Year", "Day:Week:Year", "Day:Month:Quarter:Year", etc.

FIG. 1 shows a high-level component diagram of a typical OLAP cube browsing system 100. The cube browsing system 100 includes a data retriever 120, a cube viewer 130, and an OLAP cube database 110. As shown, the cube browsing system 100 retrieves cube data from the cube database 110 and displays the retrieved data. Specifically, the cube viewer 130 sends a cube data request 150 to the data retriever 120. Based on the data request 150, the data retriever 120 queries the cube database 110 using a Multi-Dimensional eXpressions (MDX) query 140. In response to the query, the cube database 110 returns a MDX query result set 135. The data retriever 120 then sends the cube data 145 to the cube viewer 130 based on the MDX result set 135. Having received the cube data 145, the cube viewer 130 renders a cube view 160 on a display. These operations are repeated each time an end-user requests additional cube data.

There are several shortcomings with the system described above. For example, each time an end-user performs an action that requires a change to the displayed data, one or more queries will be performed against the cube database. It will request the cube database to provide the same data multiple times for the same end-user during the cube browsing experience, and require a complete re-rendering of the cube data each time a request is made. In a network environment, these frequent round trips to the multidimensional database server for large sets of data may add burden to the multidimensional database server and negatively affect the performance of the cube browsing system and the end-user experience.

BRIEF SUMMARY

Some embodiments of the invention provide a novel multidimensional data storage (MDDS) cube viewer that efficiently retrieves and presents different views of an MDDS cube. In some embodiments, the cube viewer (1) separately stores the cube data and the presentation data that relates to the presentation of the cube, and (2) uses the separated cube and presentation data to generate one or more cube views. When it receives a request to modify a cube view (e.g., through a user's request or action), the viewer quickly examines the stored presentation data to identify any part of the presentation data that it needs to update the cube view. When part of the presentation data needs to be updated, the viewer uses the identified part of the presentation data to formulate a customized query to the MDDS to retrieve additional cube data and/or presentation data. The viewer then updates the displayed cube view or renders a new cube view based on the newly retrieved data and at times based on the previously retrieved data. In some embodiments, the viewer receives metadata along with the new cube data in response to a query, and uses the newly retrieved metadata to modify the presentation data that it stores.

To efficiently provide a cube view, the viewer of some embodiments performs novel intelligent caching and querying operations. In performing these operations, the viewer identifies cube data that is cached and retrieves, based on the identification, any other cube data that is not already cached. In some embodiments, the customized query that is formulated by the viewer is based on the data that is not available in the cache. The intelligent caching and querying features are particularly useful in a network environment as the same cube data does not have to be downloaded repeatedly. In other words, by checking the cache, the viewer can assess whether a change in a cube view, or a change from one cube view to another cube view, requires new cube data to be queried from the MDDS, and can forego a query to the MDDS when the cube data is available in the cube cache.

The viewer of some embodiments stores the presentation data in a cube configuration storage structure (e.g., a cube axes configuration file), while it stores the cube data in a cube data storage structure (e.g., a cube data file). In some of these embodiments, the viewer derives the cube configuration structure from a cube definition structure, which specifies several entities (measures, dimensions, etc.) that define the cube. The configuration structure in some embodiments stores (1) a subset of the entities that are specified in the cube definition and (2) the relationships between these entities. The entities in this subset are the entities that are selected (e.g., by a user or by a user's actions) from the cube definition to identify a portion of the cube for viewing. In some embodiments, the cube configuration structure is an axes configuration structure as it specifies one or more axes that define the relationships between a subset of entities from the cube definition. For instance, the axes configuration structure can specify a first axis that identifies a set of measures or other numeric cube entities for a cube view, a second axis that identifies a set of dimension attributes as row attributes of the cube view, and a third axis that identifies another set of dimension attributes as column attributes of the cube view.

In some embodiments, the viewer uses the subset of entities in the cube configuration structure to formulate queries for retrieving cube data and associated metadata from the MDDS cube. Also, in some embodiments, the viewer uses the combination of the cube data structure, the cube configuration structure and the cube definition structure to generate one or more views of the cube for concurrent or selective display. The different views provide different perspectives of the cube data set. In addition, the cube configuration of some embodiments is dynamically updated based on the metadata that is retrieved from the MDDS in response to a query.

Separating the cube content data and the cube presentation data into separate storage structures (e.g., into respectively the cube data structure and axes configuration structure) also allows the viewer of some embodiments to intelligently render only those regions in a cube view that change in each particular instance (e.g., in response to a received user interaction with the cube view). For example, when the cube view is expanded to display additional cube data, the viewer of some embodiments redraws only the region of the presentation that shows the additional cube data and not the entire presentation. This is because by using the axes configuration the viewer can identify the affected portion of the presentation, retrieve cube data for this affected portion from the cache or MDDS, and redraw only this affected portion in the displayed cube view.

Alternatively, or conjunctively with this intelligent rendering operation, the viewer of some embodiments can generate more than one cube view each time it receives new cube and presentation data from the MDDS, and can quickly switch between these cube views at different instances in time (e.g., in response to different user interactions). For instance, in some embodiments, the viewer presents one cube view as an interactive presentation (e.g., an interactive matrix) that a user can manipulate to interactively obtain a particular perspective of the underlying cube data. In conjunction with the interactive presentation, the viewer of some embodiments generates other cube views (such as charts (e.g., pie charts, bar charts), graphs, tables, lists, etc.) and displays these other cube views in response to interactions with the interactive presentation. For example, one or more graphs or charts may be displayed upon a user selecting (e.g., clicking on a cursor, moving the cursor over, etc.) a member or cell of the interactive presentation. By pre-generating these other cube views, the viewer can quickly display them as needed when the user interacts with the interactive presentation. Also, in some embodiments, the viewer can simultaneously display different cube views that provide different perspectives of the same segment of a cube, or provide different views of different segments of the cube. In some embodiments, one or more of the cube views is not presented in a user interface but is used as a part of a larger system. For instance, the cube view can be used to interchange data, be a part of a scheduled task, etc.

In some embodiments, the viewer is implemented as a stand-alone cube-browsing client application, while in other embodiments it is integrated into another application. For instance, the cube-browsing client of some embodiments is provided as a plug-in component for a web browser, while in other embodiments the client might be implemented as its own program within an operating system. Furthermore, in some embodiments, the cube-browsing client is a component of a server-based solution. In some such embodiments, the cube-browsing client is provided via a thin client. In a thin client solution, some or all of the logic and/or processing is performed on a server while a user interacts with a client application via a separate client machine connected to the server. In some embodiments, the cube-browsing client accesses a cube database through a network using one or more middleware components (e.g., Web services, application servers).

In some embodiments, the cub-browsing client can operate offline by using the above-described cube definition, cube configuration, cube data structures. Specifically, in these embodiments, the cube-browsing client does not need to access a cube database containing the cube to generate a cube view. For example, the cube-browsing client can use previously cached cube data from the cube database and generate different cube views according to the cube definition and the cube configuration. One advantage of such a client is that it allows a user to continue to browse cube data even when there is no connection (e.g., a network connection) to communicate with a cube database.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 12 shows the interactive matrix after a member expand operation is initiated on a column member.

FIG. 13 shows the interactive matrix after a member expand operation is initiated on a second level row member.

FIG. 14 illustrates an example of a cube definition according to some embodiments.

FIG. 16 shows the cube axes configuration after the cube-browsing client has retrieved cube data and updated the cube axes configuration.

FIG. 17 shows the cube axes configuration after a member on a first axis is expanded.

FIG. 18 shows the cube axes configuration after a member on a second axis is expanded.

FIG. 19 shows the cube axes configuration after a member of a hierarchy of the first axis is expanded.

FIG. 20 shows an example format of a cube cache file.

FIG. 21 shows the cube cache file after a member on the first axis is expanded.

FIG. 22 shows the cube cache file after a member on the second axis is expanded.

FIG. 31 shows an example format of a query result set.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide a novel multidimensional data storage (MDDS) cube viewer that efficiently retrieves and presents different views of an MDDS cube (e.g., OLAP cube). In some embodiments, the cube viewer (1) separately stores the cube data and the presentation data that relates to the presentation of the cube, and (2) uses the separated cube and presentation data to generate one or more cube views. When it receives a request to modify a cube view (e.g., through a user's request or action), the viewer quickly examines the stored presentation data to identify any part of the presentation data that it needs to update the cube view. When part of the presentation data needs to be updated, the viewer uses the identified part of the presentation data to formulate a customized query to the MDDS to retrieve additional cube data and/or presentation data. The viewer then updates the displayed cube view or renders a new cube view based on the newly retrieved data and at times based on the previously retrieved data. In some embodiments, the viewer receives metadata along with the new cube data in response to a query, and uses the newly retrieved metadata to modify the presentation data that it stores.

Figure 1:
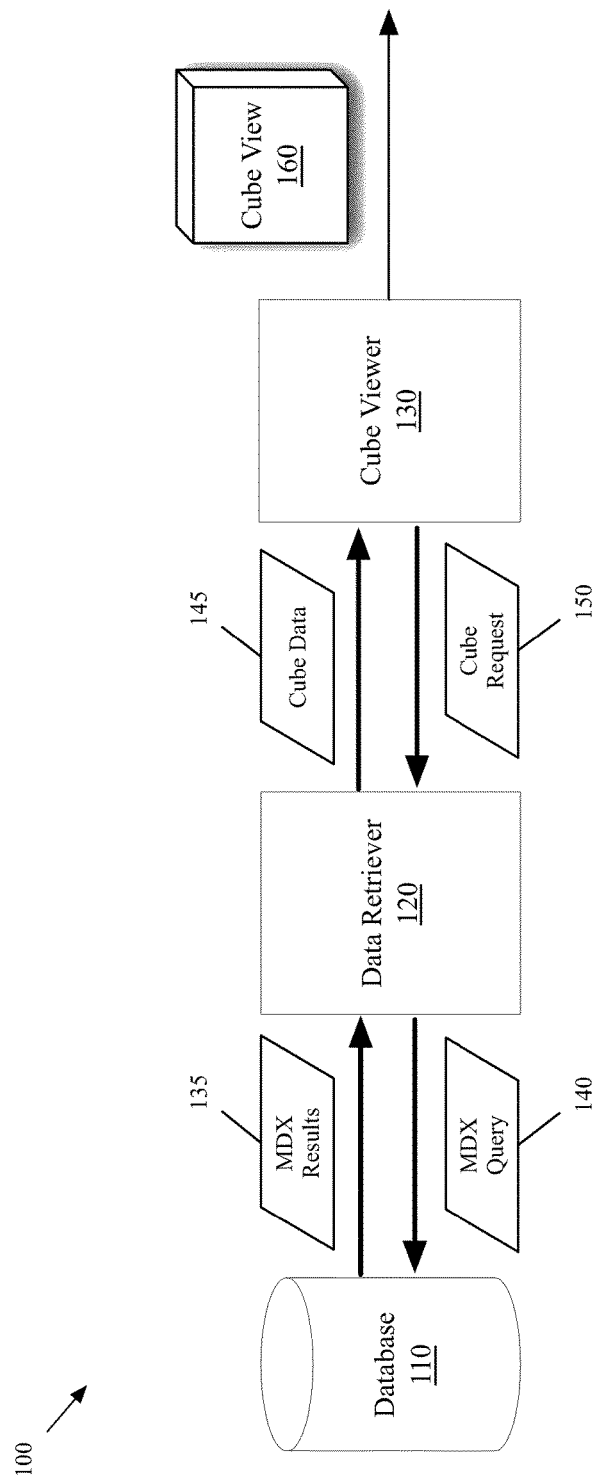
FIG. 1 shows a high-level component diagram of a typical OLAP cube browsing system.
Figure 2:
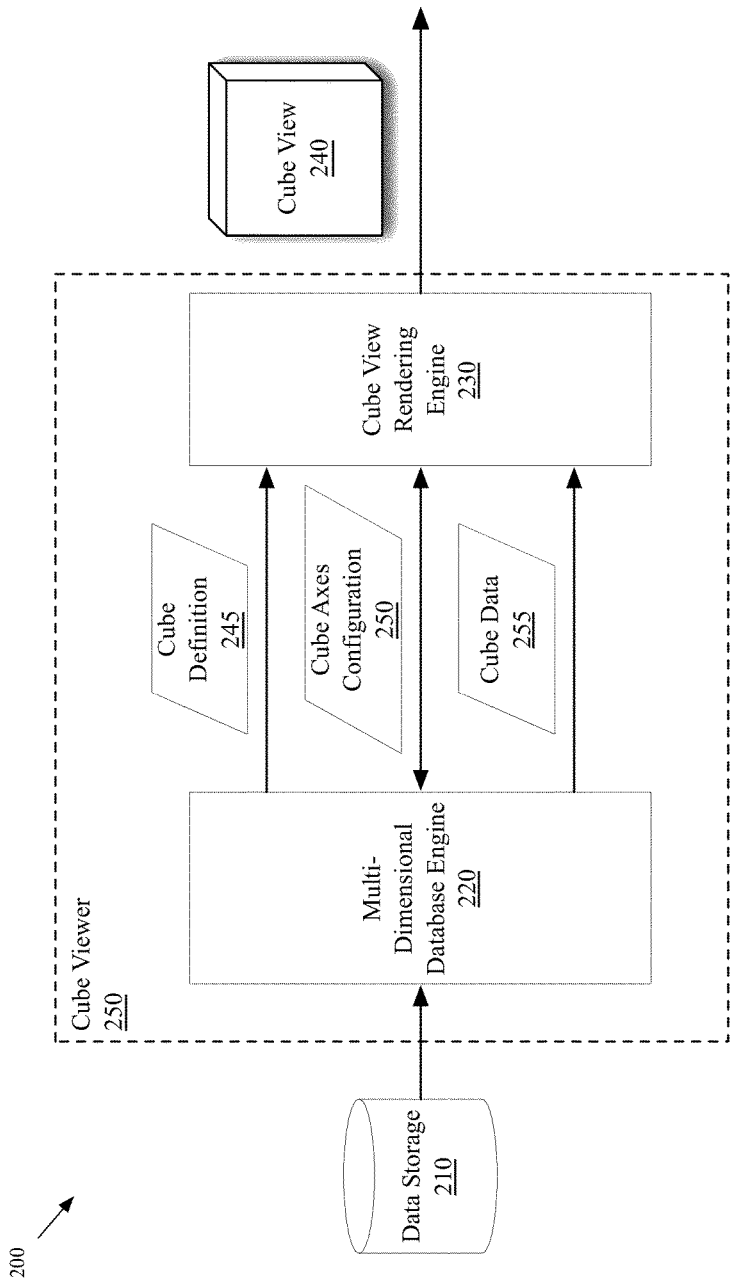
FIG. 2 conceptually illustrates a system that generates a display of a cube view.

FIG. 2 conceptually illustrates a system 200 that includes such a cube viewer 250. Specifically, this figure illustrates the cube viewer 250 that generates the cube view 240 using several different storage structures including a cube definition 245, a cube configuration 250, and cube data 255. As shown, the cube viewer 250 includes a cube view rendering engine (CVRE) 230 and a multidimensional database engine (MDDE) 220. The figure also includes a MDDS 210 that stores one or more cubes accessible by the cube viewer 250.

The MDDS may be implemented in any number of different ways. For instance, a MDDS of some embodiments may be implemented as a database (e.g., a relational database, a hierarchical database, a flat file database, or any other type of database for storing data). Alternatively, a data storage may be implemented as a file (e.g., an XML file, a spreadsheet file, a comma-separated values (CSV) file, a text file, etc.), or as any other type of object that serves as a source of data. Also, a MDDS in some embodiments is implemented by a single storage unit (e.g., a hard drive) or by several storage units (e.g., hard drives).

The cube definition 245 is a storage structure that defines an MDDS cube within an MDDS storage. That is, the cube definition 245 specifies a full scope of entities used to create the cube. Example of such entities includes dimensions, measures, and hierarchies. In some embodiments, a dimension specifies a set of data attributes of the cube, while a hierarchy specifies a hierarchical relationship between the set of attributes. On the other hand, measures are values (e.g., numeric values) derived from the cube based on the dimensions. In some embodiments, the cube definition 245 is created using a standard Extensible Markup Language (XML) schema. One such standard schema is a XML for Analysis (XMLA), which is an industry standard XML schema for defining a cube. However, one of ordinary skill in the art will realize that different schemas can be used to differently define the cube.

The cube configuration 250 in some embodiments stores (1) a subset of the entities that are specified in the cube definition 245 and (2) the relationships between these entities. For example, the cube configuration can include one or more entities (e.g., attributes, measures, etc.) defined in the cube definition 245. In some embodiments, the entities in this subset are the entities that are selected (e.g., by a user or by a user's actions) from the cube definition to identify a portion of the cube for viewing. The CVRE 230 in some such embodiments includes a user interface that allows a user to specify a set of entities (e.g., attributes, measures, Key Performance Indicator (KPI) values, KPI goals, KPI statuses, or KPI trends) that is to be included in the cube configuration 250. The set of entities is then used to generate a query. Accordingly, the cube configuration 250 allows the user to selectively extract (e.g., slice and dice) a particular section of cube data. Also, by utilizing the cube configuration 250, several different queries can be consolidated into one query. This optimizes cube data retrieval as it prevents multiple queries being sent when the user wants to browse related cube data.

The cube configuration 250 of some embodiments is an axes configuration structure as it specifies one or more axes that define the relationships between a subset of entities from the cube definition. In some such embodiments, the cube axes configuration 250 indicates the relationship between its entities by grouping several attributes or measures into different axes or hierarchies. For example, the cube axes configuration 250 can include a first axis that specifies a set of measures or other numeric cube entities (e.g., KPI values, etc.) for the cube view. The cube axes configuration can further include a second axis (e.g., row axis) that specifies a set of dimension attributes as row attributes of the cube view, and a third axis (e.g., column axis) that specifies another set of dimension attributes as column attributes of the cube view. In some embodiments, the cube axes configuration includes additional axes such as a "filter" axis that specifies a set of attributes for filtering the cube view so that certain data are not shown in the rendered cube view.

In some embodiments, other types of elements define the cube axes configuration 250. These elements include metadata that define how the configuration or cube view is rendered on a display. For example, the cube axes configuration of some embodiments includes different flags that indicate whether each member of an axis is loaded for display, expanded, collapsed, etc. In some embodiments, the cube-browsing system derives metadata from reviewing a cube cache or a query result set. For example, a "Computer" dimension in a cube may have a hierarchy called "Manufacturer". The "hierarchy" can have "members" named "Dell", "HP", "Apple", etc. Those members are not contained in the cube definition but are part of a query result set. These query results are used in the cube axes configuration of some embodiments to indicate hierarchical relationships, performing filtering operations, etc. Accordingly, the cube axes configuration is a definition that provides the means to retrieve and render cube data. Several example cube axes configurations will be described in detail below by reference to FIGS. 15-19.

The cube data 255 is used to display or render a cube view. In the example illustrated in FIG. 2, the cube data 255 is received at the CVRE 230 by querying the MDDS 210.

Specifically, the MDDS is queried using a set of entities (e.g., attributes, measures) in the cube axes configuration 250. The MDDS 210 of some embodiments also stores cube definitions. In some embodiments, the MDDS 210 is a local data storage that the system 200 accesses to display the cube view 240. Alternatively, the system 200 accesses the MDDS 210 through a network (e.g., the Internet) using one or more middleware components (e.g., Web services, application servers). In some embodiments, the cube data 255 is indexed and cached locally so that the cube data can be easily retrieved to render the cube view 240.

The MDDE 220 is an engine via which the CVRE 230 accesses data stored in the MDDS 210. Specifically, the CVRE 230 receives the cube data 255 and/or the cube definition 245 from the MDDS 210 through the MDDE 220. To retrieve data from the MDDS, the MDDE 220 of some embodiments facilitates generation of queries (e.g., MDX queries) based on requests from the CVRE 230. In some embodiments, the MDDE 220 does not generate queries but is used as an interface that the CVRE 230 uses to receive copies of data files from one or more data storages. As will be described in detail below by reference to FIG. 3, the MDDE 220 of some embodiments includes different components to facilitate the generation of one or more cube views.

As shown, the CVRE 230 receives the cube definition 245, cube axes configuration 250, and cube data 255. Based on these data structures, the CVRE 230 generates a cube view 240. The cube view 240, in some embodiments, enables an end-user to swiftly analyze multidimensional data from multiple perspectives. In some embodiments, the CVRE 230 presents the cube view as an interactive presentation (e.g., an interactive matrix) that a user can manipulate to interactively obtain a particular perspective of the underlying cube data. That is, the user can interact with the presentation to selectively extract a particular perspective of the underlying multidimensional data. In conjunction with, or instead of the interactive object, the CVRE 230 of some embodiments generates other items such as charts (e.g., pie charts, bar charts), graphs, tables, lists, etc. In some embodiments, the CVRE 230 does not present the cube view 240 as a user interface or a view. Instead, the cube view 240 is part of a larger system of interchanging data, a scheduled task, etc.

In some embodiments, the CVRE 230 generates a single cube view 240. However, by separating the content from the presentation, the CVRE 230 of some embodiments renders multiple cube views. For example, one or more graphs or charts may be displayed upon a user selecting (e.g., clicking on a cursor, moving the cursor over, touch operation, etc.) a member or cell of an interactive matrix. Alternatively, several cube views are simultaneously displayed by sharing the same cube data. In some embodiments, the CVRE 230 may render several cube views using different segments of the available portion of the cube. In addition, the CVRE 230 of some embodiments is able to intelligently update or render only those regions in a cube view that has changed. In some embodiments, the cube data 255 is a separate data structure that is not tied to any particular cube view. As such, multiple cube views 240 can be generated using the cube data 245.

Figure 3:
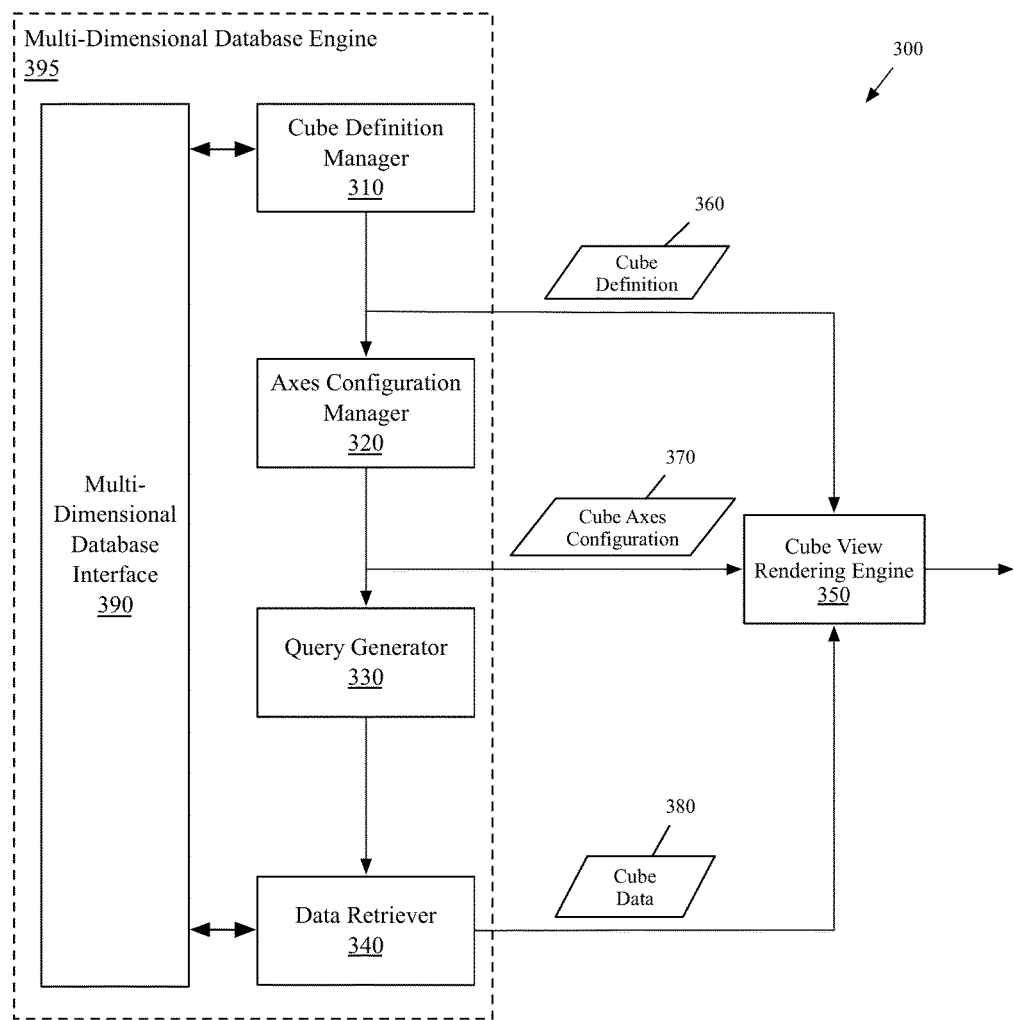
FIG. 3 illustrates a data flow diagram that provides an example of generating the cube view based on a cube definition, a cube axes configuration, and cube data.

In some embodiments, a cube-browsing system 300 performs a series of operations to generate a display of a cube view. FIG. 3 illustrates a data flow diagram that provides an example of generating the cube view based on a cube definition 360, a cube axes configuration 370, and cube data 380. Specifically, this figure illustrates the relationship between these data structures that allow the CVRE 350 to generate a display of the cube view. As shown, the cube-browsing system 300 includes a multidimensional database engine (MDDE) 395 and a cube view rendering engine (CVRE) 350. The CVRE 350 is the same as the one described above by reference to FIG. 2. However, the MDDE 395 includes a cube definition manager 310 for managing cube definitions, (2) an axes configuration manager 320 for managing cube axes configurations, (3) a query generator 330 for generating queries, and (4) a data retriever 340 for retrieving data based on the queries. In some embodiments, one or more components of the MDDE 395 are server components, while the CVRE 350 is a client component. Alternatively, in some embodiments, the MDDE 395 and the CVRE 350 operate on one computing device to provide one or more cube views.

In some embodiments, the MDDI 390 is an interface via which the other components access data stored in the data storage. Specifically, the cube definition manager 310 and the data retriever 340 receive the cube definition and the cube data from the data storage through the MDDI 390.

As shown in FIG. 3, the cube definition manager 310 receives a cube definition through the MDDI 390. The cube definition includes a metadata (e.g., dimensions, measures) that specifies a configuration of a multidimensional cube. In some embodiments, the cube definition manager 310 receives the cube definition based on a request from the CVRE 350. For example, based on user input, the CVRE 350 of some embodiments directs the cube definition manager 310 to retrieve the cube definition from a data storage (not shown). In some embodiments, the cube definition is retrieved from a data storage that stores the definition's corresponding multidimensional cube.

Once the cube definition is received, the cube definition manager 310 sends the cube definition 360 to the axes configuration manager 320 and the CVRE 350, or stores the cube definition so that it will be available for the CVRE 350. The axes configuration manager 320 also creates a cube axes configuration based on the received cube definition 360. In some embodiments, the axes configuration manager 320 creates the cube axes configuration based on a user interfacing with a display that is generated by the CVRE 350. For example, the CVRE 350 of some embodiments displays a set of selectable user interface items for entities (e.g., dimension attributes, measures) associated with the multidimensional cube. The user can then select one or more of these items to create the cube axes configuration 370.

In the example illustrated in FIG. 3, the axes configuration manager 320 sends the cube axes configuration 370 to the query generator 330. The query generator 330 then formulates one or more multidimensional database queries using the cube axes configuration 370. As shown, the cube axes configuration 370 is also sent to the CVRE 350. In some embodiments, the CVRE 350 uses the cube axes configuration 370 to display a representation of the cube axes configuration. This allows an end-user to see which entities (e.g., dimensions, measures) are included in the cube axes configuration 370. In some embodiments, the cube axes configuration is presented on a display such that the user can also see the relationship between entities in the cube axes configuration. Several examples of creating and displaying such a cube axes configuration are described below by reference to FIG. 9.

The data retriever 340 receives the one or more queries from the query generator 330 and retrieves cube data based on the queries. Specifically, the data retriever 340 queries the multidimensional database through the MDDI 390. As shown in FIG. 3, the data retriever 340 receives cube data that satisfy the query. The data retriever 340 then forwards the cube data to the CVRE 350. In some embodiments, the data retriever 340 parses the query result set and extracts cube data from the query result set. Alternatively, in some embodiments, the CVRE 350 parses and extracts the cube data.

Once the cube data is received, the CVRE 350 then generates a display of a cube view using the cube data. As mentioned above, the CVRE 350 of some embodiments displays the cube view as an interactive presentation (e.g., interactive matrix). In some embodiments, the interactive presentation is represented as an interactive spreadsheet with different columns and rows. A user of the system 300 can interact with this presentation to quickly extrapolate a particular perspective of the underlying multidimensional database. For example, the user can select on an item on a particular row or a particular column to expand or collapse the interactive presentation in order to display another dimension of the cube. In conjunction with, or instead of the interactive presentation, the CVRE 350 of some embodiments generates other items such as charts (e.g., pie charts, bar charts), graphs, tables, lists, etc.

In the examples described above, several separate entities (e.g., a cube axes configuration, cube data) are used to extrapolate one or more cube views from a cube stored in a cube database. By separating the content and the presentation, the system of some embodiments is able to intelligently update or render only those regions in the cube view that has changed. For example, when the cube view is expanded to display additional cube data, the system of some embodiments redraws only the region of the cube view that shows the additional cube data and not the entire cube view. In some embodiments, the method renders the updated cube view by accessing the cube cache and/or dynamically retrieving any necessary cube data from the cube database.

In some embodiments, the cube viewer of some embodiments provides one or more cube presentations. For example, one or more graphs or charts may be displayed upon a user selecting (e.g., clicking on a cursor, moving the cursor over, etc.) a member or cell of the interactive presentation. By pre-generating these other cube views, the viewer can quickly display them as needed when the user interacts with the interactive presentation. Also, in some embodiments, the viewer can simultaneously display different cube views that provide different perspectives of the same segment of a cube, or provide different views of different segments of the cube.

In the examples described above, three separate entities or storage structures (i.e., a cube definition, a cube axes configuration, and cube data) are used to extrapolate a cube view from a cube stored in a cube database. One of ordinary skill in the art would understand that these three entities could further be separated into other entities. For example, the cube axes configuration can be further separated into several separate entities, such as a first cube axes configuration for querying a multidimensional database and a second separate cube axes configuration for rendering a cube view on a display.

Several more detailed embodiments of the invention are described below. Section I describes a cube-browsing system with novel querying and caching features. Section II describes an example cube-browsing client. Section III then describes several example data structures for the cube-browsing system. Section IV describes an example cube-browsing client with multiple presentations. Next, Section V describes several example operations of a cube-browsing client. Section VI then describes several alternate embodiments of the cube browsing system. Finally, Section VII describes an electronic system with which some embodiments of the invention are implemented.

I. Distributed Cube-Browsing System

In the example illustrated above in FIG. 3, the cube data is accessed locally or through a network (e.g., the Internet).

To provide a cube view efficiently, a cube-browsing system of some embodiments performs novel intelligent caching and querying operations. In performing these operations, the system identifies cube data that is cached and retrieves, based on the identification, any other cube data that is not already cached. In some embodiments, the customized query that is formulated by the system is based on the data that is not available in the cache. The intelligent caching and querying features are particularly useful in a network environment as the same cube data does not have to be downloaded repeatedly. Several examples of such a cube-browsing system that implements the intelligent caching and querying features will now be described by reference to FIGS. 4-5.

A. Example Data Flow

Figure 4:
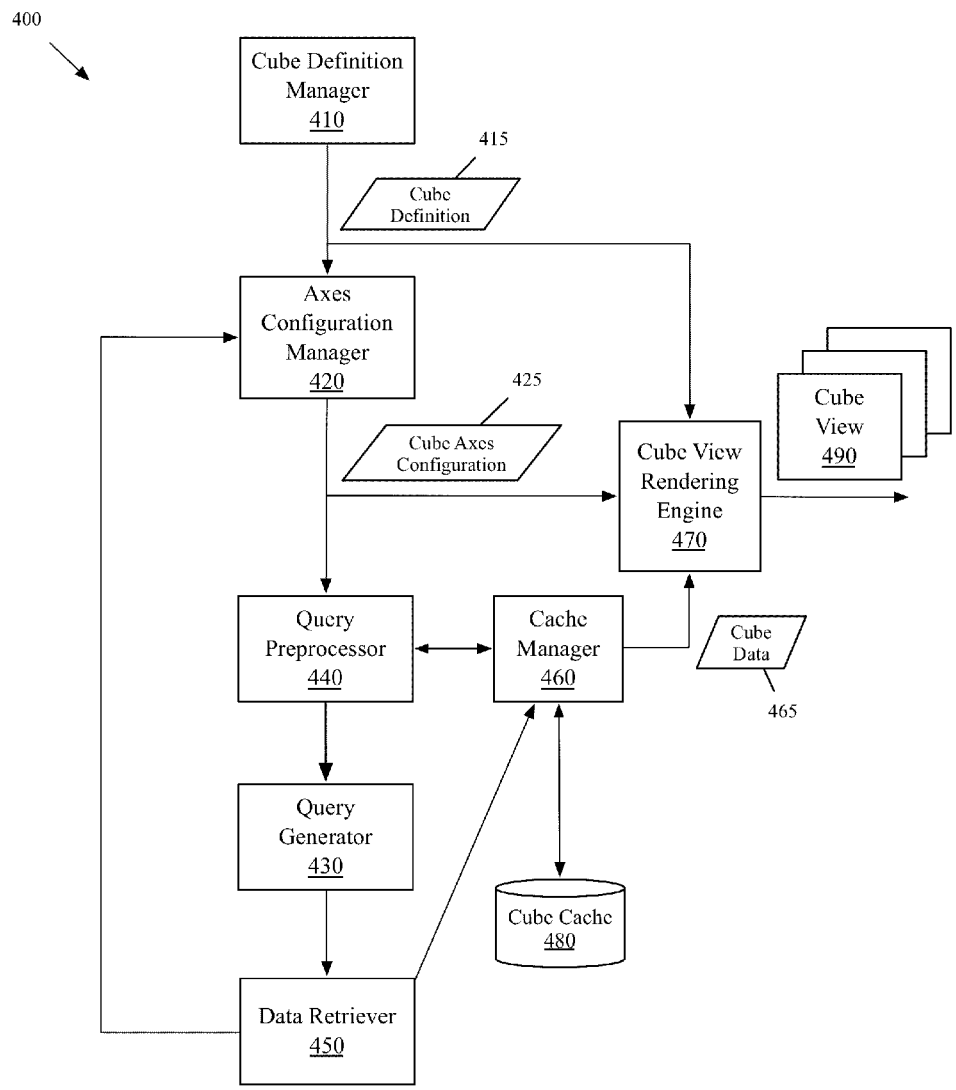
FIG. 4 illustrates a data flow diagram that provides an example of generating one or more cube views using an intelligent caching and querying feature according to some embodiments.

FIG. 4 illustrates a data flow diagram that provides an example of generating one or more cube views using novel intelligent caching and querying features according to some embodiments. Specifically, this figure illustrates generating the cube view using cube data retrieved from a multidimensional database, as well as any cube data that is stored in a cube cache. In some embodiments, the system 400 is implemented as a cube-browsing client. The cube-browsing client 400 of some embodiments is a stand-alone application that operates on a particular operation system (e.g., Windows, Android OS, iOS). Alternatively, the cube-browsing client 400 of some embodiments is an applet (e.g., Java applet) or plug-in component that operates in conjunction with another application such as a web browser. As shown, the cube-browsing client 400 includes a cube definition manager 410, an axes configuration manager 420, a query generator 430, a cube view rendering engine (CVRE) 470, a query preprocessor 440, a data retriever 450, a cache manager 460, and a cube cache 480.

The cube definition manager 410, the axes configuration manager 420, and the CVRE 470 are similar to those described above by reference to FIG. 3. Specifically, the cube definition manager 410 receives a cube definition from a multidimensional database. The cube definition manager 410 then sends the cube definition 415 to the axes configuration manager 420 and the CVRE 470. The axes configuration manager 420 then creates a cube axes configuration based on the received cube definition 415. In some embodiments, the axes configuration manager 420 creates the cube axes configuration 425 based on user interaction with a user interface (UI) of the CVRE 470.

In the example illustrated in FIG. 4, the axes configuration manager 420 sends the cube axes configuration 425 to the query preprocessor 440. The query preprocessor 440 receives the cube axes configuration 425 and determines the cube data required to display the cube view. For example, the query preprocessor 440 might determine that a data result set for a set of entities (e.g., dimensions, measures) defined in the cube axes configuration 425 is required to display the cube view. To make this determination, the query preprocessor 440 of some embodiments interfaces with the cache manager 460. For example, the query preprocessor 440 may send, based on the cube axes configuration 425, one or more requests to the cache manager 460 in order to determine what cube data needs to be downloaded.

Based on a request from the query preprocessor 440, the cache manager 460 determines whether a particular set of cube data (e.g., for a set of entities in the cube axes configuration 425) is available in the cube cache 480. The cache manager 460 of some embodiments makes this determination by accessing or reading the cube cache 480. In some embodiments, the cube cache 480 is a storage structure or a computer file (e.g., a XML file). In some embodiments, the cube cache 480 is a storage area (e.g., memory space, disk storage space) that stores cube data. Also, in some embodiments, the cube data in the cube cache is at least partially cleared or deleted using one or more cache replacement algorithms. For example, at least some of the data in the cube cache can be cleared based on any one or more of the following factors: the amount of space allocated for the cache, the frequency of the cached data being used, the time the cached data was last accessed, etc. One of ordinary skill in the art would understand that other known techniques can be used to differently clear the cube cache. Several examples of the cube cache of some embodiments are described below by reference to FIGS. 20-23.

After accessing the cube cache 480, the cache manager 460 provides input to the query preprocessor 440. This input allows the query preprocessor 440 to determine whether to execute a query against the multidimensional database for a particular set of data. Once a determination is made on what cube data is not present in the cache and needs to be downloaded, the query preprocessor 440 directs the query generator 430 to generate one or more queries. Specifically, the one or more queries are constructed for data that is not currently stored in the cube cache 480. For example, the query generator 430 may formulate a query that requests a data result set for several of the entities included in the cube axes configuration 425 but not all of the entities.

The data retriever 450 receives the one or more queries from the query generator 430 and retrieves cube data based on the queries. In the example illustrated in FIG. 4, the data retriever 450 queries the multidimensional database through a network connection and receives cube data that satisfies the queries in return. The data retriever 450 then forwards the received cube data to the cache manager 460, which in turn stores the cube data into the cube cache 480. In some embodiments, the data retriever 450 parses the query result set and extracts cube data from the query result set. The data retriever 450 of some embodiments also extracts metadata from the query result set and sends the metadata to the axes configuration manger 420 to update the cube axes configuration. In some embodiments, the metadata in the axes configuration is then used to render a cube view. Several examples of a cube axes configuration being dynamically populated with metadata based on a result set will be described in detail by reference to FIG. 16-19.

Having received the cube data, the cache manager 460 stores the cube data in the cube cache 480. This allows the cache manager 460 to access and retrieve the cube data from the cube cache 480 at a later time. As shown in FIG. 4, the CVRE 470 receives cube data 465 from the cache manager 460. In some cases, the cube data 465 includes other data stored in the cube cache 480 in addition to the cube data just received from the data retriever 450.

Once the cube data 465 is received, the CVRE 470 then generates a display of one or more cube views using the cube data. As mentioned above, the CVRE 470 of some embodiments displays a cube view 490 as an interactive matrix. A user of the system 400 can interact with this matrix to quickly extrapolate a particular view of the underlying cube. In conjunction with, or instead of the interactive matrix, the CVRE 470 of some embodiments generates other items such as charts (e.g., pie charts, bar charts), graphs, tables, lists, etc.

In the examples described above, a web-based cube-browsing client is able to access a cube database to retrieve only the data that it needs to render a cube view. Accordingly, the intelligent caching and querying features allow a web-based version of the client application to provide its end-users with a rich Internet application experience or an application experience similar to that of an installed desktop application. For example, with the client application fetching only the data that it needs to render the cube view, an end-user does not have to wait for other cube data to be downloaded. This is different from prior cube browsing systems that re-download all the cube data each time a portion of a presentation is updated.

B. Example System Architecture

Figure 5:
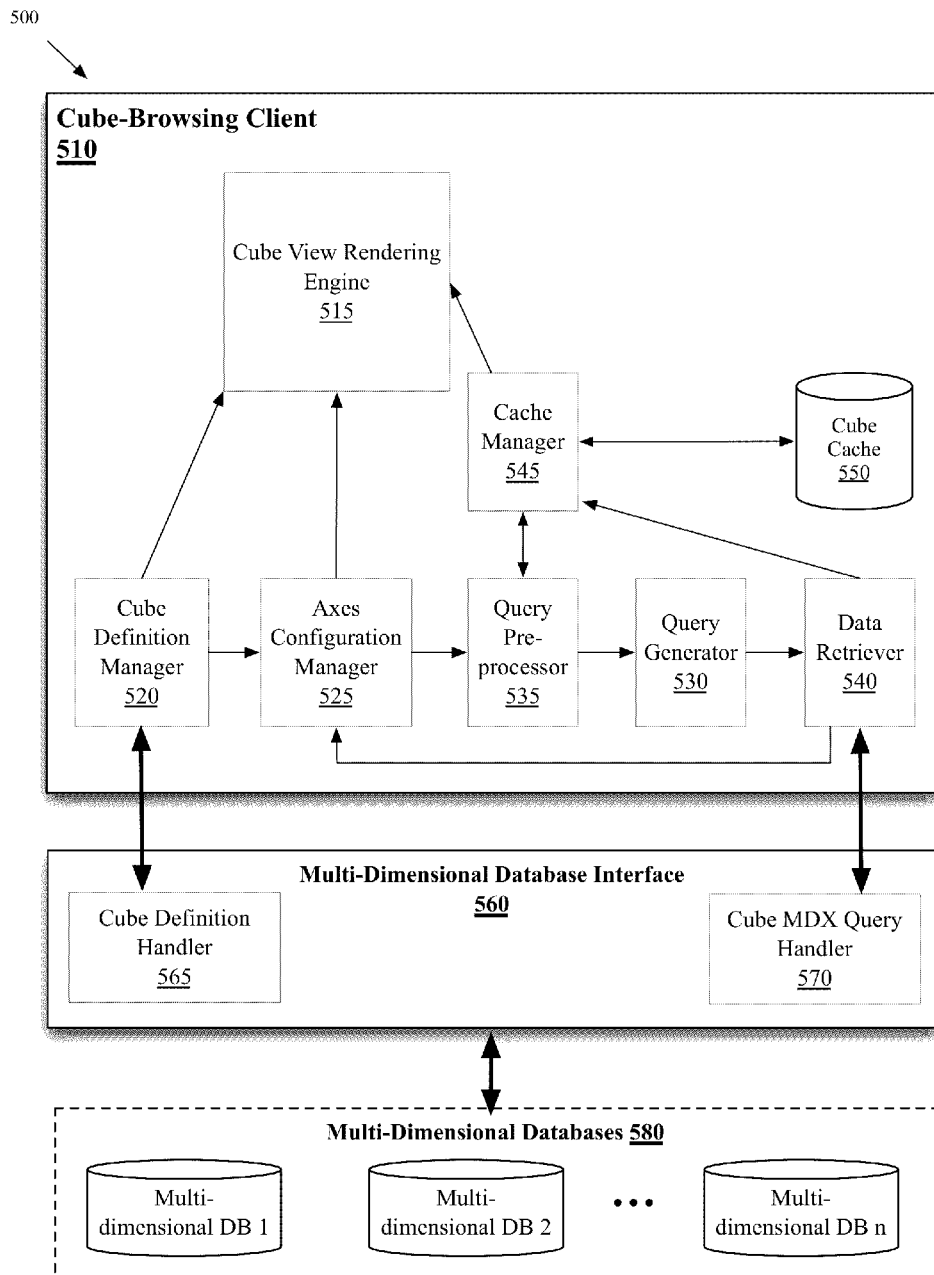
FIG. 5 conceptually illustrates an example software architecture of a cube browsing system.

FIG. 5 conceptually illustrates a software architecture of a cube browsing system 500. Specifically, this figure illustrates several components (e.g., modules) for a cube-browsing client 510 and a multidimensional database interface (MDDI) 560. In some embodiments, the cube-browsing client 510 is a stand-alone application, is integrated into another application, or is a plug-in component, while in other embodiments the client might be implemented within an operating system. Furthermore, in some embodiments, the cube-browsing client 510 is provided as part of a server-based solution. In some such embodiments, the cube-browsing client 510 is provided via a thin client. In a thin client solution, some or all of the logic and/or processing is performed on a server while a user interacts with a client application via a separate client machine connected to the server. An example of the thin client would be a low-end computer terminal whose sole function is to provide a graphical user interface to the end-user. On the other hand, for a thick client solution, some or all of the logic and/or processing (e.g., for viewing MDDS cubes) is performed on the client machine.

As shown in FIG. 5, the cube-browsing client 510 includes a cube definition manager 520, an axes configuration manager 525, a query generator 530, a query preprocessor 535, a data retriever 540, a cache manager 545, a cube cache 550, and a cube view rendering engine (CVRE) 515. These components are the same as the ones described above by reference to FIG. 4. However, in this example, several different components of the MDDI 560 are introduced. The MDDI 560 of some embodiments includes a cube definition handler 565 and a cube MDX query handler 570. This figure also illustrates a set of multidimensional databases 580 that are accessed through the MDDI 560.

In some embodiments, the cube definition handler 565 and the cube MDX query handler 570 process data requests from the cube-browsing client 510. In some embodiments, the cube definition handler 565 and the cube MDX query handler 570 are Web services that act as middleware components between the cube-browsing client 510 and the set of multidimensional databases 580.

In the example illustrated in FIG. 5, the cube definition handler 565 processes cube definition requests from the cube-browsing client 510. Specifically, the cube definition handler 565 receives a cube definition request from the cube definition manager 520. Based on the request, the cube definition handler 565 accesses the multidimensional database to retrieve a cube definition. The cube definition handler 565 then sends the retrieved cube definition to the cube definition manager 520.

By contrast, the cube MDX query handler 570 processes cube data requests. Specifically, the cube MDX query handler 570 receives a MDX query from the data retriever 540. The cube MDX query handler 570 then queries a multidimensional database to retrieve cube data. Upon receiving the cube data, the MDX query handler 570 then sends the cube data to the data retriever 540.

Figure 6:
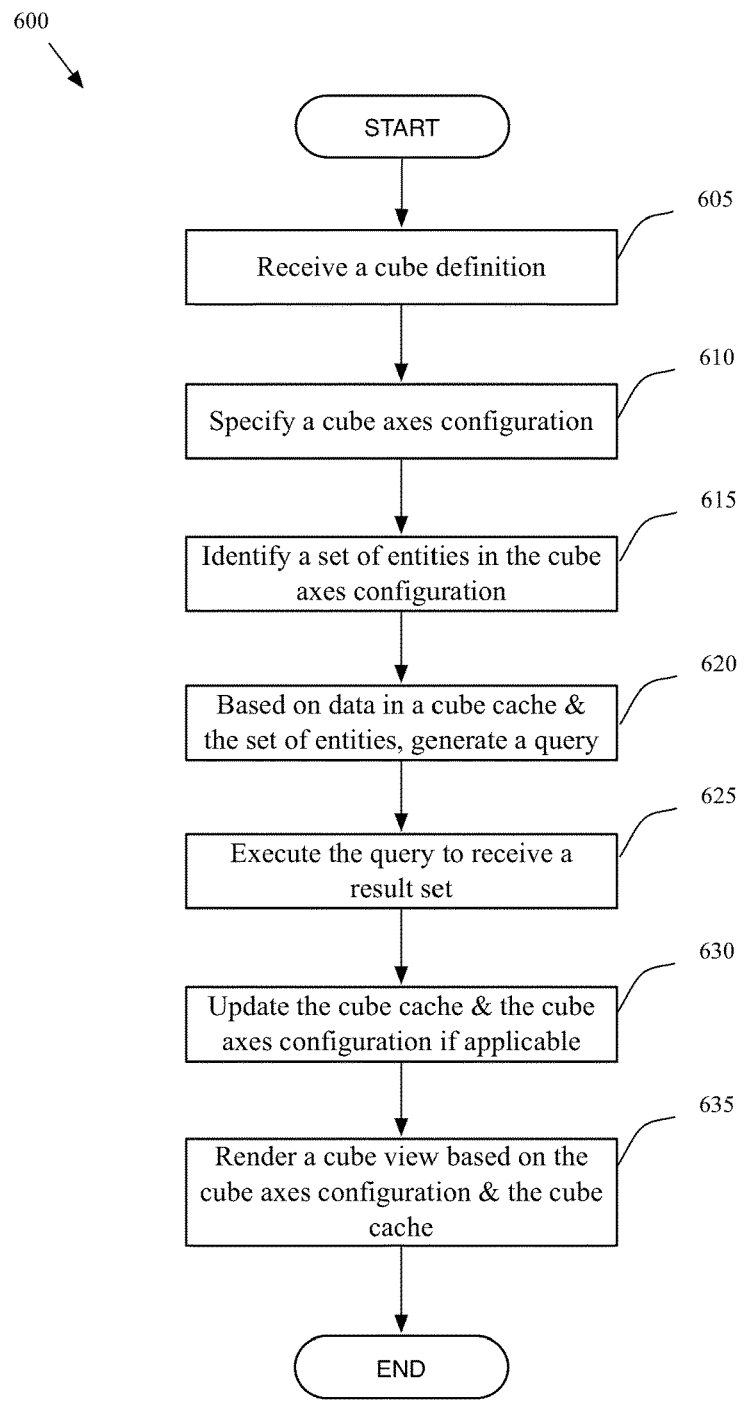
FIG. 6 illustrates a process that some embodiments perform to render a cube view.

An example operation of the system 500 will now be described by reference to FIG. 6. Specifically, FIG. 6 illustrates a process 600 that some embodiments perform to render a cube view. In some embodiments, the cube-browsing client 510 performs the process 600. As shown, the process 600 receives (at 605) a cube definition.

In the example illustrated in FIG. 5, the cube definition manager 520 sends a request for a cube definition to the MDDI 560. In some embodiments, the request identifies a particular multidimensional cube so that the corresponding cube definition can be retrieved. The request is received at the cube definition handler 565 that processes the request. Specifically, the cube definition handler 565 generates a request to send to a particular multidimensional database that stores the cube data. The MDDI 560 then sends the request to the particular multidimensional database. In response to the request, the particular multidimensional database returns the corresponding cube definition to the MDDI 560. The cube definition handler 565 then forwards the cube definition to the cube definition manager 520.

Referring to FIG. 6, the process 600 specifies (at 610) a cube axes configuration. As mentioned above, the cube axes configuration includes a subset of entities from the cube definition, and indicates the relationships between this subset of entities. As shown in FIG. 5, the cube definition manager 520 sends the cube definition to the CVRE 515. In some embodiments, the CVRE 515 generates a display of the cube definition. This allows an end-user to specify different entities (e.g., dimension attributes, measures) for the cube axes configuration.

Based on the cube definition, the axes configuration manager 525 creates a cube axes configuration. In some embodiments, the cube axes configuration is created based on user interactions with a user interface (UI) of the cube-browsing client 510. The axes configuration manager 525 of some embodiments also receives updates to the cube axes configuration from the data retriever 540.

As shown in FIG. 6, the process 600 identifies (at 615) a set of entities in the cube axes configuration. In some embodiments, the set of entities correspond to a set of UI items selected by the user of the cube-browsing client. The process 600 generates (at 620) a query based on the set of entities and data in a cube cache. The process 600 then executes (at 625) the query against the cube database to receive a result set relating to any one or more entities in the set of entities that is not already cached in the cube cache.

In the example illustrated in FIG. 5, the axes configuration manager 525 sends the cube axes configuration to the query preprocessor 535. The query preprocessor 535 receives the cube axes configuration and determines what cube data is required for a cube view. To make this determination, the query preprocessor 535 of some embodiments interfaces with the cache manager 545. For example, the query preprocessor 535 may send, based on the cube axes configuration, one or more requests to the cache manager 545 in order to determine what cube data needs to be downloaded.

Based on a request from the query preprocessor 535, the cache manager 545 determines whether a particular set of cube data is available in the cube cache 550. As mentioned above, the cache manager 545 of some embodiments makes this determination by accessing the cube cache 550. In some embodiments, the cube cache 550 is a storage area (e.g., memory space, disk storage space) that stores cube data. After accessing the cube cache 550, the cache manager 545 provides input to the query preprocessor 535. This input allows the query preprocessor 535 to determine whether to execute a query against the multidimensional database for a particular data set.

Once a determination is made on what cube data needs to be downloaded, the query preprocessor 535 directs the query generator 530 to generate an MDX query. Specifically, the MDX query is constructed for a data set that is not currently stored in the cube cache 550. The query generator 530 then sends the MDX query to the data retriever 540.

The data retriever 540 then sends the MDX query to the cube MDX query handler 570. The MDX query handler 570 then queries the particular multidimensional database. Upon receiving the query result set, the MDX query handler 570 returns the query result set to the data retriever 540. After receiving the query result set, the data retriever 540 sends the cube data to the cache manager 545.

Referring to FIG. 6, the process 600 updates (at 630) the cube cache and the cube axes configuration. In some embodiments, the update operation includes storing the result set in the cube cache. The update operation in some embodiments entails dynamically updating the axes configuration with metadata from the result set in order to render the cube view. In some embodiments, this update operation is only performed when it is required. For instance, when all the data required to render the cube view is already in the cube axes configuration and the cube cache. The cube cache and the cube axes configuration might not be updated based on the result set. As shown in FIG. 5, the cache manager 545 stores the query result set in the cube cache 550. The cache manager 545 also sends any required cube data stored in the cube cache 550 to the CVRE 515.

The process 600 renders (at 635) the cube view based on the cube axes configuration and the cube cache. As shown in FIG. 5, once the required cube data is received, the CVRE 515 generates a display of a cube view using the cube data. As mentioned above, the CVRE 515 of some embodiments displays the cube view as an interactive matrix.

II. A Cube-Browsing Client Example

Some embodiments provide a cube-browsing client that receives different data structures to provide a perspective of a cube stored in a cube database. For example, the cube-browsing client of some embodiments receives a cube definition including several entities that define the cube, a cube configuration including a set of entities for a cube view, and a cube data set including data related to the set of entities. The cube-browsing client then renders the cube view by presenting the cube data set on a display based on the cube configuration.

Figure 7:
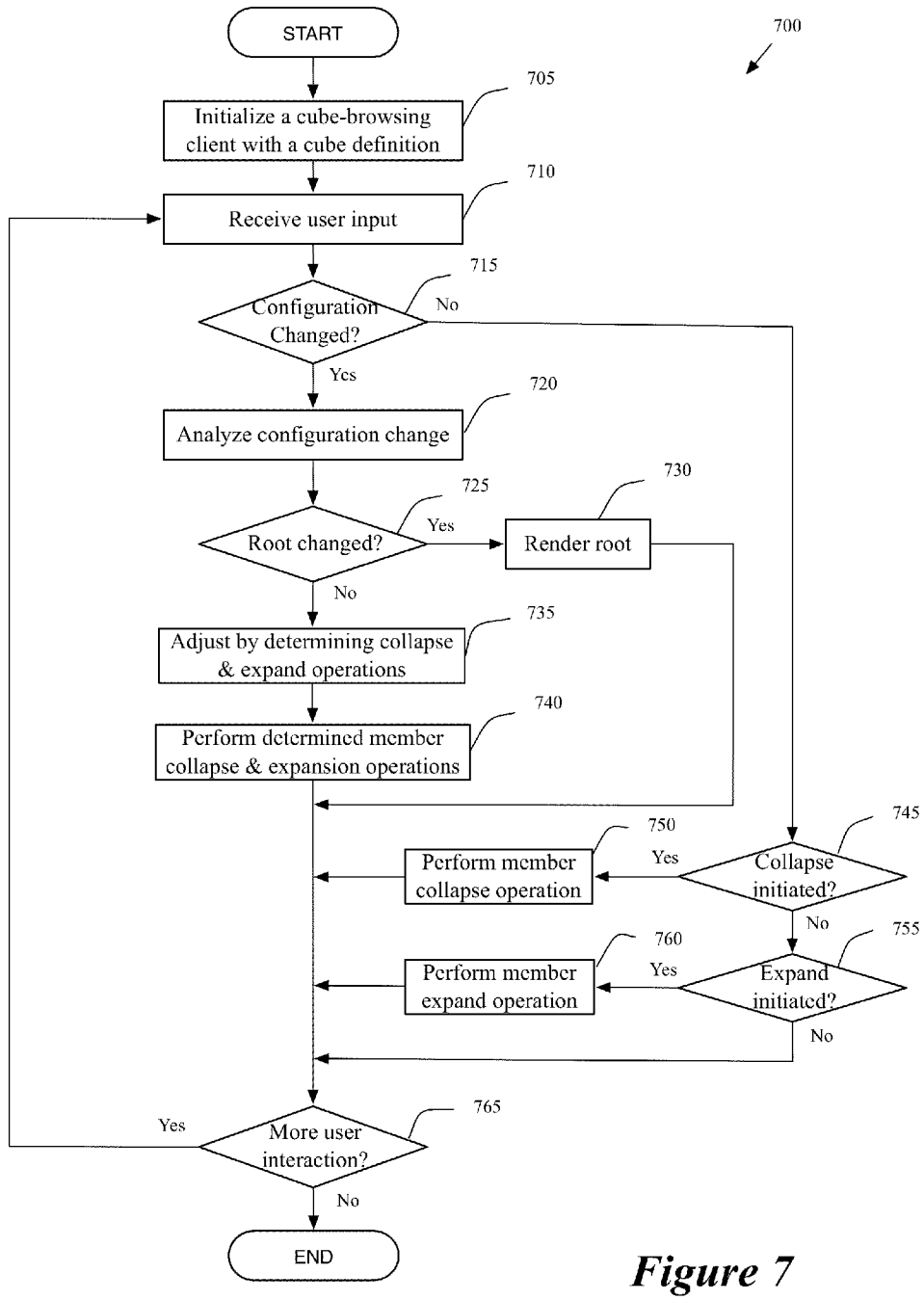
FIG. 7 conceptually illustrates a process for searching and browsing a multi-dimensional database.
Figure 8:
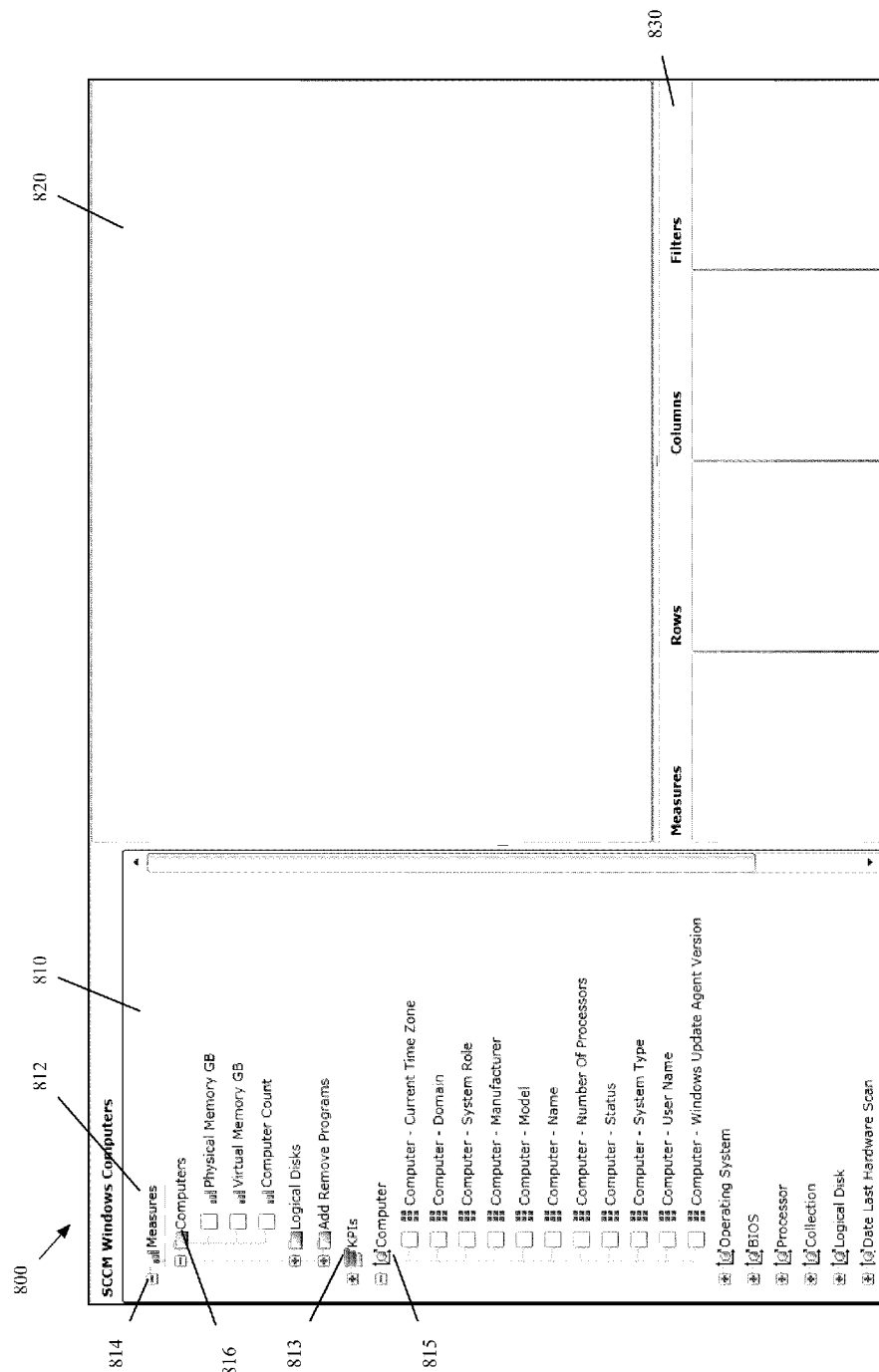
FIG. 8 illustrates a cube-browsing client after initializing the client with a cube definition.

FIG. 7 conceptually illustrates a process 700 that some embodiments perform to search and browse a multidimensional database. In some embodiments, the process 700 is performed by the cube-browsing client. The process 700 will be described by reference to FIGS. 8-13 that illustrate an example graphical user interface (GUI) 800 for the cube-browsing client. As shown in FIG. 8, the GUI 800 includes a cube definition area 810 for displaying the cube definition, a configuration area 830 for displaying the cube axes configuration, and a cube display area 820 for displaying a cube view.

As shown in FIG. 7, the process 700 initializes (at 705) the cube-browsing client with a cube definition. To perform the initialization, the cube-browsing client of some embodiments accesses a data storage that stores the cube definition. In some embodiments, the selection of the cube definition is based on user input. For example, when there are multiple different multidimensional databases, the cube-browsing client might allow a user to select a particular multidimensional database and a cube within that particular multidimensional database. In some embodiments, the initialization entails retrieving the cube definition, parsing the cube definition into a list (e.g., field list), and presenting a representation of the list in a GUI (e.g., by loading the list).

FIG. 8 illustrates the GUI 800 after the cube-browsing client is initialized with a cube definition. As shown, the initialization caused the cube definition area 810 to be populated with the cube definition. Specifically, the cube definition area 810 lists several different entities (e.g., measures, dimensions, KPIs) associated with the cube stored in the multidimensional database. Several of the entities include multiple child entities. For example, measure groups 812 include "computers" 816, "logical disks", and "add remove programs". Also, the "computers" measure group 816 includes "physical memory GB", "virtual memory GB", and "computer count", which are all measures related to the "computers" measure group 816. The "computer" entity 815 is a dimension with several attributes that include "computer—current time zone", "computer—domain", "computer—system role", etc. In addition, several of these entities include a selectable user interface (UI) item for collapsing or expanding a corresponding entity. For instance, a user of the GUI 800 can select a UI item 814 to hide or reveal each child entity that is associated with the measure groups 812.

In the example illustrated in FIG. 8, the GUI 800 displays a representation of the cube definition in a sidebar area. However, the cube definition can be presented differently, in some embodiments. For example, instead of the sidebar area, the cube definition can be presented in a separate window or a different area of the GUI 800.

Returning to FIG. 7, the process 700 receives (at 710) user input. The process 700 then determines (at 715) whether the user input specifies a configuration change (e.g., change to a cube axes configuration). When the configuration has not changed, the process 700 proceeds to 745, which is described below. Otherwise, the process 700 analyzes (at 720) the change to the configuration. In some embodiments, the change to the configuration includes creating a new configuration or modifying an existing configuration.

Figure 9:
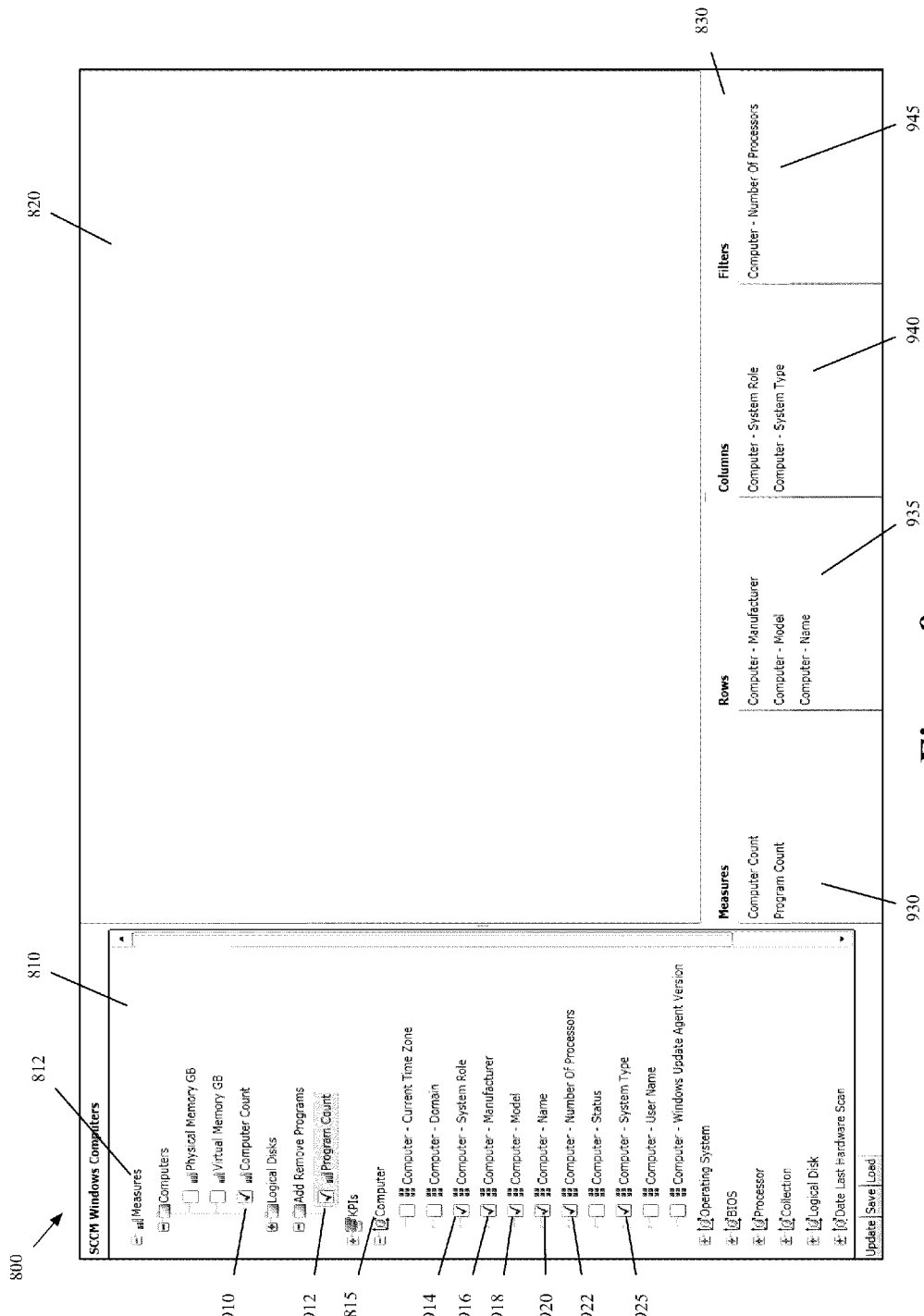
FIG. 9 shows the cube-browsing client after creating a cube axes configuration based on user input.

FIG. 9 shows the GUI 800 after creating a cube axes configuration based on user input. As shown, a user has selected two measures: "computer count" 910 and "program count" 912. Specifically, the user has selected these items by selecting a particular check box that is adjacent to each measure or by a drag and drop operation. The selection of these measures caused a change to the configuration. This change to configuration is reflected in the configuration area 830. Specifically, the selected measures are listed in a "measures" section 930 of the configuration area 830. This indicates to the user that these measures have been selected to be part of a cube presentation displayed in the cube display area 820.

Similarly, several attributes of the "computer" dimension 815 are selected from the cube definition area 810. Specifically, "computer—manufacturer" 916, "computer—model" 918, and "computer—name" 920 are selected and added to the "rows" section 935 of the configuration area 830. Also, "computer—system role" 914 and "computer—system type" 925 are selected and added to a "columns" section 940. In addition, "computer—number of processors" 922 is selected and added to a "filters" section 945 of the configuration area 830. The user might have added these attributes to the different sections by dragging and dropping these items, through a context menu, or through other UI operations. In some embodiments, the GUI includes other UI items to specify a value or a range of values for each attribute selected as a filter for the cube view and displayed in the "filters" section 945 of the configuration area 830.

In some embodiments, each time an item is added, moved, or removed in the configuration area 830, a configuration update event is triggered. This allows the cube-browsing client to determine whether there is a configuration change. Alternatively, the cube-browsing client triggers a configuration update event based on the occurrence of a particular event (e.g., a user's selection of a particular button, the user's selection of a hotkey, etc.). In some embodiments, the analysis (at 720 of FIG. 7) includes identifying changes to the configuration area 830 based on user input. For example, a user modification to a row or column dimension attribute may cause the interactive matrix to be re-rendered on the cube display area 820.

Returning to FIG. 7, the process 700 determines (at 725) whether a root (e.g., a grid root) of the cube view (e.g., interactive matrix) has changed. In some embodiments, the root of cube view is its top-level members for row, column, and measures. When the process 700 determines (at 725) that the root has changed, the process renders (at 730) the root. Otherwise, the process 700 proceeds to 735, which will be described below.

Figure 10:
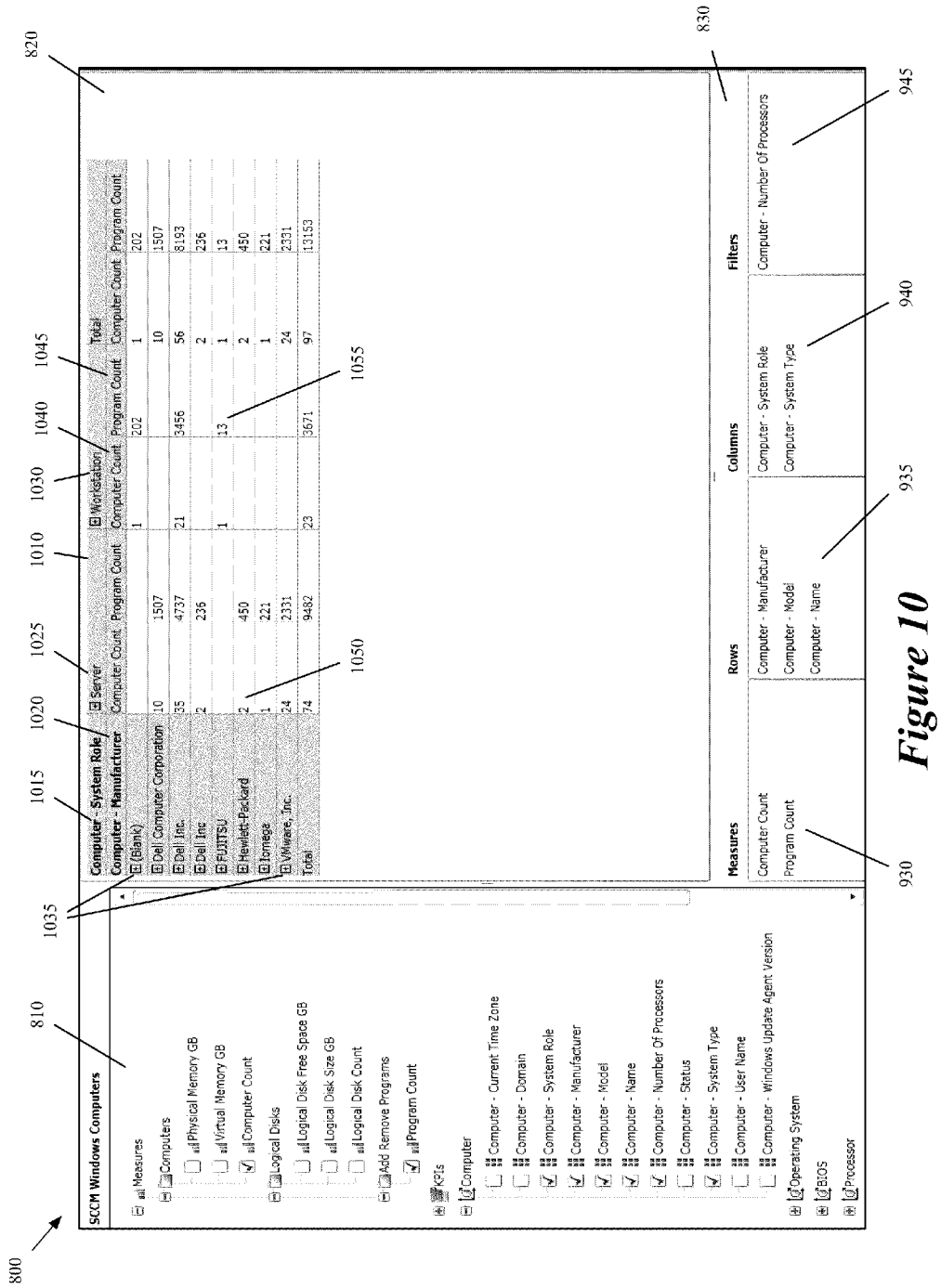
FIG. 10 illustrates an example of a cube view that is rendered on a display of the cube-browsing client.

FIG. 10 illustrates an example of a cube view that is rendered on the cube display area 820 of the cube-browsing client. In the example illustrated in FIG. 10, an interactive matrix 1010 is displayed in the cube display area 820. Specifically, this matrix is displayed according to the cube axes configuration displayed in the configuration area 830. Based on a first item in the "columns" section 940 of the configuration area 830, the interactive matrix 1010 uses "computer—system role" 1015 as its column root. The column root includes several top-level column members. The top-level column members include "server" 1025 and "workstation" 1030. Also, the Interactive matrix 1010 includes "computer—manufacturer" 1020 as its row root based a first item in the "rows" section 935. Here, the row root includes several first-level row members. These first-level row members include a set of computer manufacturers 1035.

As mentioned above, the root of an interactive matrix is its top-level members for row, column, and measures. In some embodiments, each cell at an intersection of a column and a row represents a measure of the cube at the corresponding intersection of dimension members. In the example illustrated in FIG. 10, the measure is either a "computer count" or a "program count", as specified in the "measures" section 930 of the configuration area 830. For example, the cell 1050 indicates that there are 2 Hewlett-Packard sever computers; and the cell 1055 indicates that there are 13 programs on Fujitsu workstations.

To populate the interactive matrix 1010, the cube-browsing client of some embodiments formulates a query (e.g., a root MDX query) to retrieve data from the cube. Based on the retrieved data, the cube-browsing client then performs operations to render the grid axes and data cells of the interactive matrix 1010.

As shown in FIG. 7, when the root has not changed, the process 700 adjusts (at 735) an interactive matrix by determining whether to collapse or expand (e.g., hide or reveal) data. In some embodiments, the collapse and expand operations facilitate changes that occur below the grid root level being reflected on the cube display area 820. The process 700 then performs (at 740) the determined member collapse or expand operations. For example, if any change is detected below the top-level row members, the cube-browsing client of some embodiments identifies on the row axis all expanded instances that are at a level higher than where the change occurs and performs the collapse operation. This effectively removes all the expanded rows used in the hierarchy. After performing the member collapse or expand operation, the process 700 proceeds to 765, which is described below.

The process 700 determines (at 745) whether to perform a member collapse operation. When the process 700 determines (at 745) that a member collapse operation has been initiated (e.g., through a cursor click, through a touch operation), the process performs (at 750) the member collapse operation. Otherwise, the process 700 determines (at 755) whether a member expand operation has been initiated. When the member expand operation is initiated, the process 700 performs (at 760) the member expand operation.

Figure 11:
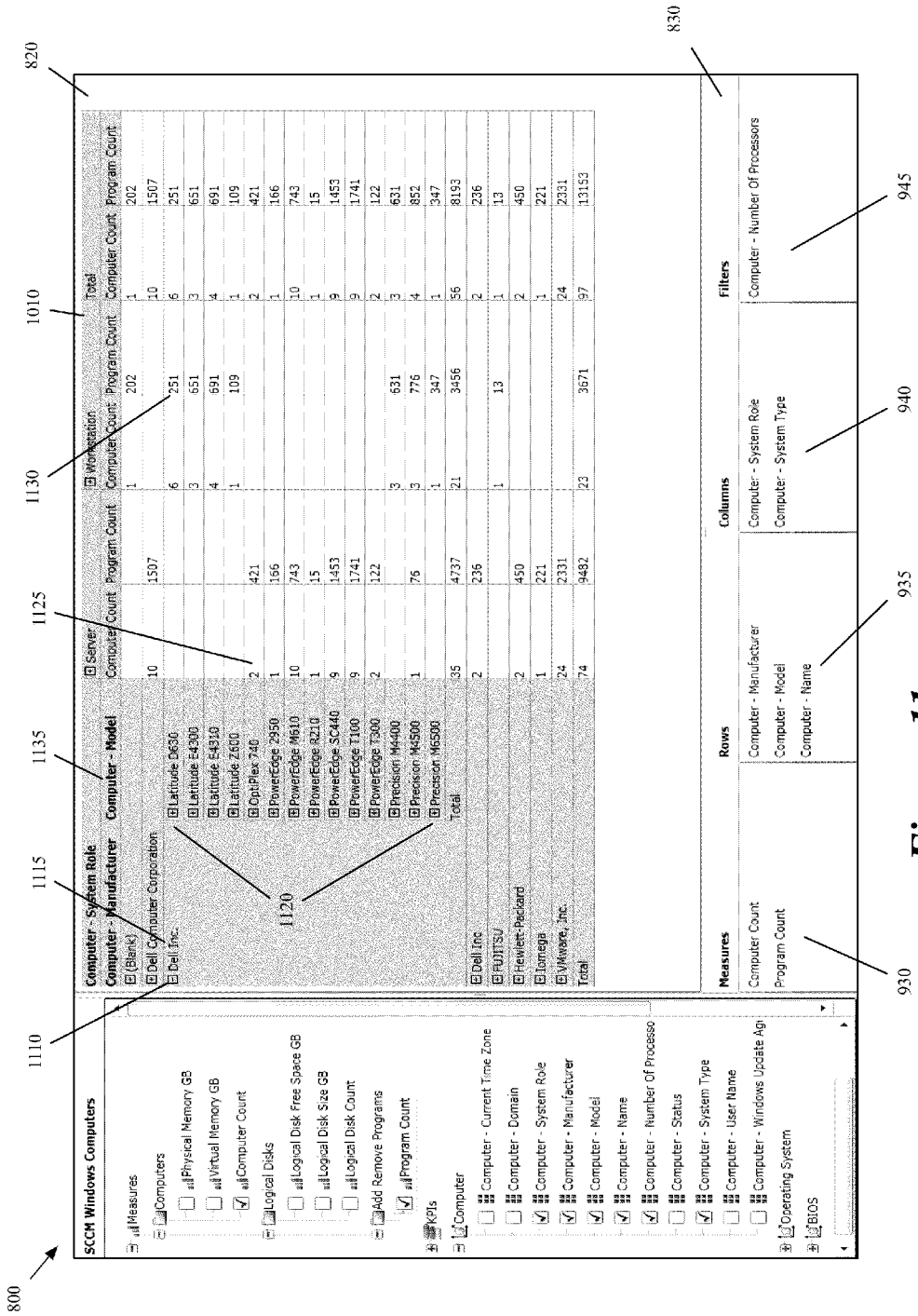
FIG. 11 illustrates the cube-browsing client after a row member of an interactive matrix is expanded on the display.

FIG. 11 shows the GUI 800 after a row member 1115 is expanded on a display. As shown, the expand button 1110 associated with the member 1115 is activated. As a result, the interactive matrix 1010 displays members of "computer—model" 1135 as its second level row members. This second level row member corresponds to the second item in the "rows" section 935 of configuration area 830. Specifically, the second level row members include different computer model names 1120, such as "Latitude D630", "Latitude E4300", etc.

As shown in FIG. 11, each cell at an intersection of a column and a row represents a measure of the cube at the corresponding intersection of dimension members. For example, the cell 1125 indicates that there are 2 Dell Inc. "OptiPlex 740" servers, while the cell 1130 indicates that there are 251 programs on Dell Inc. "Latitude D630" workstations. In some embodiments, to populate the interactive matrix 1010 in FIG. 11, the cube-browsing system checks the cache first and formulates an appropriate MDX query to retrieve data for the expanded instance from a multidimensional database. On return of query result data, the cube browsing system performs operations to render the expanded grid axis and data cells of the interactive matrix 1010.

FIG. 11 also illustrates that when a member is expanded, the only change to the interactive matrix 1010 is the segment that is expanded. Here, the cube-browsing client detected a change to the cube configuration based on an expansion operation initiated by an end-user. The change to the cube configuration caused the cube-browsing client to evaluate the change to the cube configuration. In some embodiments, the evaluation includes identifying what additional cube data is required to render one or more of the cube presentations. Once it retrieves the additional cube data (e.g., from the cube cache and/or the cube database), the cube-browsing client renders only one or more portions of the presentation that has changed. This provides an end-user with a more user-friendly experience as he or she does not have to wait for the entire presentation to be re-rendered when only a portion of the cube presentation has changed. This is different from prior systems that re-evaluates and re-renders all the cube data each time a portion of a presentation is modified (e.g., expanded or collapsed).

In some embodiments, the cube-browsing client may identify or calculate where new rows or columns need to be inserted in the presentation. For example, an interactive matrix can include a grid defined by a collection of objects. These objects can be independently drawn and/or have their own layers. When expanding a level in the grid, the cube-browsing client of some embodiments calculates the number of new members (e.g., rows, columns) to show and insert that number of members as new objects into the grid. That is, the cube-browsing client does not redraw other parts of the grid but only redraws the new objects corresponding to the new members. Hence, by maintaining a separation of content and presentation, the cube-browsing client is able to efficiently redraw the cube presentation as it renders only the additional new data that is accessed either from a local storage structure (e.g., the cube cache) or a cube database.

FIG. 12 shows the interactive matrix 1010 after a member expand operation is initiated on a column member of the interactive matrix 1010. As shown, the expand button 1210 associated with member "server" 1215 is activated. As a result, the interactive matrix 1010 includes members of "computer—system type" as its next level column members. These column members under the member "server" 1215 include computer system types "x64-based PC" and "X86-based PC".

As illustrated in FIG. 12, each cell at an intersection of a column and a row represents a measure of the cube at the corresponding intersection of dimension members. For example, the cell 1235 indicates that there are 166 programs on the "PowerEdge 2950" x64-based PC servers manufactured by Dell Inc.; and the cell 1240 indicates that there are 2 "OptiPlex 740" X86-based PC servers manufactured by Dell Inc. In some embodiments, to populate the interactive matrix 1010 in FIG. 12, the cube-browsing system initially checks the cache and formulates an appropriate MDX query to retrieve data for the expanded instance from a multidimensional database. On return of query result data, the cube browsing system performs operations to render the expanded grid axis and data cells of the interactive matrix 1010.

Figure 13:
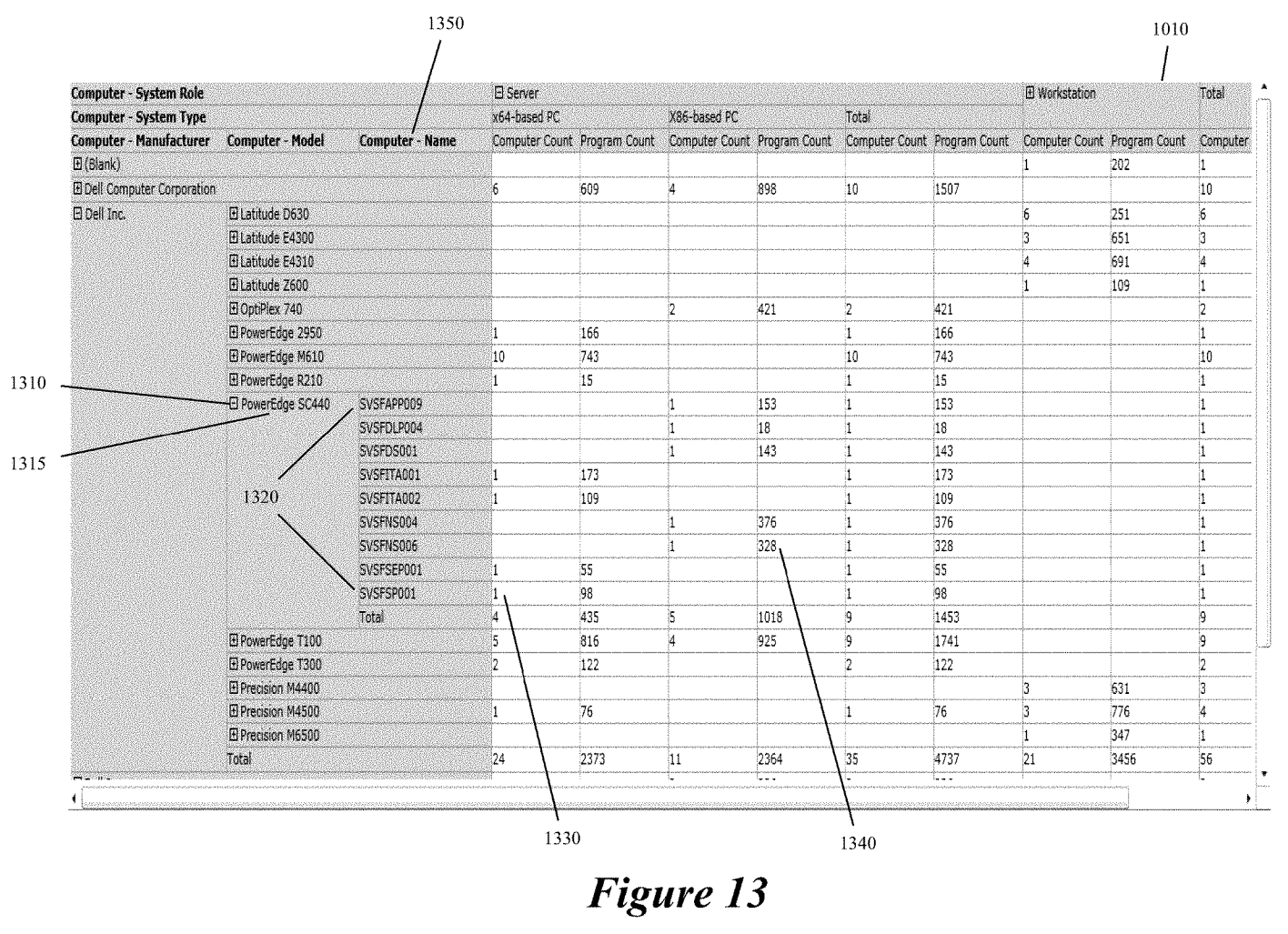

FIG. 13 shows the interactive matrix 1010 after a member expand operation is initiated on a second level row member of the interactive matrix 1010. As shown, the expand button 1310 associated with member "PowerEdge SC440" 1315 is activated. As a result, the interactive matrix 1010 includes members of "computer—name" as its third level row members. The third level row members includes a set of computer names 1320, such as "SVSFAPP009", "SVSFDLP004", etc.

As illustrated in FIG. 13, each cell at an intersection of a column and a row represents a measure of the cube at the corresponding intersection of dimension members. For example, the cell 1330 indicates that there is 1 "PowerEdge SC440" x64-based PC server manufactured by Dell Inc. with the name "SVSFSP001"; and the cell 1340 indicates that there are 328 programs on "PowerEdge SC440" X86-based PC server manufactured by Dell Inc. with the name "SVSFNS006".

Returning to FIG. 7, when the expansion operation is not initiated, or after finishing operations at 730, 740, 750, or 760, the process 700 determines (at 765) whether there is any more user interaction. When the process 700 determines (at 765) that there is more user interaction, the process 700 returns to 710, which is described above. Otherwise, the process 700 ends.

Some embodiments perform variations on the process 700. For example, the specific operations of the process 700 may not be performed in the exact order shown and described. The specific operations may not be performed in one continuous series of operations, and different specific operations may be performed in different embodiments. Furthermore, the process 700 could be implemented using several sub-processes, or as part of a larger macro process. Also, in the many of the examples described above, the cube-browsing client displays a cube view as an interactive matrix. However, one of ordinary skill in the art will realize that some embodiments of the invention might display a cube view differently. For example, instead of presenting the cube view as an interactive matrix, the method of some embodiments present the cube view as a simple list, a pie chart, a bar chart, a graph, a table, or some other forms.

In some embodiments, the cube-browsing client is an iOS application that presents a list of measures as a table. In some such embodiments, after a user choosing one or more measures, the application presents a list of hierarchies. After the user choosing one or more hierarchies, the application updates the cube axes configuration and provides the results as a list that the user can drill into one level at a time, corresponding to the hierarchies chosen. In any event, how the cube axes configuration and cube data are viewed is independent of how the cube data is populated.

III. Example Data Structures

In many of the examples described above, the cube-browsing system generates a cube view based on several different data structures. The data structures include a cube definition, a cube axes configuration, and cube data. Several examples of these data structures will now be described by reference to FIGS. 14-23.

A. Cube Definition

A cube definition is a data structure that defines a cube in a multidimensional database. That is, the cube definition includes a full scope of entities used to create the cube as well as any references to other entities in the multidimensional database that it is dependent on. As mentioned above, the cube definition of some embodiments is defined using XMLA, which is an industry standard XML schema for defining a multidimensional cube. However, one of ordinary skill in the art will realize that different schemas can be used to differently define the cube. FIG. 14 illustrates an example of a cube definition 1400 according to some embodiments. In this example, the cube definition 1400 is the same as the one that is parsed and loaded in the cube definition area 810 as shown in FIG. 8.

As shown in FIG. 14, the cube definition 1400 includes several elements. These elements include (1) a "cube" element 1405 that represents the cube, (2) a "name" element 1410 that indicates the name of the cube, (3) a "dimensions" element 1420 that represents a set of dimensions associated with the cube, (4) a "key performance indicators" element 1440 that represents a set of key performance indicators associated with the cube, and (5) a "MeasureGroups" element 1450 that represents a set of measures associated with the cube.

In the example illustrated in FIG. 14, the "name" element 1410 indicates that the name specified for the cube is "SCCM Windows Computers". The "dimensions" element 1420 includes a "Computer" dimension 1422. The "Computer" dimension 1422 includes an identifier 1423 that identifies the dimension, a name 1425 that identifies the name of the dimension, attributes 1426 that identify the dimension's attributes, and hierarchies 1430 that identify the dimension's hierarchies. As shown, the attributes 1426 includes a set of "attribute" 1428 associated with the "Computer" dimension. These attributes include "computer—current time zone", "computer—domain", "computer—system role", etc.

In some embodiments, the cube definition is parsed to identify measures, key performance indicators, dimensions, etc. in order to create a field list of entities. The field list is then rendered in an UI, which allows a user to interact with the field list of entities and create a cube axes configuration based on the field list. An example of a field list that is derived from the cube definition 1400 is described above by reference to FIG. 8.

B. Cube Axes Configuration

Figure 15:
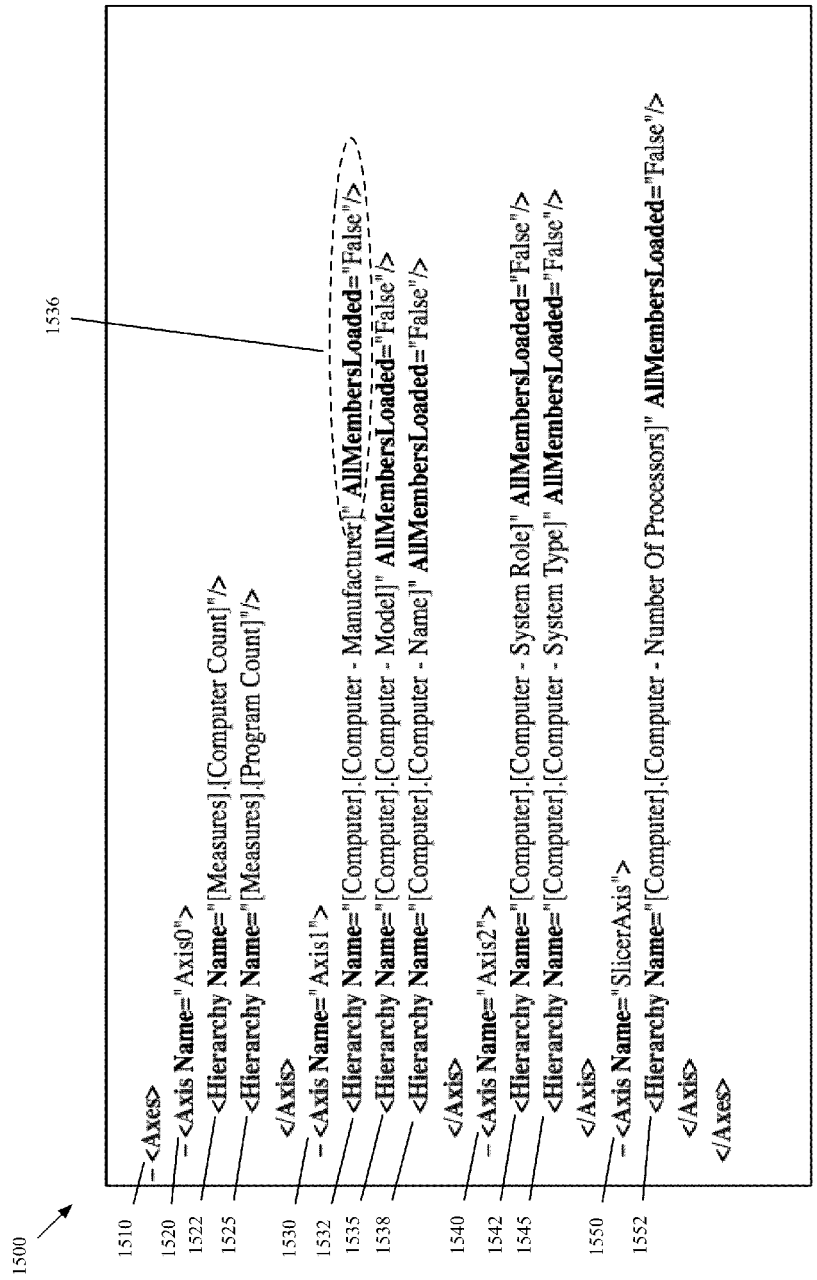
FIG. 15 shows an example format of a cube axes configuration according to some embodiments.

As mentioned above, a cube axes configuration includes a subset of entities from a cube definition. In some embodiments, the cube axes configuration also indicates the relationship between the subset of entities. The cube axes configuration of some embodiments includes other elements that define how a cube view is rendered on a display. FIG. 15 shows an example format of a cube axes configuration 1500 according to some embodiments. Specifically, this figure illustrates the cube axes configuration 1500 that is defined based on the cube definition 1400 illustrated in FIG. 14. A representation of this cube axes configuration 1500 is illustrated in the configuration area 830 of FIG. 9.

As shown in FIG. 15, the cube axes configuration 1500 includes an axes element 1510. Several different axes are defined under this axes element 1510. These axes include Axis0 1520, Axis1 1530, Axis2 1540, and SlicerAxis 1550. In some embodiments, the organization of entities into these different axes defines the relationship between several entities selected from the cube definition 1400 described above by reference to FIG. 14. For example, the Axis0 1520 represents a set of measures from the cube definition 1400. In FIG. 15, the Axis0 1520 includes a computer count measure 1522 and a program count measure 1525. These measures 1522 and 1525 correspond to the ones selected from the cube definition area 810 and displayed in the "measures" section 930 of the configuration area 830 in FIG. 9.

In addition to measures, the Axis1 1530 contains several hierarchies. Each of these hierarchies corresponds to a particular attribute of the "computer" dimension 1422 from the cube definition 1400 described above by reference to FIG. 14. The attributes includes "computer—manufacturer" 1532, "computer—model" 1535, and "computer—name" 1538. The Axis2 1540 contains two hierarchies, namely "computer—system role" 1542 and "computer—system type" 1545. Referring to FIG. 9, the Axis1 1530 is represented as row items in the "Rows" section 935 of the configuration area 830. In addition, the Axis2 1540 is represented as column items in the "Columns" section 940.

The SlicerAxis 1550 includes a hierarchy 1552. Specifically, the hierarchy 1552 includes the attribute "computer—number of processors" from the "computer" dimension 1422 described above by reference to FIG. 14. Referring to FIG. 9, the hierarchy 1552 is represented as a filter item in the "Filters" section 945 of the configuration area 830. In some embodiments, each attribute of the SlicerAxis 1550 represent a particular dimension attribute that can be used to filter a cube view (e.g., an interactive matrix).

In the example illustrated in FIG. 15, the cube axes configuration 1500 includes other elements that are not part of the cube definition. For example, the cube axes configuration 1500 includes an "AllMembersLoaded" flag 1536 that is used to render the cube view on a display. Here, the "AllMembersLoaded" flag 1536 indicates whether all members of the corresponding dimension attribute "computer—manufacturer" 1532 are contained in the cube axes configuration as a result of a previous query. In some embodiments, it is desirable to present a user with the complete set of members that exist for an attribute when they are choosing which members to include or exclude from filter criteria. Utilizing the "AllMembersLoaded" flag indicates if a query is or is not necessary before rendering the complete set can occur. In FIG. 15, the "AllMembersLoaded" flag 1536 is specified as "false", which indicates that a query is necessary before rendering the complete set of members for dimension attribute "computer—manufacturer" 1532.

FIG. 16 shows the cube axes configuration 1500 after the cube-browsing client has retrieved some cube data as a result of querying the cube and updated the cube axes configuration according to query results. Specifically, this figure illustrates the state of the cube axes configuration 1500 after presenting an interactive matrix that is illustrated in FIG. 10.

As shown in FIG. 16, the hierarchy "computer—manufacturer" 1532 of Axis1 1530 is populated with a set of members 1610, such as "Dell Computer Corporation", "Dell Inc." 1620, "Fujitsu", etc. Each member of the hierarchy "computer—manufacturer" 1532 has an instance-loaded flag and an instance-expanded flag. For example, as illustrated in text block 1625 of the cube axes configuration 1500, the instance-loaded flag and the instance-expanded flag of "Dell Inc." 1620 are both specified as "false". This indicates that the cube data associated with "Dell Inc." 1620 is not currently expanded, and if an expansion is requested, a query is required. The instance-loaded flag is set to true after an expansion operation occurs, and is utilized to minimize unnecessary queries in the event that this instance is collapsed and then expanded again. In addition, the hierarchy "computer—system role" 1542 of Axis2 1540 is populated with a "server" 1630 and a "workstation" 1640. Each member of hierarchy "computer—system role" 1542 has an instance-loaded flag and an instance-expanded flag. Also, as illustrated in text block 1635 of the cube axes configuration 1500, the instance-loaded flag and instance-expanded for "server" 1630 are both specified as "false". The state of these metadata indicates that the instance for "server" 1630 has not been loaded and expanded.

Figure 17:
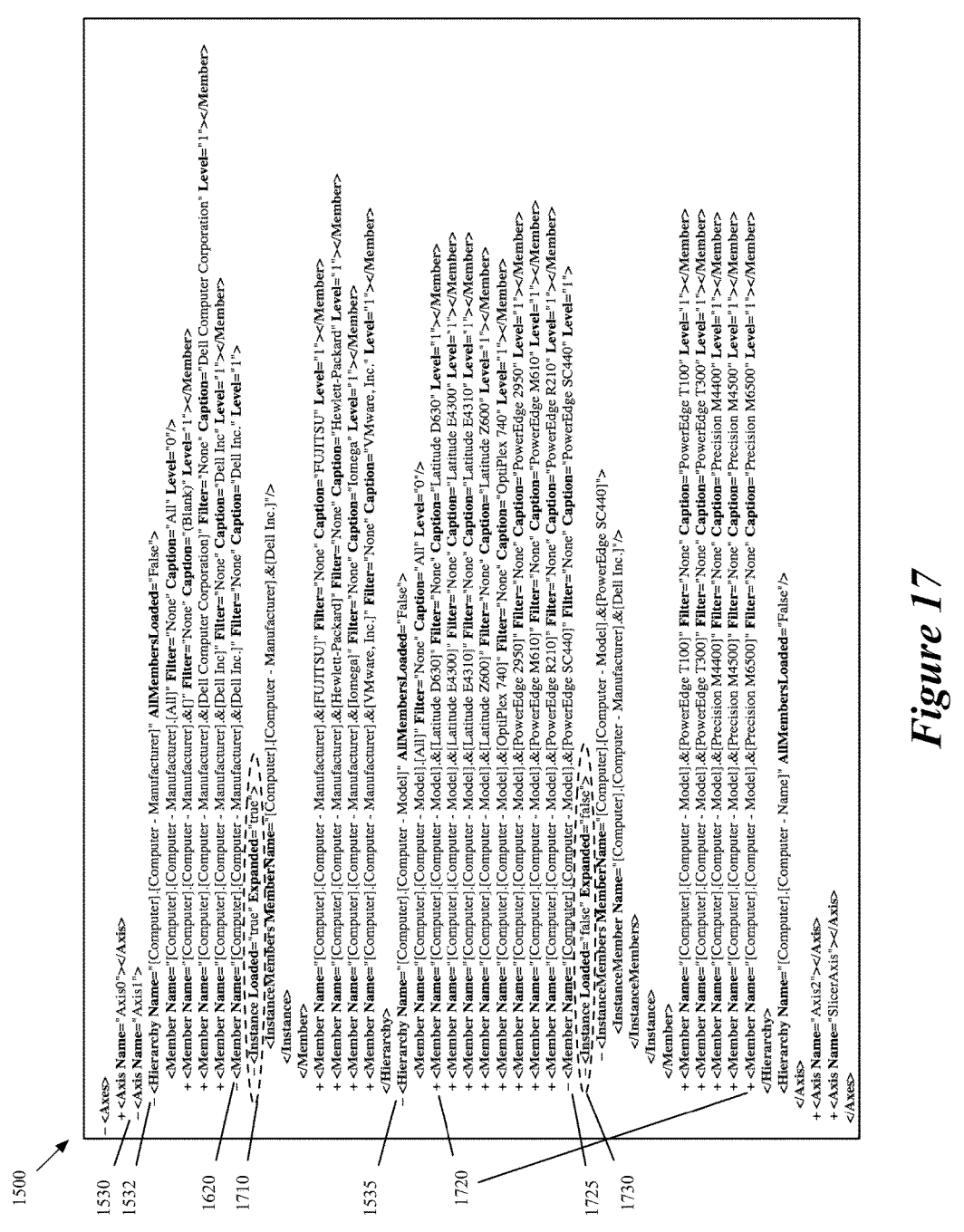

FIG. 17 shows the cube axes configuration 1500 after a member on a first axis is expanded as illustrated in FIG. 11. Specifically, FIG. 17 illustrates the cube axes configuration 1500 after a member of hierarchy "computer—manufacturer" 1532 on Axis1 1530 is expanded. As illustrated in FIG. 17, the member "Dell Inc." 1620 of hierarchy "computer—manufacturer" 1532 is expanded as its instance-expanded flag is changed to "true" from "false" in FIG. 16. This is indicated by text block 1710 of the cube axes configuration 1500. As a result, the hierarchy "computer—model" 1535 of Axis1 1530 is expanded and populated with a set of members 1720, such as "Latitude D630", "PowerEdge SC440" 1725, "Precision M4400", etc. Each member of hierarchy "computer—model" 1535 has an instance-loaded flag and an instance-expanded flag. For example, as illustrated in text block 1730 of the cube axes configuration 1500, the instance-loaded flag and the instance-expanded flag are specified as "false" for member "PowerEdge SC440" 1725. This indicates that the instance of "PowerEdge SC440" 1725 has not been loaded and expanded.

FIG. 18 shows the cube axes configuration 1500 after a member on a second axis is expanded as illustrated in FIG. 12. Specifically, FIG. 18 illustrates the cube axes configuration 1500 after a member of hierarchy "computer—system role" 1542 on Axis2 1540 is expanded. As illustrated in FIG. 18, the member "server" 1630 of hierarchy "computer—system role" 1542 is expanded, as its instance-expanded flag is changed to "true" from "false" in FIG. 16. This is indicated by text block 1830 of the cube axes configuration 1500. As a result, the hierarchy "computer—system type"

1545 of Axis2 1540 is expanded and populated with two members "x64-based PC" 1810 and "X86-based PC" 1820.

FIG. 19 shows the cube axes configuration 1500 after a member of an expanded hierarchy on the first axis is expanded as illustrated in FIG. 13. Specifically, FIG. 19 illustrates the cube axes configuration 1500 after a member of hierarchy "computer—model" 1535 on Axis1 1530 is expanded. As illustrated in FIG. 19, the member "Power-Edge SC440" 1725 of hierarchy "computer—model" 1535 is expanded, as its instance-expanded flag is changed to "true" from "false" in FIG. 17. This is indicated by text block 1910 of the cube axes configuration 1500. As a result, the hierarchy "computer—name" 1538 of Axis1 1530 is expanded and populated with a set of members 1920, such as "SVSFAPP009", "SVSFDLP004", "SVSFITA002", etc.

In many of the examples described above, the cube axes configurations are defined using XML. However, one of ordinary skill in the art would understand that the configurations could be defined using different formats. For example, instead of using matching tags, the cube axes configuration can be defined using different identifiers for different entities (e.g., measures, dimension, etc.).

Moreover, in some embodiments, this schema of cube axes configuration supports defining one or more axes outside of Axis0 1520 and SlicerAxis 1550. The example described above by reference to FIGS. 15-19 shows that the cube axes configuration defines Axis1 1530 and Axis2 1540 in addition to Axis0 1520 and SlicerAxis 1550. In some embodiments, the cube axes configuration could also define Axis3, Axis4, etc. In some embodiments, the cube axes configuration may only define Axis1 1530 in addition to Axis0 1520 and SlicerAxis 1550. The cube axes configuration of such embodiments can be used to render a simple list.

C. Cube Data

As mentioned above, some embodiments display or render a cube view based on cube data. In some such embodiments, the cube data is retrieved by formulating a query based on a cube axes configuration. In some embodiments, the retrieved cube data is stored in a cube cache. In some embodiments, the cube cache is a storage structure or a computer file (e.g., XML file) that includes all available cube data. For some embodiments of the inventions, FIG. 20 shows an example format of a cube data file. Specifically, this figure illustrates a cube cache file 2000 that is used to present the interactive matrix shown in FIG. 10.

As shown in FIG. 20, the XML cube cache file 2000 includes several cells. Each of these cells includes (1) a particular data value of the cell and (2) metadata that describes the cell. For example, a cell 2010 has a value of 35. Also, the metadata of the cell 2010 indicates that it is the cached data for the measure "computer count" at the intersection of member "Dell Inc." of hierarchy "computer—manufacturer" and member "server" of hierarchy "computer—system role". Similarly, a cell 2020 has a value of 4737. The metadata of the cell 2020 indicates that it is the cached data for the measure "program count" at the intersection of member "Dell Inc." of hierarchy "computer—manufacturer" and member "server" of the hierarchy "computer—system role". Furthermore, a cell 2030 has a value of 21. The metadata of the cell 2030 indicates that it is the cached data for the measure "computer count" at the intersection of member "Dell Inc." of hierarchy "computer—manufacturer" and member "server" of hierarchy "computer—system role". Also, a cell 2040 has a value of 3456. The metadata of the cell 2040 indicates that it is the cached data for the measure "program count" at the intersection of member "Dell Inc." of hierarchy "computer—manufacturer" and member "server" of hierarchy "computer—system role".

At any given time, the cube cache of some embodiments can have more or less cube data than a set of cube data required to completely render a cube view for a cube axes configuration. When a result set that is required to render the cube view does not exist in the cube cache, the cube browsing system of some embodiments renders the cube view with a set of default values. For example, if the computer count for servers manufactured by Dell Inc. does not exist in the cube cache, a default value of "0" will be displayed for the corresponding cell in an interactive matrix.

FIG. 21 shows the cube cache file 2000 after a member on the first axis is expanded as illustrated in FIG. 11. Specifically, FIG. 21 illustrates the cube cache file 2000 after a member of hierarchy "computer—manufacturer" is expanded. As illustrated in FIG. 21, the XML cube cache file 2000 added several new cells based on the expansion. For example, a cell 2110 has a value of 9. The metadata of the cell 2110 indicates that it is cached data for the measure "computer count" at the intersection of member "Dell Inc." of hierarchy "computer—manufacturer", member "PowerEdge SC440" of hierarchy "computer—model", and member "server" of hierarchy "computer—system role". Similarly, a cell 2120 has a value of 1453. The metadata of the cell 2120 indicates that it is the cached data for the measure "program count" at the intersection of member "Dell Inc." of hierarchy "computer—manufacturer", member "PowerEdge SC440" of hierarchy "computer—model", and member "server" of the hierarchy "computer—system role".

In some embodiments, data values of the cell 2110 and 2120 are dynamically retrieved based on an expansion operation. For example, in FIG. 11, when the user expands the hierarchy "computer—model", the expansion causes the cube browsing system of some embodiments to retrieve cube data (e.g., from the multidimensional database, from a previously cached storage).

FIG. 22 shows the cube cache file 2000 after a member on the second axis is expanded as illustrated in FIG. 12. Specifically, FIG. 22 illustrates the cube cache file 2000 after a member of hierarchy "computer—system role" is expanded. As illustrated in FIG. 22, the XML cube cache file 2000 added several new cells, each of which has a value and several pieces of metadata describing the cell. For example, cell 2210 has a value of 435. The metadata of cell 2210 shows that it is the measure "program count" at the intersection of member "Dell Inc." of hierarchy "computer—manufacturer", member "PowerEdge SC440" of hierarchy "computer—model", member "server" of hierarchy "computer—system role", and member "x64-based PC" of hierarchy "computer—system type". Similarly, cell 2220 has a value of 5. The metadata of cell 2220 shows that it is the measure "computer count" at the intersection of member "Dell Inc." of hierarchy "computer—manufacturer", member "PowerEdge SC440" of hierarchy "computer—model", member "server" of the hierarchy "computer—system role", and member "X86-based PC" of hierarchy "computer—system type". Both cell 2210 and 2220 are retrieved because the hierarchy "computer—system type" is expanded because of user interaction with the interactive matrix as illustrated in FIG. 12.

Figure 23:
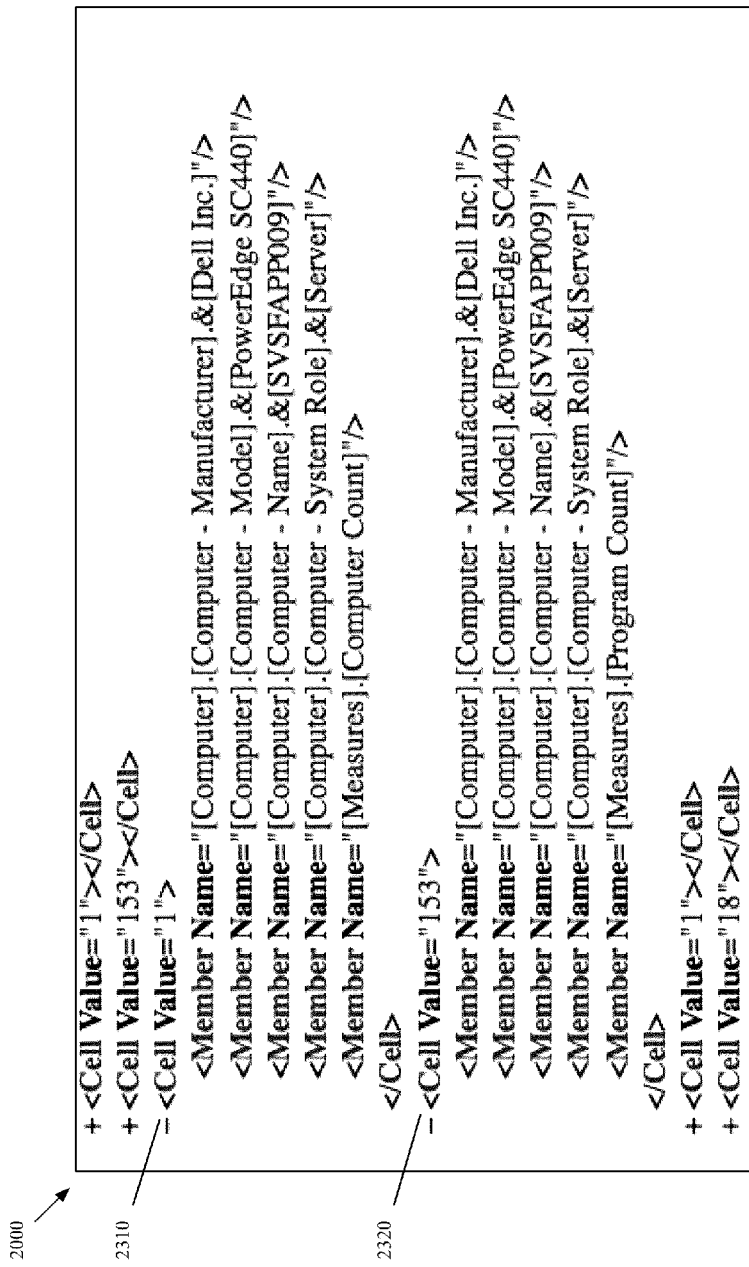
FIG. 23 shows the cube cache file after a member of an expanded hierarchy on the first axis is expanded.

FIG. 23 shows the cube cache file 2000 after a member of an expanded hierarchy on the first axis is expanded as illustrated in FIG. 13. Specifically, FIG. 23 illustrates the cube cache file 2000 after a member of hierarchy "computer—model" is expanded. As illustrated in FIG. 23, the XML cube cache file 2000 added several new cells, each of which has a value and several pieces of metadata describing the cell. For example, cell 2310 has a value of 1. The metadata of cell 2310 shows that it is the measure "computer count" at the intersection of member "Dell Inc." of hierarchy "computer—manufacturer", member "PowerEdge SC440" of hierarchy "computer—model", member "SVSFAPP009" of hierarchy "computer—name", and member "server" of hierarchy "computer—system role". Similarly, cell 2320 has a value of 153. The metadata of cell 2320 shows that it is the measure "program count" at the intersection of member "Dell Inc." of hierarchy "computer—manufacturer", member "PowerEdge SC440" of hierarchy "computer—model", member "SVSFAPP009" of hierarchy "computer—name", and member "server" of the hierarchy "computer—system role". Both cell 2310 and 2320 are retrieved because the hierarchy "computer—name" is expanded as a result of user interaction with the interactive matrix as illustrated in FIG. 13.

IV. An Example Cube-Browsing Client with Multiple Cube Views

The cube viewer of some embodiments can generate more than one cube view each time it receives new cube and presentation data from the MDDS, and can quickly switch between these cube views at different instances in time (e.g., in response to different user interactions). For instance, in some embodiments, the viewer presents one cube view as an interactive presentation (e.g., an interactive matrix) that a user can manipulate to interactively obtain a particular perspective of the underlying cube data. In conjunction with the interactive presentation, the viewer of some embodiments generates other cube views (such as charts (e.g., pie charts, bar charts), graphs, tables, lists, etc.) and displays these other cube views in response to interactions with the interactive presentation. For example, one or more graphs or charts may be displayed upon a user selecting (e.g., clicking on a cursor, moving the cursor over, etc.) a member or cell of the interactive presentation. By pre-generating these other cube views, the viewer can quickly display them as needed when the user interacts with the interactive presentation. Also, in some embodiments, the viewer can simultaneously display different cube views that provide different perspectives of the same segment of a cube, or provide different views of different segments of the cube.

Figure 24:
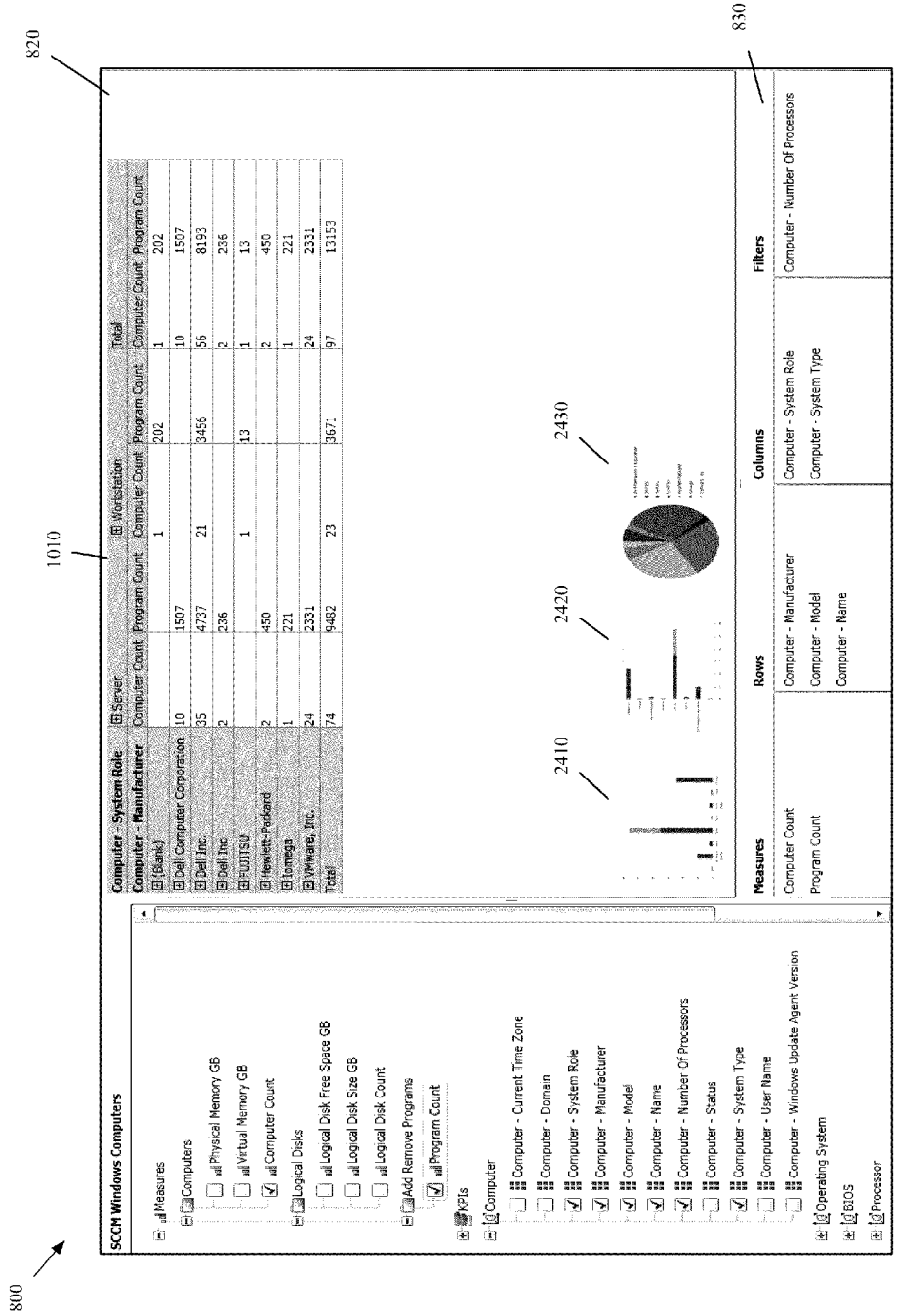
FIG. 24 illustrates an example of a cube-browsing client that renders multiple cube views or presentations.

FIG. 24 illustrates an example of a cube-browsing client that renders multiple cube views or presentations. Specifically, this figure shows an interactive matrix 1010, a column chart 2410, a bar chart 2420, and a pie chart 2430 on the cube display area 820 of the GUI 800. In some embodiments, each of these cube views is a presentation of a segment of available portion of the cube.

The interactive matrix 1010 is similar to the one described above by reference to FIGS. 10-13. However, in addition to the interactive matrix 1010, the cube-browsing client simultaneously displays several thumbnails of the other presentations in the cube display area 820. This allows a user to view the underlying cube data from different perspectives at the same time. In some embodiments, each of the presentations is based on a portion of the cube data retrieved from a cube database. As mentioned above, the portion of the cube data in some embodiments is retrieved according to one or more entities specified in the cube axes configuration.

In the example illustrated in FIG. 24, when an end-user selects the thumbnail of a particular presentation (e.g., through a cursor, through the application's user touching a touch screen), the particular presentation is scaled to fill up the primary display area whereas the interactive matrix 1010 is scaled down. In this example, each of the thumbnails of the different presentations is also repositioned accordingly. The cube-browsing client of some embodiments provides options for selecting a set of cube presentations to display. In some embodiments, the selection of a particular presentation causes the cube-browsing client to update the cube axes configuration. This updated cube axes configuration is then evaluated in order to render the particular cube presentation. In some embodiments, the modification to the cube axes configuration instigates a request to the cube database and/or the cube cache to retrieve additional cube data.

As shown in FIG. 24, four different types of presentations are shown. However, one of ordinary skill in the art will realize that different types and/or numbers of presentations could be used to differently present the cube view. For example, instead of displaying four presentations simultaneously, the cube-browsing client could display three or five presentations at the same time. In addition, instead of displaying the types of presentations described above, the cube-browsing client could display a graph, a table, a list, or some other visualization forms.

Figure 25A:
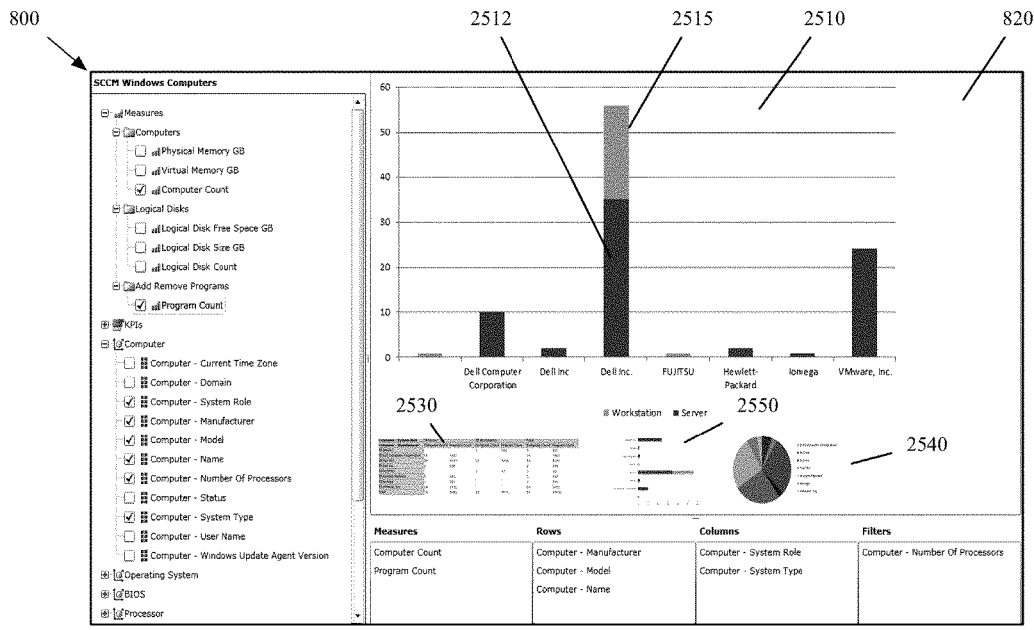
FIG. 25A shows an example of a column chart view that is simultaneously displayed with several other cube views.

FIG. 25A shows an example of a column chart view that is rendered simultaneously with several other cube views. Specifically, this figure shows a column chart 2510 displayed in the primary area of the cube display area 820 while an interactive matrix 2530, a bar chart 2550, and a pie chart 2540 are simultaneously displayed as thumbnails in the cube display area 820.

In the example illustrated in FIG. 25A, the column chart 2510 displays several columns, each of which represents a particular computer manufacturer. There might be two regions on each column, one region 2512 that is drawn in black color represents a measure relating to servers of that particular manufacturer and the other region 2515 that is drawn in gray color represents a measure relating to workstations of the particular manufacturer.

Figure 25B:
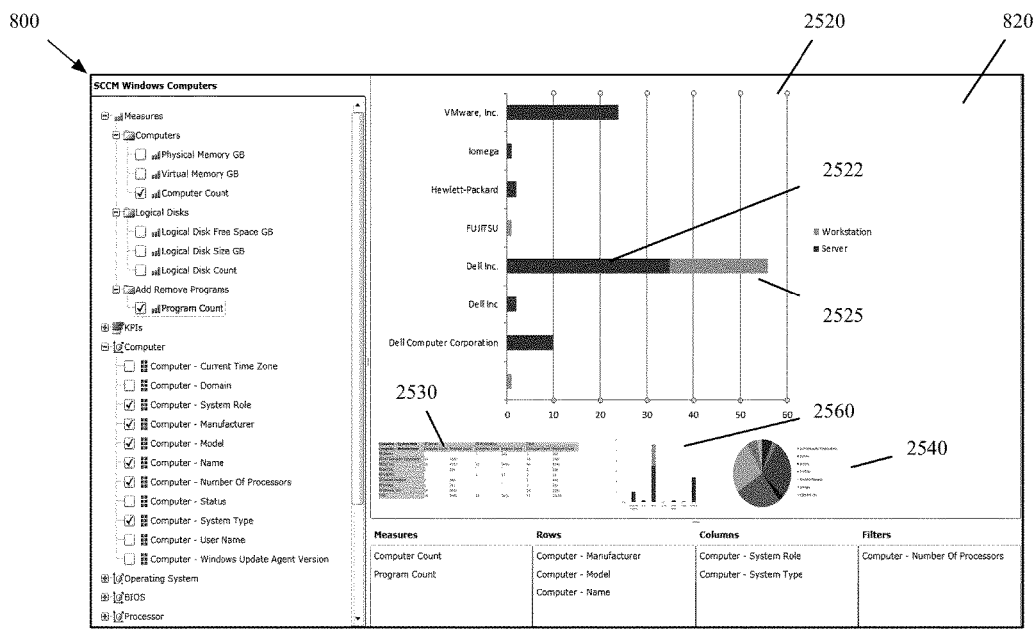
FIG. 25B shows an example of a bar chart view that is concurrently displayed with several other cube views.

FIG. 25B shows an example of a bar chart view that is rendered simultaneously with several other cube views. Specifically, this figure shows a bar chart 2520 displayed in the primary area of the cube display area 820 while an interactive matrix 2530, a column chart 2560, and a pie chart 2540 are simultaneously displayed as thumbnails in the cube display area 820. The bar chart 2520 displays several bars, each of which represents a particular computer manufacturer. There might be two regions on each bar, one region 2522 that is drawn in black color represents a measure relating to servers of that particular manufacturer and the other region 2525 that is drawn in gray color represents a measure relating to workstations of the particular manufacturer.

FIGS. 17A and 17B illustrate several thumbnails being selected by the end-user. The scaled up cube view displayed in the primary area of the cube display area 820 and the cube views in thumbnails all show the same representation or a segment of the same available portion of a cube based on the current cube axes configuration. In the example described above, several different cube views are generated using the cube definition, the cube axes configuration, and the cube data. One of ordinary skill in the art would understand that different cube views can be generated using these separate data structures. In addition, one of ordinary skill in the art would understand that a user can differently interact with each of the presentations.

Figure 26:
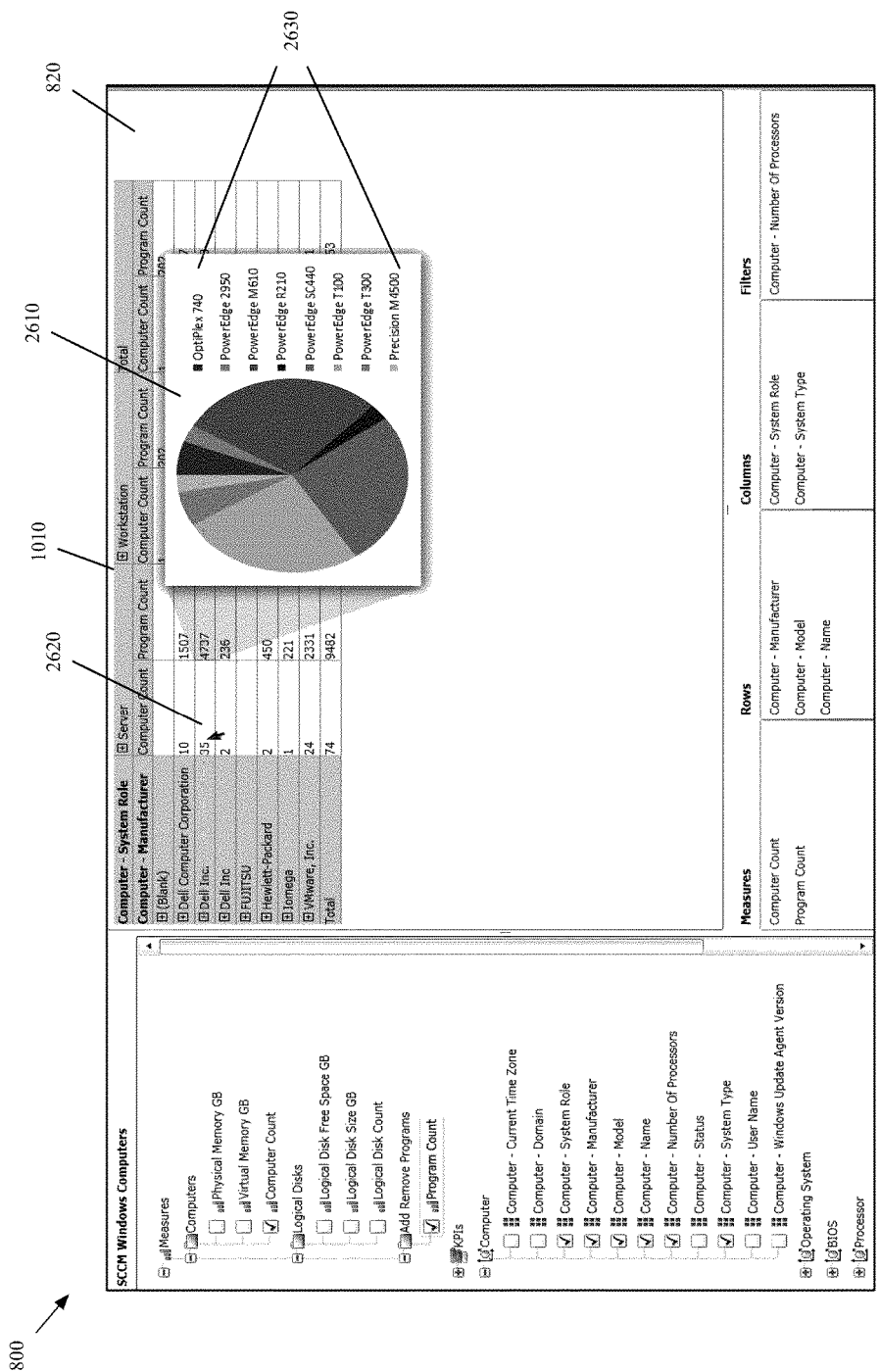
FIG. 26 illustrates an example of displaying a cube view based on a user's interaction with an item in another cube view.

As mentioned above, the cube-browsing client of some embodiments renders a cube view and dynamically generates one or more other cube views based on user-interaction with the cube view. For example, one or more graphs or charts may be displayed upon a user selecting (e.g., clicking on a cursor, moving the cursor over, etc.) a member or cell of an interactive matrix. FIG. 26 illustrates such an example of a cube view that is dynamically updated with an additional cube view. Specifically, in the cube display area 820 of the GUI 800, a position indicator hovers over a cell 2620 on an interactive matrix 1010 and causes a pie chart 2610 to be displayed as a tooltip overlaying the interactive matrix. The cell 2620 represents that there are 35 sever computers manufactured by Dell Inc. The pie chart 2610 shows the relative proportions of the number of different computer models 2630 among those 35 computers.

In some embodiments, the cube-browsing client detects that a user has selected an element (e.g., a member name or a cell in the grid of an interactive matrix) for a set period of time (e.g., two seconds). For example, the user has moved a position indicator (e.g., a cursor) over the element for the set period of time. If the position indicator hovers over the element more than the set period of time, the cube-browsing client determines that a tooltip detail overlay should be presented. The cube-browsing client then reviews the cube axes configuration and the cube cache to determine whether the data for the tooltip overlay is stored in the cube cache. If the data is in the cube cache, the cube-browsing client renders the tooltip overlay immediately. If the data is not in the cube cache, it queries the sever asynchronously for the result data set. Once the result data set has been processed, the cube-browsing client determines whether the current user interaction is still valid. If it is still valid, the tooltip overlay presentation will be rendered. This is the same operation in building a query as the one performed by an expansion operation. However, the rendering result is different.

Figure 27:
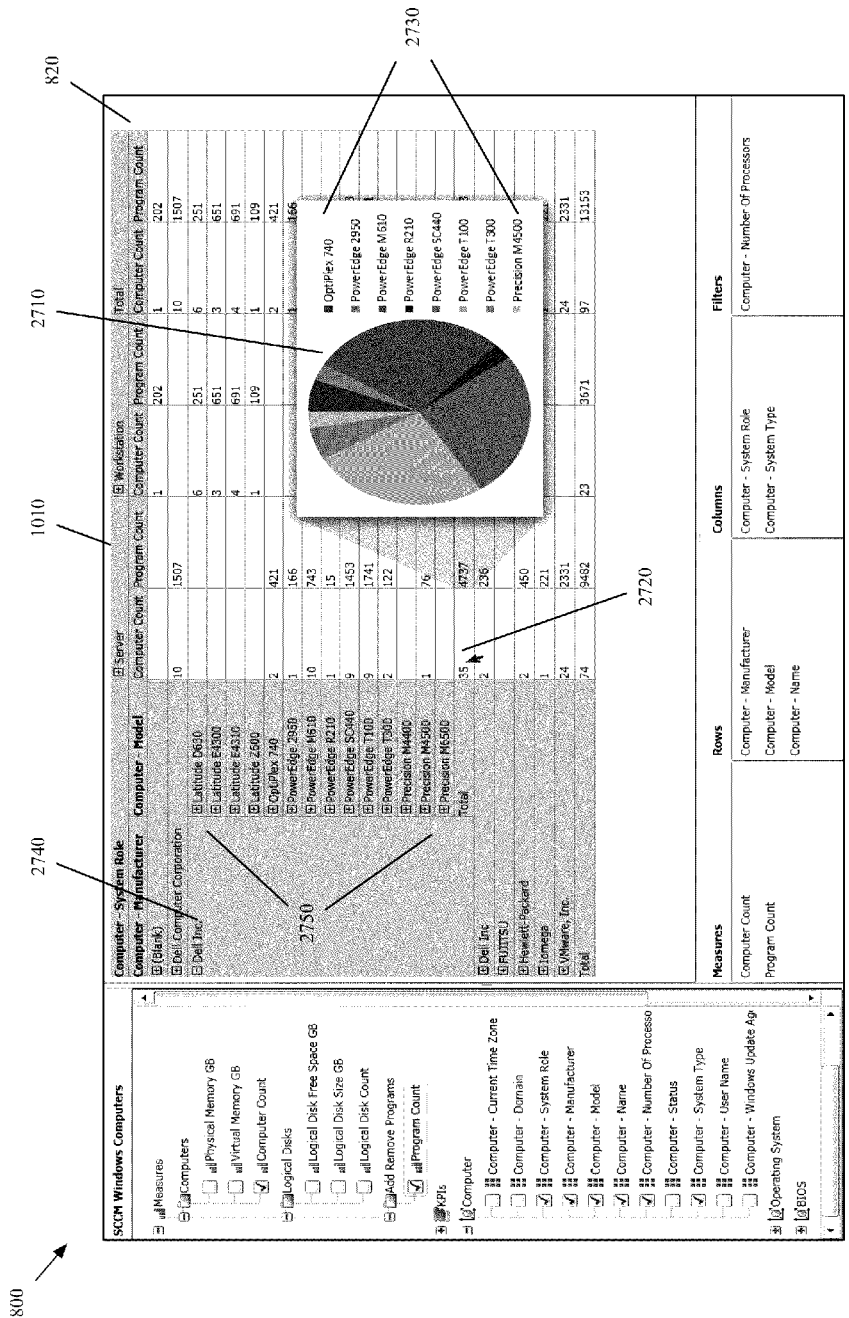
FIG. 27 illustrates another example of displaying multiple cube views.

FIG. 27 shows another example of tooltip overlay presentation. Similar to FIG. 26, in the cube display area 820 of the GUI 800, a position indicator hovers over a cell 2720 on an interactive matrix 1010 and causes a pie chart 2710 to be displayed as a tooltip overlaying the interactive matrix. The cell 2720 represents that there are 35 sever computers manufactured by Dell Inc. The pie chart 2710 shows the relative proportions of the number of different computer models 2630 among those 35 computers. However, in the current example, the root level member "Dell Inc." 2740 has been expanded and the next level hierarchy members 2750, which are a set of computer models, have been displayed on the interactive matrix 1010. As a result, the cube-browsing client has already retrieved data relating to those computer models and stored them in the cube cache. The pie chart 2710 is exactly the same as the one shown in FIG. 26. However, because the data is already retrieved and stored in the cube cache, the cube-browsing client does not need to query the sever for the data in the current example and the tooltip overlay presentation will be displayed immediately after the end-user hovers the position indicator over cell 2720 over a period of time.

Figure 28:
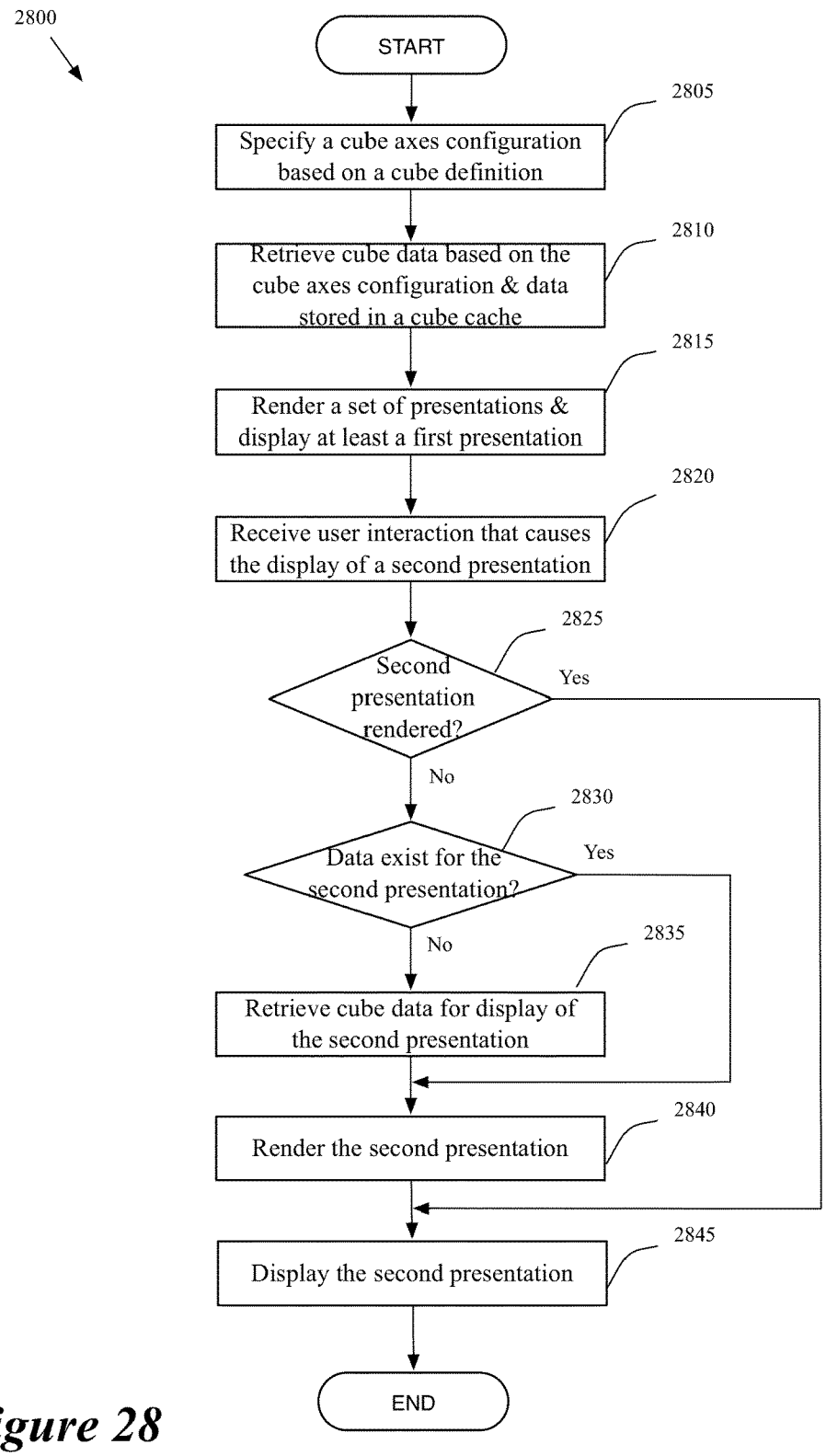
FIG. 28 conceptually illustrates a process that some embodiments perform to display multiple cube views or presentations.

FIG. 28 conceptually illustrates a process 2800 that some embodiments perform to display multiple cube views or presentations. In some embodiments, the process 2800 is performed by the cube-browsing client. As shown in FIG. 28, the process 2800 specifies (at 2805) a cube axes configuration based on a cube definition. As mentioned above, the cube axes configuration includes a subset of entities from the cube definition, and indicates the relationships between this subset of entities.

The process 2800 then retrieves (at 2810) cube data based on the cube axes configuration and data stored in a cube cache. In some embodiments, this operation includes generating one or more queries based on the cube axes configuration and data in the cube cache, executing the queries against the cube database to receive a result set, and updating the cube cache and the cube axes configuration based on the result set.

At 2815, the process 2800 renders a set of presentations and displays at least a first presentation on a display. In some embodiments, the display operation includes displaying the first presentation in the primary area of the display and displaying the other presentations as thumbnails. In some embodiments, only the first presentation is displayed and the other presentations are hidden from the view.

The process 2800 then receives (at 2820) user interaction which causes a second presentation to be displayed. A user interaction may cause a change in the cube axes configuration. The change then instigates an update in the display, e.g., updating the first presentation and displaying the second presentation. In some embodiments, the user interaction is selecting the thumbnail representing the second presentation. In some embodiments, the user interaction is hovering a position indicator over an element in the first presentation for a set period of time (e.g., two seconds).

The process 2800 determines (at 2825) whether the second presentation is already rendered. When the second presentation is already rendered, the process 2800 proceeds to 2845, which will be described below. When the second presentation has not been rendered, the process 2800 determines (at 2830) whether the data for rendering the second presentation is already stored in the cube cache. In some embodiments, this operation includes reviewing the cube axes configuration and the cube cache.

When the data for rendering the second presentation exists in the cube cache, the process 2800 proceeds to 2840, which will be described below. When the data for rendering the second presentation has not been stored in the cube cache, the process 2800 retrieves (at 2835) cube data for displaying the second presentation. In some embodiments, this operation includes generating one or more queries based on the cube axes configuration and data in the cube cache, executing the queries against the cube database to receive a result set, and updating the cube cache and the cube axes configuration based on the result set.

At 2840, the process 2800 renders the second presentation. In some embodiments, this operation also updates the set of rendered presentations based on the updated cube axes configuration and cube cache. The process 2800 then displays (at 2845) the second presentation. After displaying the second presentation, the process 2800 terminates.

V. Example Operations of Cube-Browsing Client

In the example described above, the cube browsing system performs a number of different operations to display a cube view. In some embodiments, these operations include (1) cube initialization, (2) cube axes configuration analysis, (3) data retrieval, (4) rendering, (5) expanding and collapsing data, and (6) intelligent caching and querying. Several example processes for such operations will now be described below by reference to FIGS. 29-38.

A. Cube Client Initialization

Figure 29:
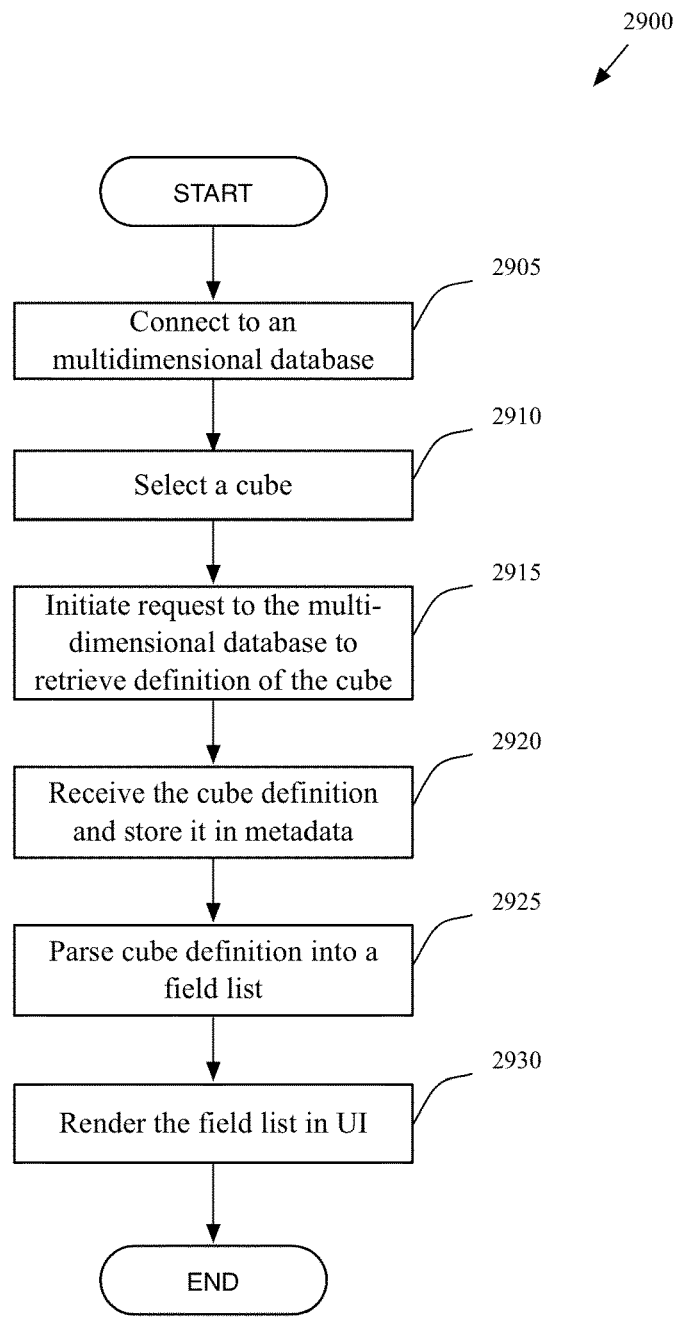
FIG. 29 conceptually illustrates a process that some embodiments use to initialize a cube-browsing client with a cube definition.

For some embodiments of the invention, FIG. 29 conceptually illustrates a process 2900 for initializing a cube-browsing client with a cube definition. In some embodiments, the process 2900 is an elaboration of the initialization operation 705 illustrated in FIG. 7. In some embodiments, the purpose of the process 2900 is to provision or provide a generic cube-browsing UI with the cube definition. This allows an end-user to create or modify a cube axes configuration by selecting different entities from the cube definition.

Process 2900 of some embodiments starts when a cube-browsing client application is launched. As shown in FIG. 29, the process 2900 begins by connecting (at 2905) to a multidimensional database. The process 2900 then selects (at 2910) a cube. In some embodiments, the cube-browsing client includes one or more user-selectable items that a user can use to select which multidimensional database to connect to and/or which cube to select. In some embodiments, some or all of these parameters for creating the connection and selecting the cube are pre-defined. In other words, the user does not need to provide any input for the cube-browsing client application to make the connection and/or selection.

The process 2900 then initiates (at 2915) a request to the multidimensional database to retrieve a definition of the cube. At 2920, the process 2900 receives the cube definition and stores it in metadata in order to present the cube definition in a user interface (UI). As mentioned above, the cube definition of some embodiments is in a XMLA format.

The process 2900 then parses (at 2925) the cube definition into a field list. In some embodiments, the parsing entails parsing the XMLA cube definition to identify measure groups and associated measures, key performance indicators (KPIs), dimensions, etc. At 2930, the process 2900 renders the field list in the UI. The process 2900 then ends.

In some embodiments, the process 2900 is performed independently from operations relating to rendering of the cube view. The process 2900 of some embodiments is an input to any cube-browsing client. That is, the first point of user interaction generally starts with viewing the entities that define the cube, including measure groups, measures, KPIs, dimensions, etc. In some embodiments, the process 2900 does not place a constraint on the actual configuration (e.g., the cube axes configuration) or rendering that occurs after the process ends.

In addition, the process 2900 of some embodiments supports a UI manifestation of the cube with multiple axes. Alternatively, the process 2900 supports a UI manifestation of the cube with one axis in the case of a simple grid or chart. In some embodiments, the process 2900 supports a UI manifestation of the cube with three axes (rows, columns, and filters) in the case of an interactive matrix as described above by reference to FIGS. 10-13. Therefore, the process 2900 supports any manifestation of a cube-browsing UI that leverages the entities within a cube definition as a part of describing its cube axes configuration.

B. Presentation Configuration

Figure 30:
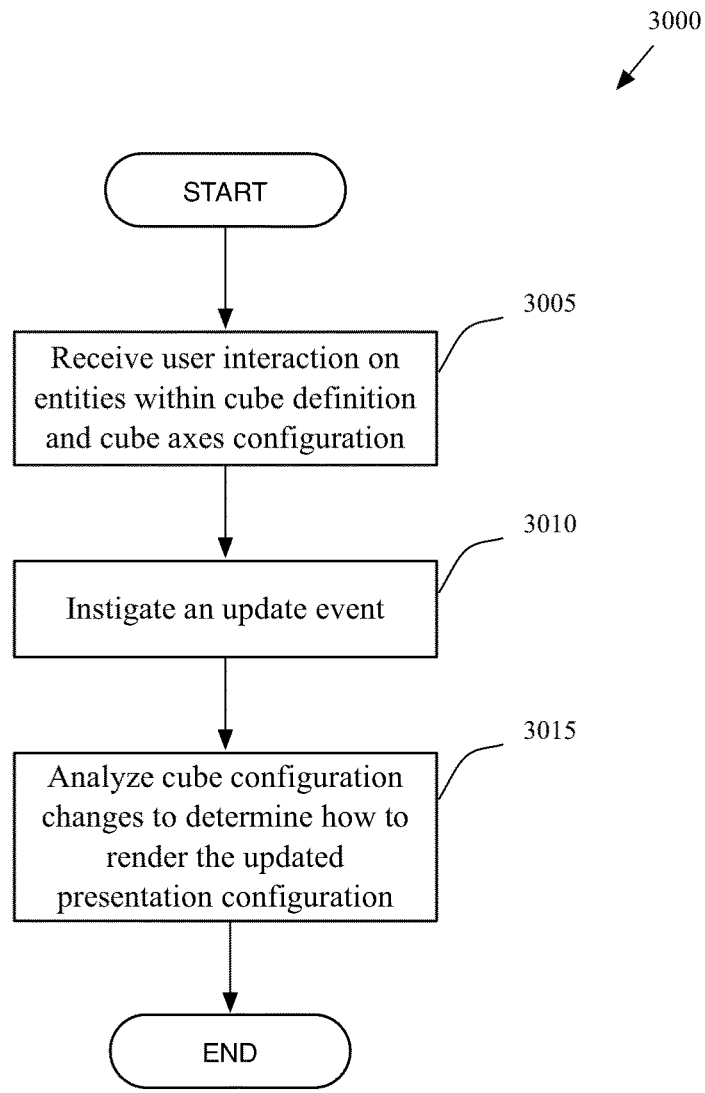
FIG. 30 conceptually illustrates a process for configuring a cube view.

FIG. 30 conceptually illustrates a process 3000 for configuring presentation of a cube view. Specifically, this figure illustrates a process 3000 for receiving user interaction to configure the cube view and analyzing configuration changes to determine how to render the cube view. In some embodiments, the configuration changes are associated with the creation and/or modification to a particular cube axes configuration. In some embodiments, the process 3000 begins after a cube definition is initialized. An example initialization process is described above by reference to FIG. 29.

As shown in FIG. 30, the process 3000 begins by receiving (at 3005) user interactions on entities within a cube definition and a cube axes configuration. In some embodiments, the user interactions include expanding or collapsing field list tree items, checkbox activation on a field list, drag and drop operations, different cursor or touch operations (e.g., right clicking on an item). In some embodiments, different entities (e.g., measures, dimension attributes) are added or removed from cube axes configuration, thus potentially changing the cube presentation.

The process 3000 then instigates (at 3010) an update event. In some embodiments, the update event is automatically triggered when the configuration has changed. Alternatively, the update event is triggered manually (e.g., with a user's selection of a UI item, hotkey, etc.).

At 3015, the process 3000 then analyzes cube configuration change to determine how to render the updated presentation configuration. In some embodiments, this operation is equivalent to analysis operation 720 illustrated in FIG. 7. In some embodiments, the analysis operation entails identifying updates to the cube view based on configuration changes made at 3005. In some embodiments, the process 3000 checks at what level to start the changes. Based on the level to start the changes, the process 3000 then decides on appropriate rendering operations to reflect the changes. In some embodiments, the analysis operation includes evaluating the cube axes configuration to determine how to render the updated cube view. For example, if the process 3000 determines that a root hierarchy in Axis1 or Axis2 of the cube axes configuration has changed, the process will run the render root operation.

C. Cube Data Retrieval

As described above, a cube-browsing client of some embodiments retrieves cube data by sending a query (e.g., a MDX query) to a multidimensional database. In some embodiments, the query result set is returned in XML format. FIG. 31 shows an example format of a query result set (e.g., a MDX query result set) contained in a XML file. As shown, the MDX query results 3100 include an "OlapInfo" element 3110, an "Axes" element 3120, and a "CellData" element 3150.

The "OlapInfo" element 3110 contains metadata about the cube, the cube axes configuration, and the format of cube data. The "Axes" element 3120 includes information related to three axes: "Axis0" 3125, "Axis1" 3130, and "SlicerAxis" 3145. "Axis0" 3125 describes the measures included in this query. In this example, the measures are computer count and program count. "Axis1" 3130 includes "tuples" 3132, which in turn includes several tuples. Each tuple contains detailed location information about where the returned cube data belongs or should be displayed in the cube view. For example, tuple 3135 includes three hierarchy members: member "all" of hierarchy "computer—system type" 3138, member "all" of hierarchy "computer—manufacturer" 3140, and member "server" of hierarchy "computer—system role" 3142. As such, tuple 3135 indicates associated cube data (cells) are the measures for servers of all computer manufacturers and all computer system types. "SlicerAxis" 3145 describes filter information related to the query. In some embodiments, the member information for each hierarchy contained in the MDX query results 3100 is used to update the cube axes configuration.

In some embodiments, the "CellData" element 3150 includes the entire set of cube data returned from the MDX query. Each "cell" in the "CellData" element 3150 contains a returned cube data. For example, cell 3152 contains a cube data that has a value of 74 and cell 3156 contains a cube data that has a value of 9482.

Since there are two measures (computer count and program count) in the cube axes configuration, every tuple is associated with two cells. In the example illustrated in FIG.

31, cell 3152 and cell 3156 are associated to tuple 3135 because these two cells are the first two cells in "CellData" 3150 and tuple 4335 is the first tuple in "Axis1" 3130. Here, the MDX query results 3100 indicates that the computer count for servers of all system types and all manufacturers is 74, and the program count for servers of all system types and all manufacturers is 9482.

Figure 32:
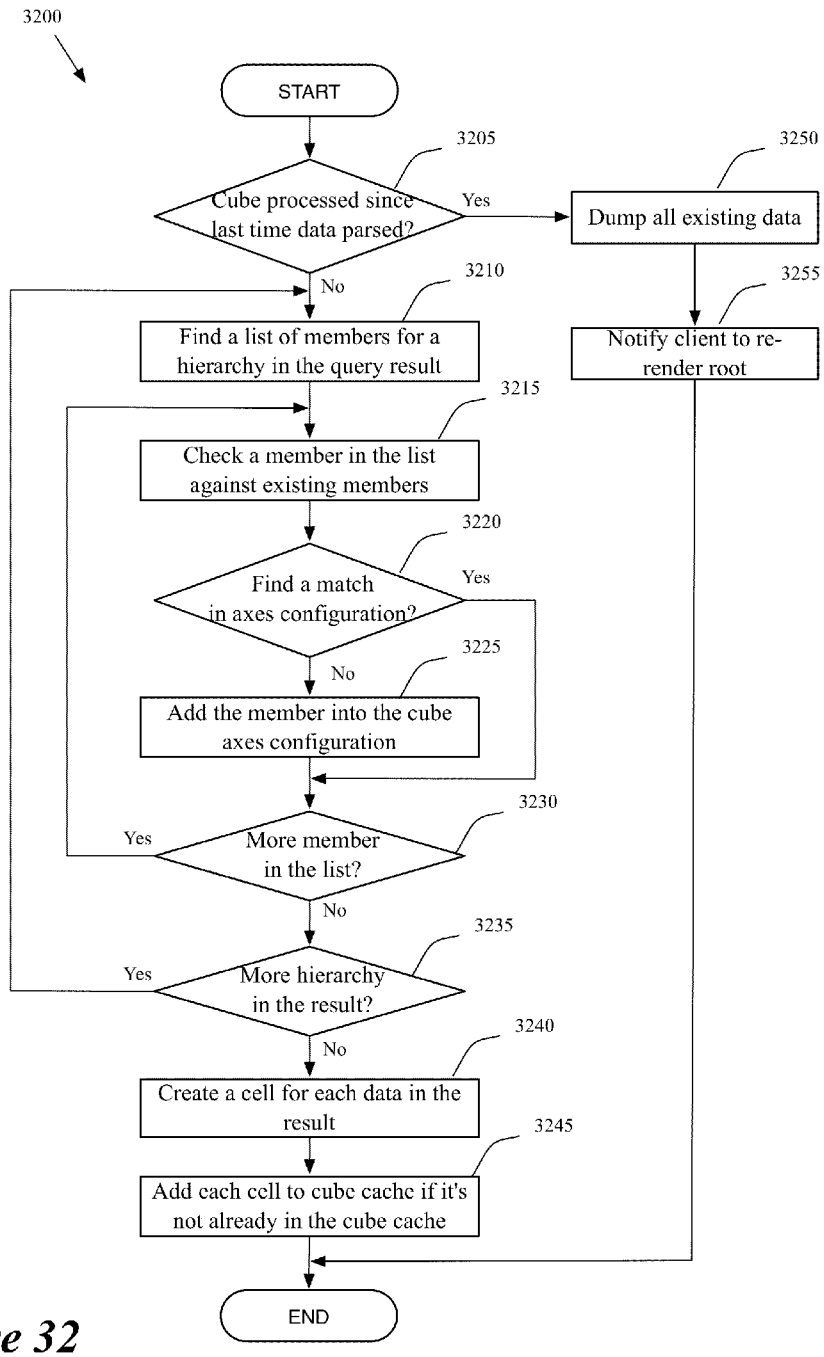
FIG. 32 conceptually illustrates a process that some embodiments use to parse a query result set.

FIG. 32 conceptually illustrates a process that some embodiments use to parse a MDX query result set. The purpose of process 3200 is to parse the MDX query result set to extract cube data and metadata to update cube cache and cube axes configuration. Process 3200 of some embodiments starts when a MDX query result set is received at the cube-browsing client.

As shown in FIG. 32, the process 3200 begins by determining (at 3205) whether the cube has been processed since the last time a MDX query result set was received and parsed. When the process 3200 determines (at 3205) that the cube has been processed, the process dumps (at 3250) all existing data. In some embodiments, this means deleting all cube data in the cube cache and throwing away the received MDX query result set. The process 3200 then notifies (at 3255) the cube-browsing client to re-render the root of cube presentation. After sending out the notice to the cube-browsing client at 3255, the process 3200 terminates.

When the cube has not been processed, the process 3200 finds (at 3210) a list of members for a hierarchy in the query result set. The process 3200 then checks (at 3215) a member in the member list against existing members for that hierarchy in the cube axes configuration. At 3220, the process 3200 determines whether a match for that member is found in the cube axes configuration.

When there is a match for the member in the cube axes configuration, the process 3200 proceeds to 3230 which is described below. When there is no match, the process 3200 adds (at 3225) the member to the cube axes configuration. Here, the cube axes configuration is dynamically updated based on the MDX query result set. Specifically, the process 3200 adds each member in the member that is not already contained in the cube axes configuration. The process 3200 then proceeds to 3230, which is described below.

At 3230, the process 3200 then determines whether there are more members in the member list. When there are more members in the member list, the process 3200 returns to 3215, which is described above. Otherwise, the process 3200 determines (at 3235) whether there is any other hierarchy in the query result set.

When the there is another hierarchy, the process 3200 returns to 3210, which is described above. When the process 3200 determines (at 3235) that there is no additional hierarchy in the query result, the process creates (at 3240) a cell for each cube data in the query result set. The process 3200 then adds (at 3245) each cell into the cube cache if the cell does not already exist in the cube cache. Here, the cube cache is dynamically updated with cube data from the MDX query result set. Specifically, the process 3200 populates the cube cache with cell data when the cell data is not stored in the cache. After adding cells into the cube cache at 3245, the process 3200 terminates.

D. Matrix Grid Root Rendering

Figure 33:
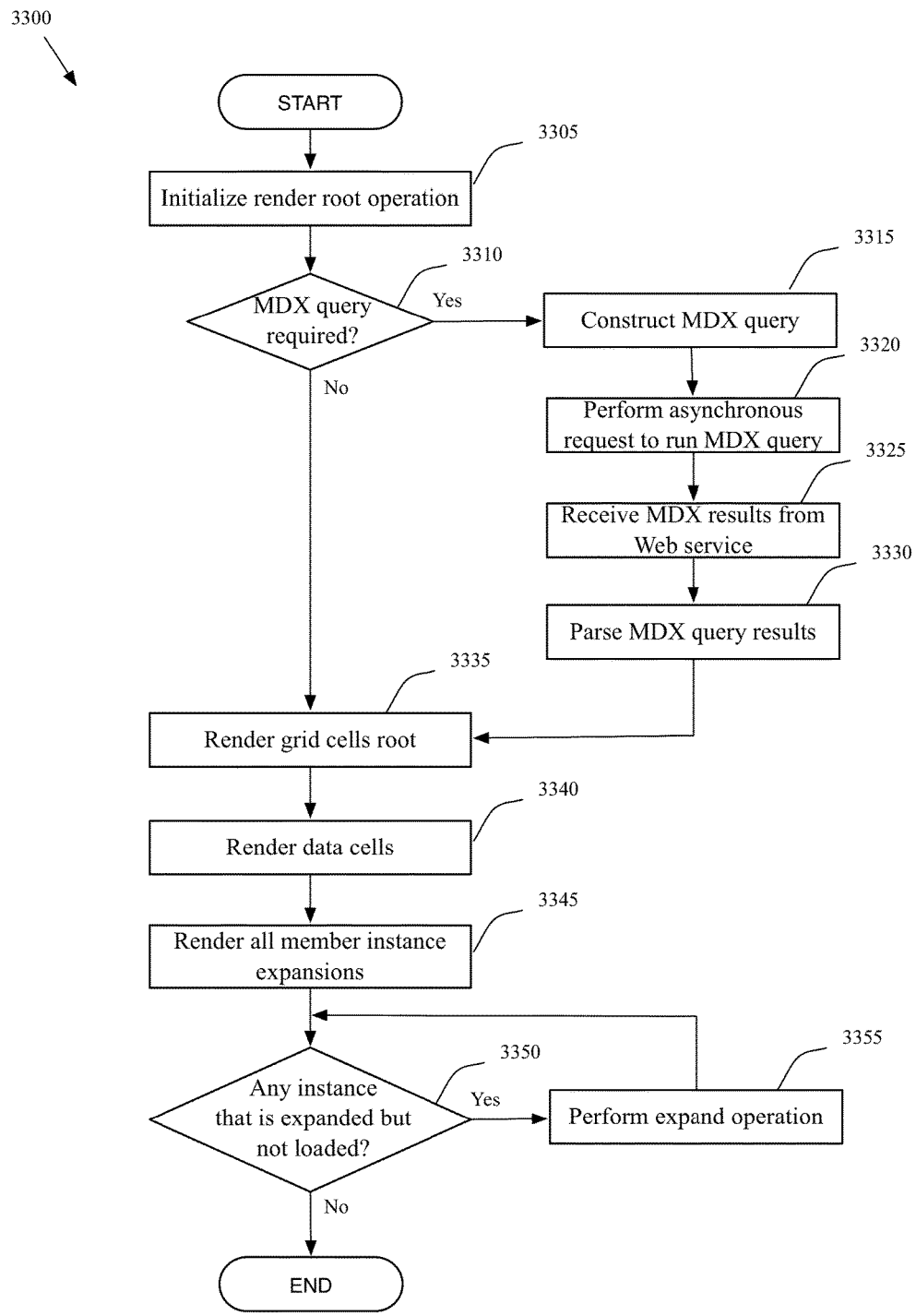
FIG. 33 conceptually illustrates a process that some embodiments perform to render a matrix grid root of a cube presentation.

FIG. 33 conceptually illustrates a process 3300 that some embodiments perform to render a matrix grid root of a cube presentation. In some embodiments, a cube-browsing client performs the process 3300. In some embodiments, the process 3300 is related to operation 730 illustrated in FIG. 7. Process 3300 of some embodiments is the foundation of the rendering process for cube-browsing client implementations that render cube data as an interactive matrix.

Process 3300 of some embodiments starts when a cube-browsing client application determines that it needs to render the matrix grid root. As shown in FIG. 33, the process 3300 begins by initializing (at 3305) the grid root rendering operation. This may include reset grid axes, reset cell queue, reset the cube grid to an empty grid with no columns or rows, and some other operations. This may also include consulting the cube axes configuration to add one column for each hierarchy in Axis1 as placeholders for member cells, add one row for each hierarchy in Axis2 as placeholders for member cells, and add one or more rows as placeholders for measures in Axis0. The process 3300 then determines (at 3310) whether any MDX query is required to render the grid root.

When the process 3300 determines (at 3310) that a MDX query is required, the process constructs (at 3315) a root MDX query. In order to construct a root MDX query, the process 3300 of some embodiments analyzes the cube axes configuration. In some embodiments, the analysis entails identifying which measures are defined in Axis0 and which root hierarchies are defined in Axis1 and Axis2, and constructing the query accordingly. The process 3300 then performs (at 3320) asynchronous request to run the MDX query via Web service. At 3325, the process 3300 receives a MDX query result set from Web service. The process 3300 then parses (at 3330) the MDX query result set. After the parsing of MDX query result set, the process 3300 proceeds to 3335, which is described below.

When the process 3300 determines (at 3310) that a MDX query is not required, the process renders (at 3335) grid cells root. In some embodiments, the process 3300 makes this determination by analyzing the cube axes configuration. For example, the process 3300 of some embodiments may check if there are any hierarchies in Axis1 and Axis2. If there are Axis1 and Axis2 hierarchies, the process 3300 finds a list of members for each root hierarchy in the cube axes configuration and renders the grid cells root accordingly.

The process 3300 then renders (at 3340) data cells based on data in the cube cache. In some embodiments, if the cube data for a particular cell is not stored in the cube cache, the process renders a default value for the cell. At 3345, the process 3300 renders all member instance expansions. The process 3300 then determines (at 3350) whether there is any instance that is expanded but not loaded.

When there is an instance that is expanded but not loaded, the process performs (at 3355) a expand operation. The process 3300 then returns to 3350. When the process 3300 determines (at 3350) that all expanded instances are loaded and rendered, the process terminates.

E. Axis Expansion

Figure 34:
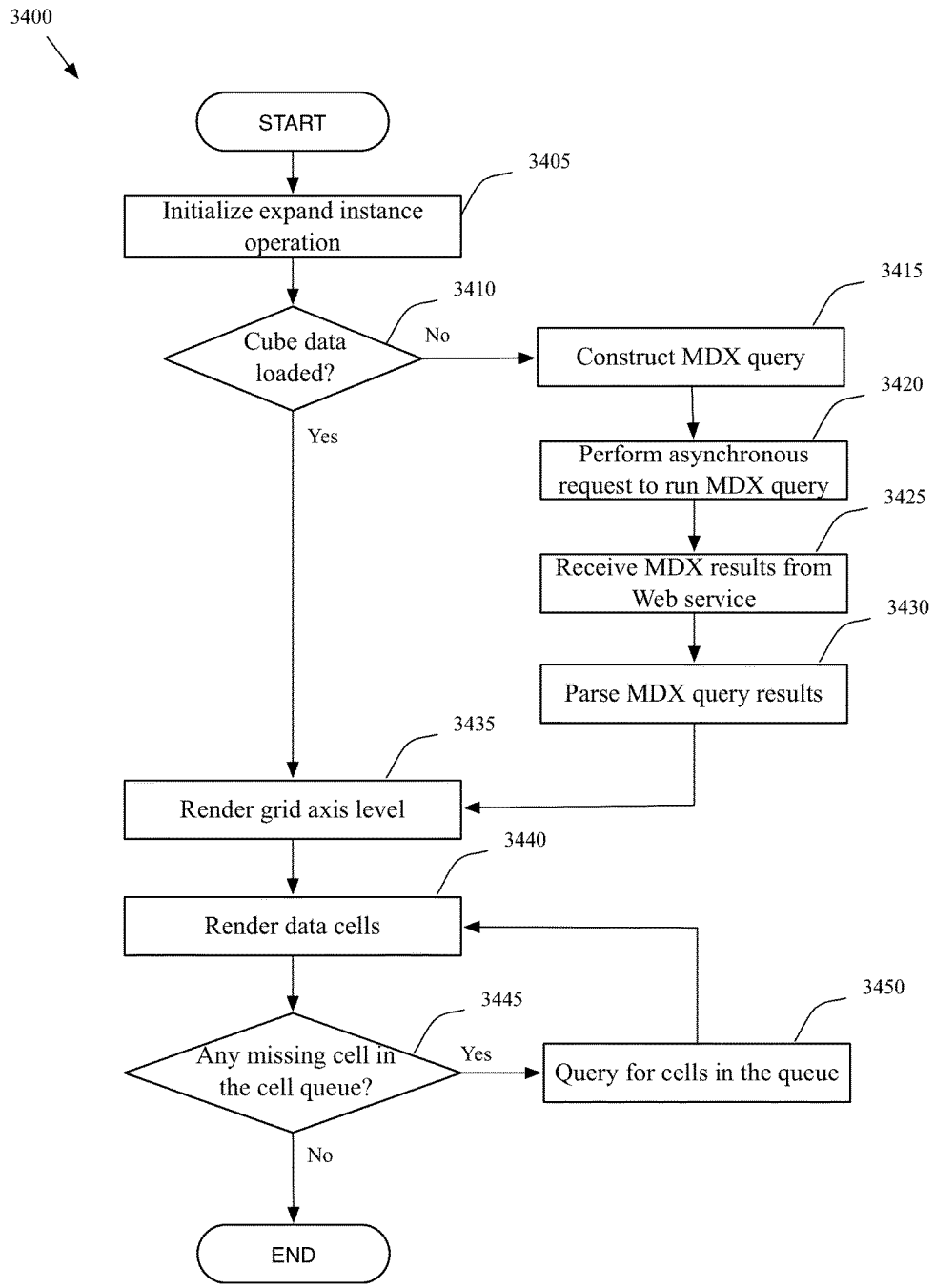
FIG. 34 conceptually illustrates a process for expanding an axis member on an interactive matrix of a cube-browsing client of some embodiments.

FIG. 34 conceptually illustrates a process 3400 for expanding axis member on an interactive matrix of some embodiments. In some embodiments, the process 3400 is an elaboration of operation 760 illustrated in FIG. 7. Process 3400 could be initiated by a human selecting an expand option (e.g., clicking on the expand icon on an axis item on the interactive matrix) or as a part of a separate process (e.g., such as loading a saved cube axes configuration where all expansions are performed upon load).

As shown in FIG. 34, the process 3400 begins by initializing (at 3405) the expand instance operation. In some embodiments, the process 3400 performs the initialization by identifying the axis that is being expanded, finding member name that is being expanded, changing a UI expand button to a collapse button, updating the cube axes configuration to set the attribute "expanded" as "true" for the expanding instance, and/or some other operations. The process 3400 then determines (at 3410) whether cube data is loaded. When the process 3400 determines (at 3410) that cube data is not loaded, the process constructs (at 3415) an appropriate MDX query for this expanded instance.

The process 3400 then performs (at 3420) asynchronous request to run the MDX query against a Web service. At 3425, the process 3400 receives a MDX query result set from the Web service. The process 3400 then parses (at 3430) the MDX query result set, as described above by reference to FIG. 32. After parsing the MDX query result set, the process 3400 proceeds to 3435, which will be described below.

When the process 3400 determines (at 3410) that cube data is loaded, the process renders (at 3435) the new grid axis level. In some embodiments, the process 3400 performs the rendering by analyzing the cube axes configuration to identify the hierarchy at next level of the expanding hierarchy, identify members to be drawn, determine new rows or columns to be drawn, shift existing cells, and perform some other operations.

The process 3400 then renders (at 3440) data cells based on cube data stored in the cube cache. The process 3400 determines (at 3445) whether there is any missing cell in the cell queue. Missing cells are the cells that do not have a corresponding cube data value stored in the cube cache. Once a cell is determined to be a missing cell, it will be put into the cell queue so that a query will be constructed to retrieve the cube data value for the cell. When the process 3400 determines (at 3445) that there is missing cell in the cell queue, the process queries (at 3450) for cells in the cell queue. The process 3400 then returns to 3440. When the process 3400 determines (at 3445) that there is no missing cell in the cell queue, the process terminates.

F. Axis Collapse

Figure 35:
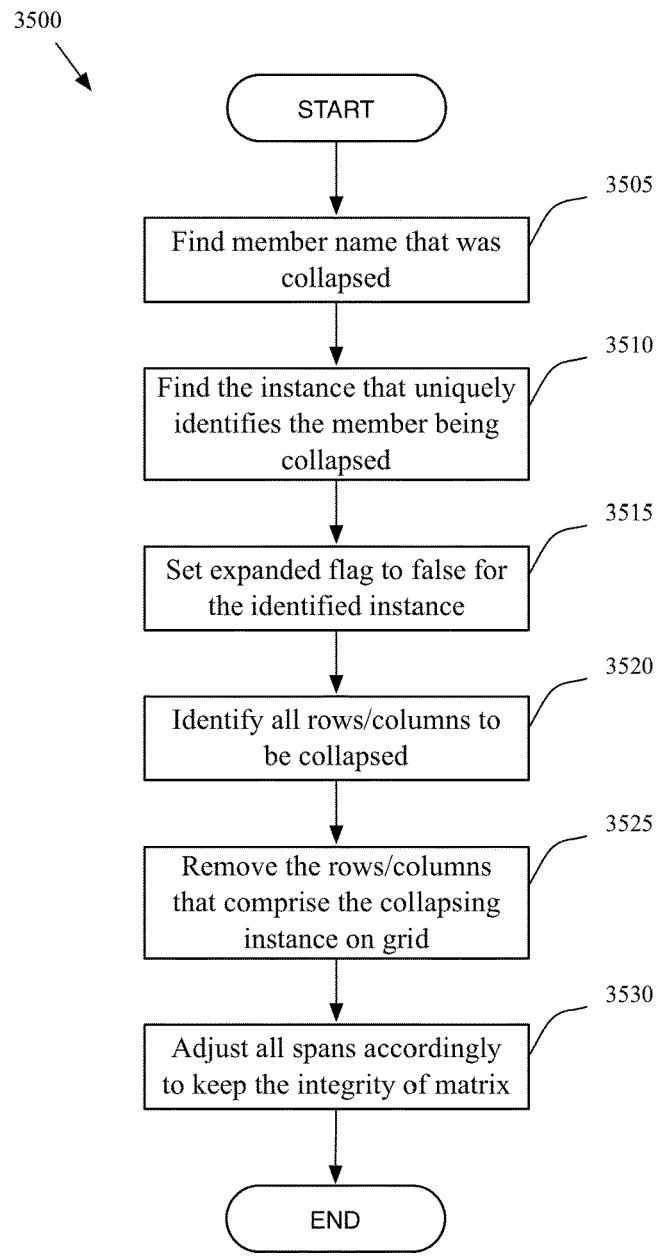
FIG. 35 conceptually illustrates a process for collapsing an axis member on an interactive matrix of a cube-browsing client of some embodiments.

FIG. 35 conceptually illustrates a process 3500 of some embodiments for collapsing an axis member on an interactive matrix. In some embodiments, the process 3500 is an elaboration of operation 750 shown in FIG. 7. Process 3500 could be initiated by a human clicking on the collapse icon on an axis item on the interactive matrix or as a part of a separate process, such as loading a saved cube axes configuration where all collapses are performed upon load.

As shown in FIG. 35, the process 3500 begins by finding (at 3505) member name that is being collapsed. The process 3500 then finds (at 3510) the correct instance in the cube axes configuration that uniquely identifies the instance of the member being collapsed. At 3515, the process 3500 sets expanded flag to "false" for the identified collapsing instance in the axes configuration.

The process 3500 then identifies (at 3520) all rows or columns to be collapsed. At 3525, the process 3500 removes the rows or columns that comprise the collapsing instance on the grid. The process 3500 then adjusts (at 3530) all remaining rows and columns accordingly to keep the integrity of the matrix. The process 3500 then terminates.

G. Intelligent Caching and Querying

Figure 36:
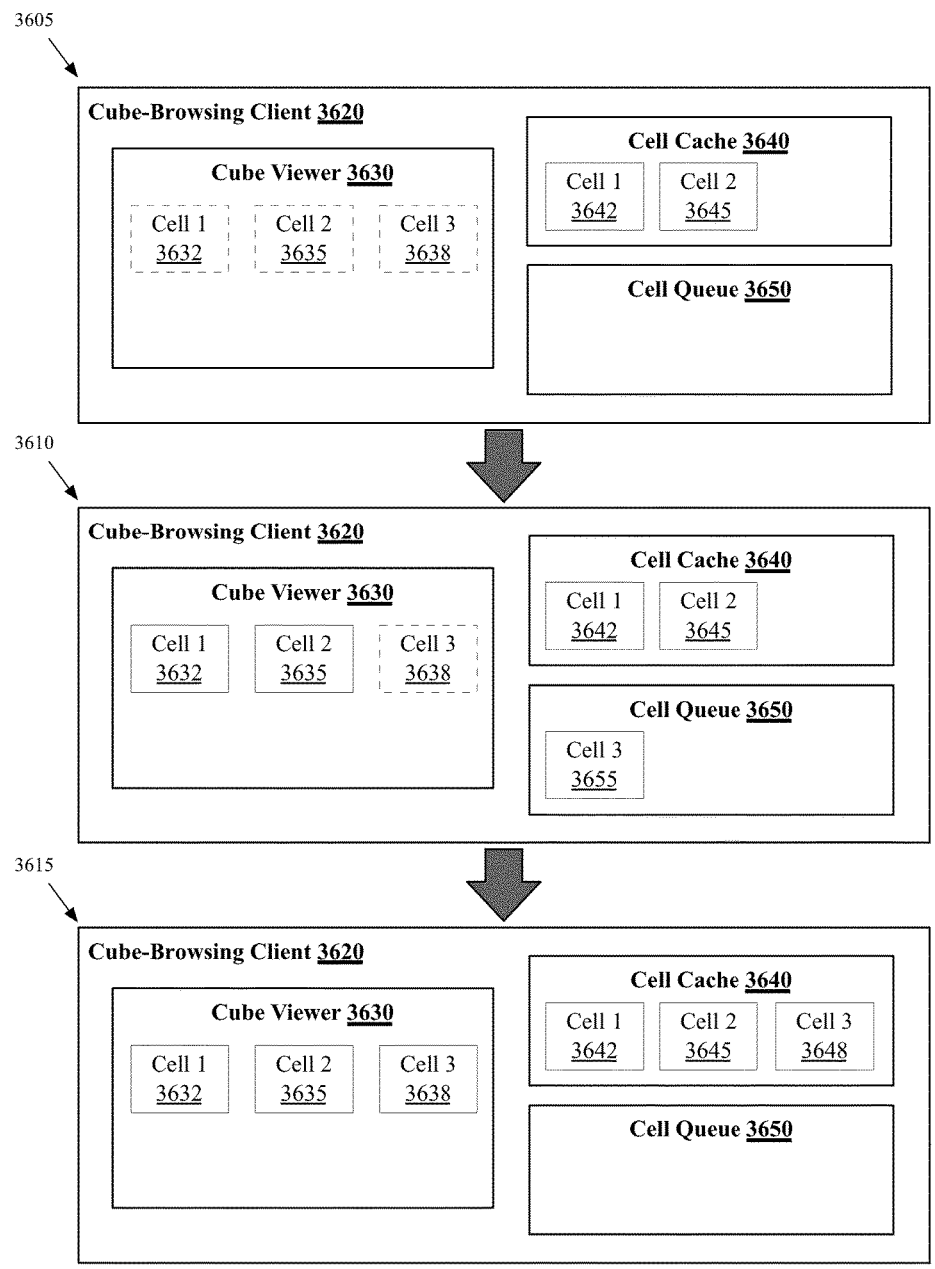
FIG. 36 illustrates a cube-browsing client with intelligent caching and querying features.

For some embodiments of the invention, FIG. 36 illustrates a cube-browsing client 3620 with intelligent caching and querying features. This figure illustrates the cube-browsing client 3620 at three different stages 3605, 3610, and 3615. In particular, these stages show how the cube-browsing client 3620 intelligently queries and caches cube data in order to reduce the number of data requests executed against the multidimensional database. Each of these stages will be described in detail below after an introduction of the cube-browsing client 3620. As shown in FIG. 36, the cube-browsing client 3620 includes a cube viewer 3630, a cell cache 3640, and a cell queue 3650.

In some embodiments, the cube viewer 3630 is an interactive matrix that displays the cube data that the end-user wants to view and interact with. In the example illustrated in FIG. 36, the cube viewer 3630 intends to display three cube data: cell 1 3632, cell 2 3635, and cell 3 3638. In this figure, when the cube data for a data cell is not yet displayed in the cube viewer 3630, the box representing the data cell is drawn with dotted lines. When the cube data for a data cell is displayed in the cube viewer 3630, the box representing the data cell is drawn with a solid line.

The cell cache 3640 is a data storage where local cube data is stored or a data structure that contains the cube data. At any point in time, the cell cache 3640 may have more or less cube data stored in it than the set of cube data necessary to completely render a cube view. In the example illustrated in FIG. 36, there are two cube data (cell 1 3642 and cell 2 3645) in the cell cache 3640 at the beginning stage 3605. In some embodiments, the cell queue 3650 is a first-in-first-out (FIFO) data structure for placing cube data that the cube-browsing client 3620 wants to query against the multidimensional database. There is no cube data in the cell queue 3650 at the beginning stage 3605.

Having described the components of the cube-browsing client 3620, the operations of intelligently querying and caching cube data will now be described by reference to the state of this cube-browsing client during the three stages 3605, 3610, and 3615 that are illustrated in FIG. 36. In the first stage 3605, the cube viewer 3630 requires several pieces of cube data to render a cube view. Specifically, the cube viewer 3630 requires data relating to cell 1 3632, cell 2 3635, and cell 3 3638. The data relating to these data cells are not yet displayed as they are drawn with dotted lines. The cell cache 3640 stores two cube data: cell 1 3642 and cell 2 3645. The cell queue 3650 is empty at this stage 3605.

The second stage 3610 shows the cube-browsing client 3620 after the cube viewer 3630 has searched the cell cache 3640 for the required cube data. Since cube data cell 1 and cell 2 are available in the cell cache 3640, they are displayed in the cube viewer 3630. Since cell 3 3638 is not found in the cell cache 3640, it is not displayed in the cube viewer 3620. In order to query for cell 3, the cube-browsing client 3620 puts cell 3 3655 into the cell queue 3650.

As shown in the third stage 3615, the cube-browsing client 3620 has processed the cell queue 3650, generated query for cell 3, and received a query result set. Accordingly, cell 3 3655 is removed from the cell queue 3650 and a new cube data cell 3 3648 is inserted into the cell cache 3640. The cube viewer 3630 also displays the cube data cell 3 3638 because it is now available in the cell cache 3640.

In the example described above, the cube viewer 3630 of some embodiments first accesses or analyzes the cell cache 3640 to find cube data relating to one or more entities. The cube viewer 3630 then queries for data that is not available in the cell cache 3640. The cell cache 3640 stores all the locally available cube data. As a result, the cube-browsing client 3620 minimizes data communication to the multidimensional database, therefore improves its performance. In some embodiments, the cube viewer 3630 presents the cube view as an interactive matrix. In some embodiments, the cube viewer 3630 presents the cube view as a bar chart, a pie chart, a simple list, a graph, a table, or some other visualization forms.

Figure 37:
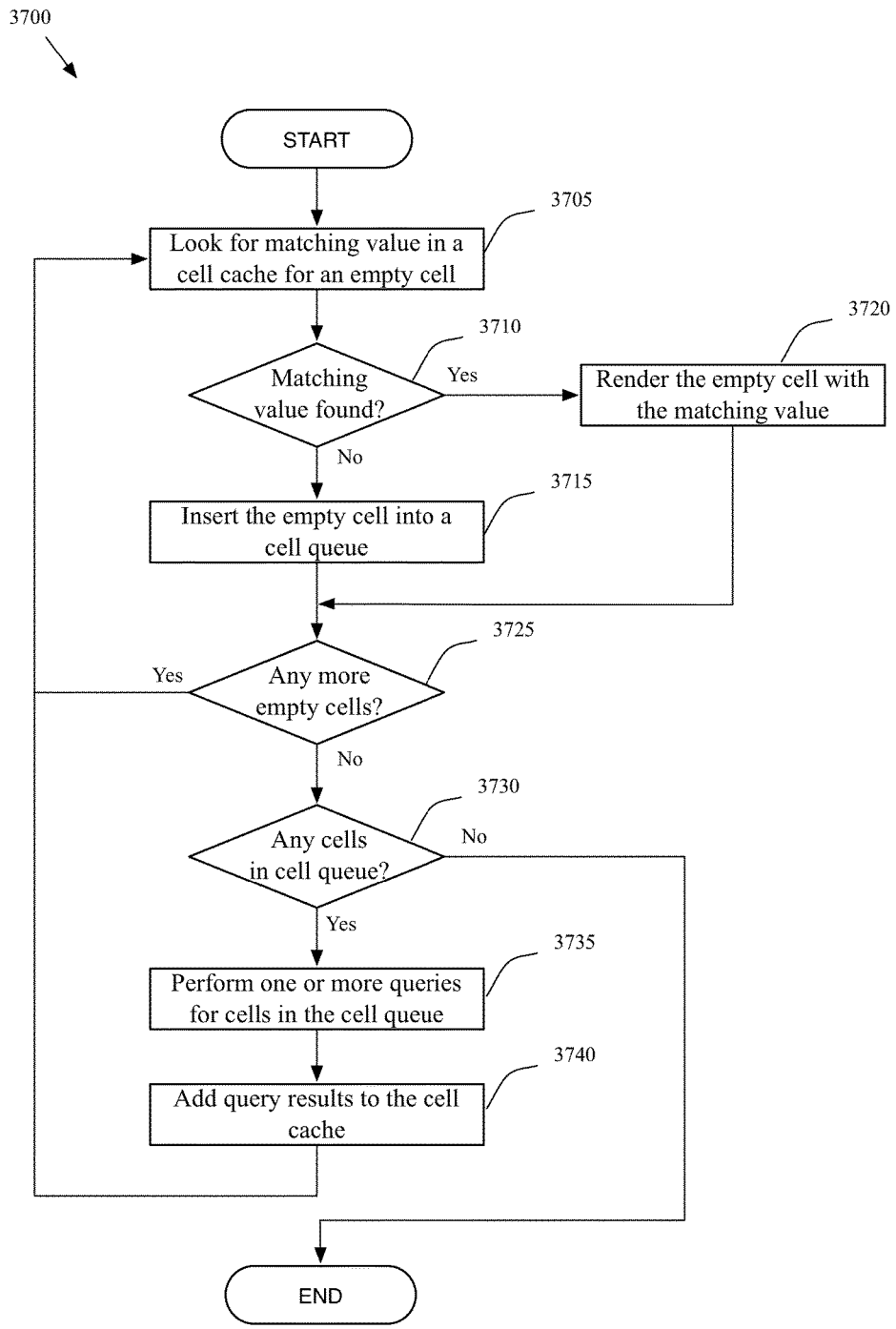
FIG. 37 conceptually illustrates a process for rendering cells of an interactive matrix and identifying missing cells.

FIG. 37 conceptually illustrates a process 3700 that some embodiments use to render cells of an interactive matrix and identify missing cells. This process is responsible for rendering actual data values for data cells on the displayed grid. In some embodiments, the process 3700 starts as a result of a change in configuration of the hierarchies on an axis via an expansion operation. It is significant to note that this is the only circumstance in some interactive matrix implementations of a cube-browsing client that the value of all cells cannot be determined from a single MDX query.

In the expansion process described above by reference to FIG. 34, there is an operation that alters parts of the grid that represent the axes and the members of one or more axis, and draws empty data cells on the grid that need to be evaluated for their actual values. In some embodiments, the process 3700 deals with these empty cells.

As shown in FIG. 37, the process 3700 begins by looking (at 3705) for matching value in a cell cache for an empty cell that is not yet being processed. The process 3700 then determines (at 3710) whether there is a matching value found in the cell cache. When a matching value is found in the cell cache, the process 3700 renders (at 3720) the empty cell with the matching value. When the process 3700 determines (at 3710) that a matching value is not found in the cell cache, the process inserts (at 3715) the empty cell into a cell queue and marks that cell as processed.

The process 3700 then determines (at 3725) whether there are more empty cells left unprocessed. When there are more unprocessed empty cells, the process 3700 returns to 3705. When the process 3700 determines (at 3725) that there is no additional empty cell left unprocessed, the process determines (at 3730) whether there are any cells in the cell queue.

When there are cells in the cell queue, the process 3700 performs (at 3735) one or more queries for cells in the cell queue. In some embodiments, the operation 3735 is elaborated in process 3800 described below by reference to FIG. 38. After receiving query results, the process 3700 adds (at 3740) query results into the cell cache. The process 3700 then returns to 3705. When the process 3700 determines (at 3730) that there are no cells in the cell queue, the process terminates.

Figure 38:
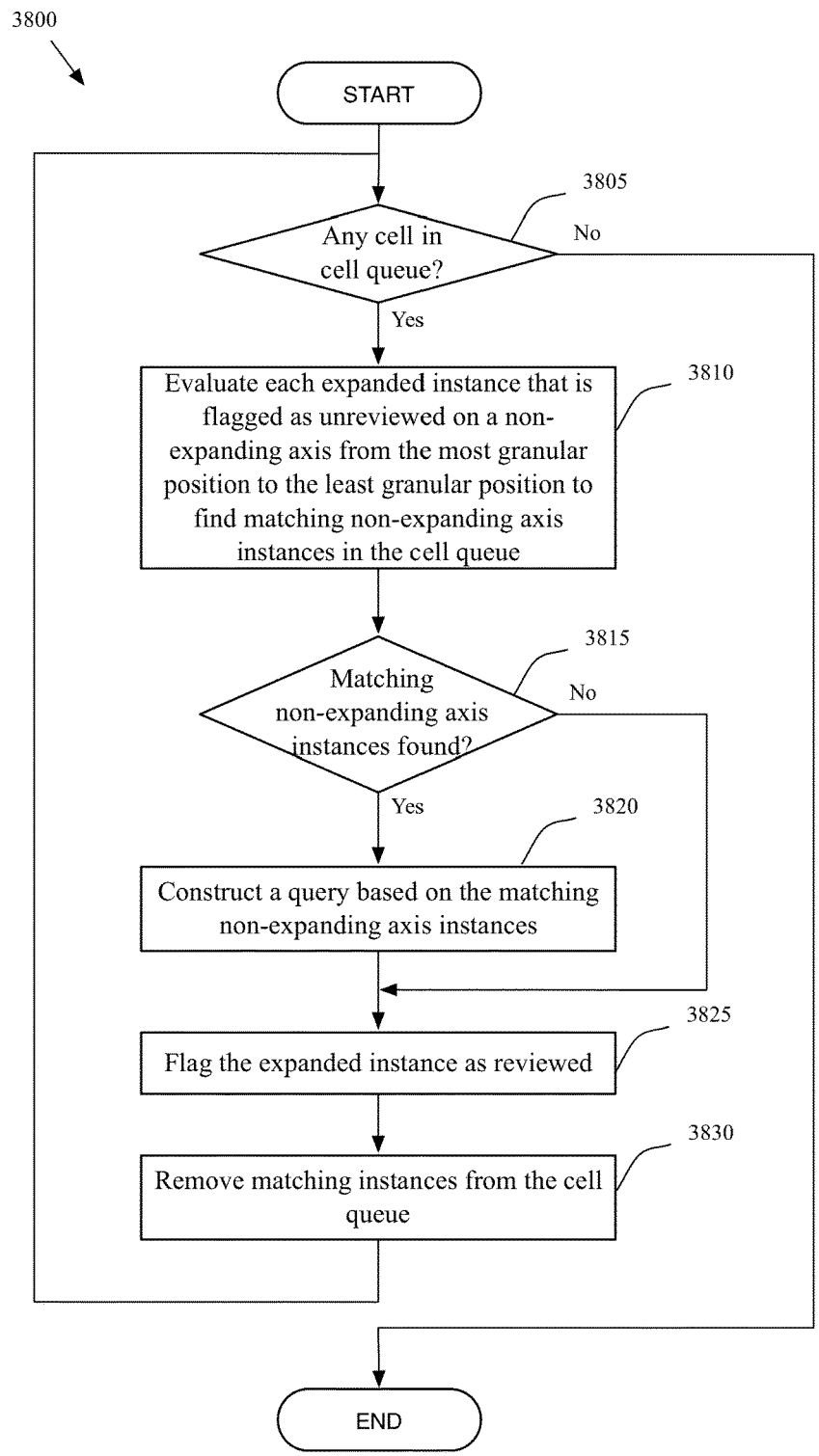
FIG. 38 conceptually illustrates a process for reviewing missing cells on an interactive matrix.

FIG. 38 conceptually illustrates a process 3800 for reviewing missing cells on an interactive matrix of some embodiments. In some embodiments, the purpose of this process is to work in coordination with process 3700 described above by reference to FIG. 37 and to perform the function of reviewing the cells in the cell queue. The process 3800 then logically groups those cells and constructs MDX queries that are appropriate based on those grouping of cells. This is an iterative process until no more cells are in the cell queue. In some embodiments, the process 3800 is an elaboration of operation 3735 illustrated in FIG. 37. This process will only be called as a result of an expand axis process described above by reference to FIG. 34. In some embodiments, process 3800 starts when the process 3700 tries to construct queries for cells in the cell queue.

As shown in FIG. 38, the process 3800 begins by determining (at 3805) whether there is any cell in the cell queue. When the process 3800 determines (at 3805) that there is cell in the cell queue, the process proceeds to 3810, which is described below. When the process 3800 determines (at 3805) that there is no cell in the cell queue, the process terminates.

The process 3800 evaluates (at 3810) the cube axes configuration for each expanded instance that is flagged as un-reviewed on a non-expanding axis from the most granular position to the least granular position to find matching non-expanding axis instances in the cell queue. The process 3800 then determines (at 3815) whether any cells in the cell queue matching the non-expanding axis instance are found.

When the process 3800 determines (at 3815) that matching non-expanding axis instances are found, the process constructs (at 3820) a query based on the matching non-expanding axis instances. When the process 3800 determines (at 3815) that matching non-expanding axis instances are not found, the process proceeds to 3825, which is described below.

The process 3800 flags (at 3825) the expanded instance as reviewed. The process 3800 then removes (at 3830) cells that match instances from the cell queue. After removing matching instances from the cell queue at 3830, the process 3800 returns to 3805 to check whether there are more cells in the cell queue. When the process 3800 determines (at 3805) that there is no additional cell in the cell queue, the process terminates.

In some embodiments, when the process 3800 finishes, the process 3700 described above in FIG. 37 will be performed. So, process 3700 initiates the process 3800 and is also called at the end of the process 3800. The loop only ends when process 3700 completes with no cells in the cell queue.

The specific operations of the processes described above may not be performed in the exact order shown and described. The specific operations may not be performed in one continuous series of operations, and different specific operations may be performed in different embodiments. Furthermore, the processes could be implemented using several sub-processes, or as part of a larger macro process.

Some of the processes described above illustrate themselves by using a cube-browsing client with an interactive matrix as an example. However, irrespective of the example described above, one of ordinary skill in the art will realize that some embodiments of the invention might use other methods to present a cube view. For instance, instead of presenting the cube view as an interactive matrix, the method of some embodiments may present the cube view as a simple list, a pie chart, a simple list, or some other forms.

VI. Alternative Embodiments

As mentioned above, the cube-browsing client of some embodiments is implemented as a stand-alone application or as a plug-in component. Several examples of such embodiments will now be described by reference to FIGS. 39 and 40. In some embodiments, the cube-browsing system is implemented as part of a larger system of interchanging data, scheduled tasks, etc. An example of such embodiments will be described by reference to FIG. 41. In addition, the cube-browsing client of some embodiments is implemented as a part of a multidimensional data storage (MDDS) system. An example system diagram of an MDDS system will be described by reference to FIG. 42.

A. Stand-Alone Cube-Browsing System

Figure 39:
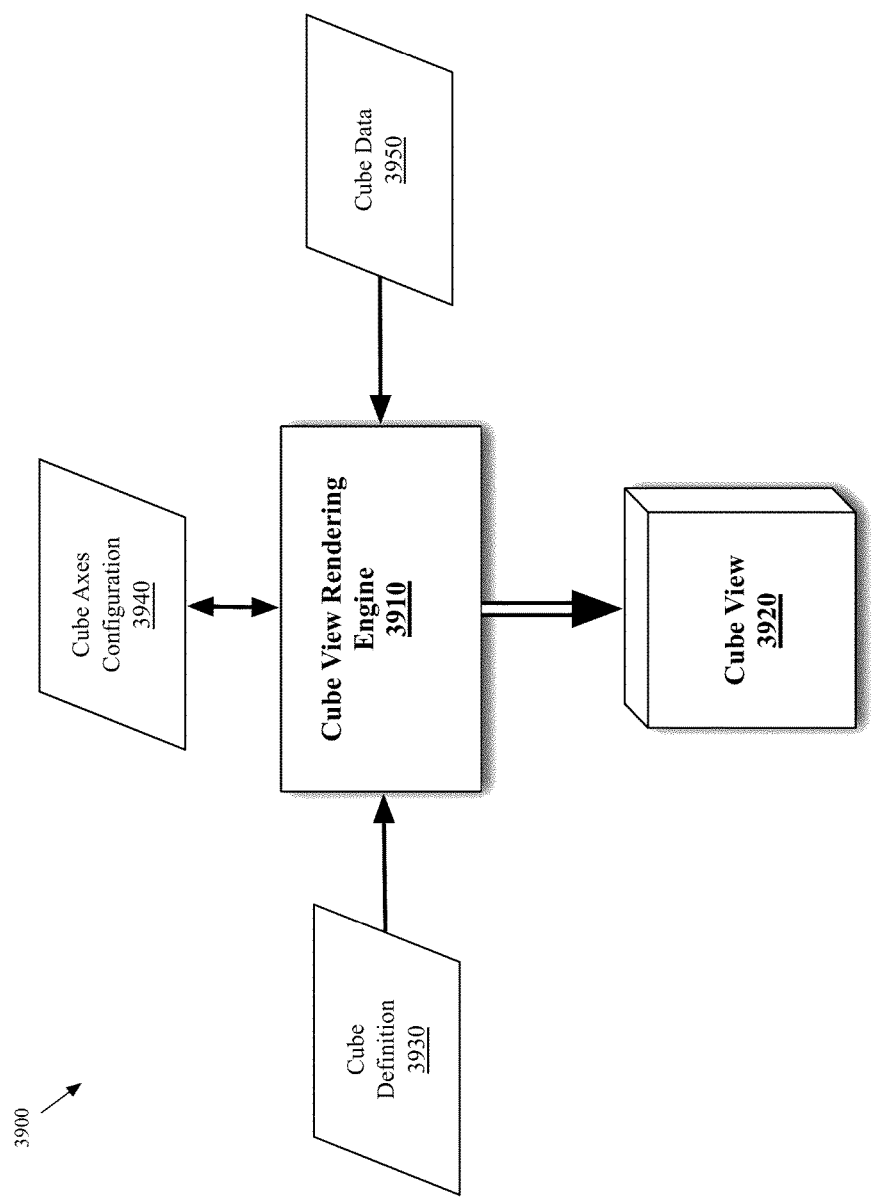
FIG. 39 conceptually illustrates an architecture for a stand-alone cube-browsing system.

FIG. 39 conceptually illustrates a software architecture for a stand-alone cube-browsing system 3900. Specifically, this figure illustrates a cube-browsing system that is not connected to any multidimensional databases. As shown, the cube-browsing system includes a cube view rendering engine (CVRE) 3910. The CVRE 3910 receives several distinct data structures as input and generates a cube view 3920. Specifically, the data structures include a cube definition 3930, a cube axes configuration 3940, and cube data 3950. Several examples of these data structures are described above by reference to FIGS. 14-23.

In some embodiments, the cube-browsing system 3900 is initialized with a pre-populated cube definition 3930, cube axes configuration 3940, and cube data 3950. The cube definition 3930 defines all the entities (measures, dimensions, hierarchies, etc.) available to define the cube axes configuration 3940. The cube axes configuration 3940 includes a subset of entities defined in the cube definition 3930 and the relationships between the subset of entities. The cube axes configuration 3940 could be blank or a very simple configuration as a starting point.

In some embodiments, all cube data 3950 belong to the multidimensional cube defined by the cube definition 3930. In the example illustrated in FIG. 39, the cube data cannot be updated because the cube-browsing system 3900 is not connected to a multidimensional database that stores the related cube data.

In some case, the cube data 3950 is populated with more cube data than is necessary for the initial cube axes configuration. Upon modification to the cube axes configuration 3940, the CVRE 3910 of some embodiments analyzes the cube data 3950 to determine whether the data it needs is contained in the cube data 3950. When the necessary cube data is not available, the CVRE 3910 of some embodiments uses a set of default values. When the cube data is available, the CVRE 3910 integrates the cube data into the cube view 3920.

Similar to many of the examples described above, the cube axes configuration 3940 can be dynamically modified based on user input. For example, the cube axes configuration of some embodiments is modified with the user selecting different entities from the cube definition 3930. The CVRE 3910 of some embodiments updates the cube view 3920 based on the cube axes configuration 3940 and available cube data 3950.

One advantage of the cube-browsing system 3900 is that it allows a user to continue to browse multidimensional data even when there is no connection (e.g., a network connection) to communicate with a multidimensional database. For example, with this stand-alone system, the user can continue to browse multidimensional data when the user is on an airplane, or even during a natural disaster that shuts down data communications.

B. Web Browser Plug-In

Figure 40:
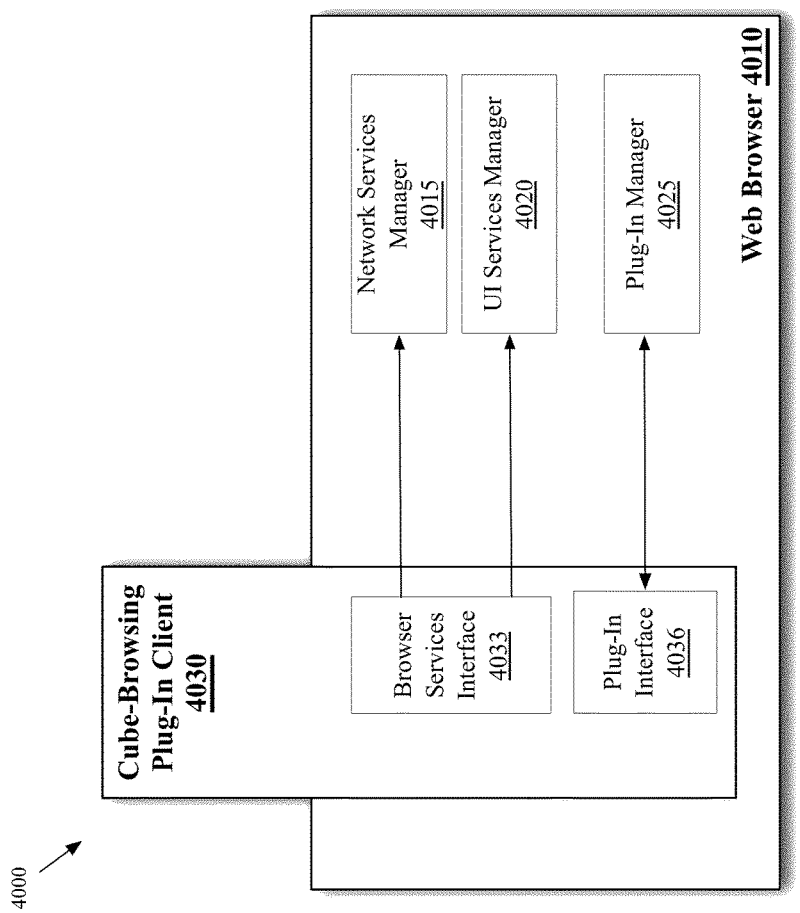
FIG. 40 conceptually illustrates a web browser plug-in implementation of a cube-browsing client.

FIG. 40 conceptually illustrates a web browser plug-in implementation of a cube-browsing client 4000. Specifically, this figure shows that a cube-browsing plug-in client 4030 adds cube-browsing features to a web browser 4010. As illustrated in FIG. 40, the web browser 4010 includes a network services manager 4015, a UI services manager 4020, and a plug-in manager 4025. The cube-browsing plug-in client 4030 includes a browser services interface 4033 and a plug-in interface 4036.

The network services manager 4015 provides the plug-ins with an application programming interfaces ("APIs") related to network communication, such as requesting data from web servers, retrieving data, etc. The UI service manager 4020 provides the plug-ins with a set of APIs related to user interface, such as drawing a UI, modifying a UI, and other operations on a UI. The plug-in manager 4025 provides a way for plug-ins to register themselves with the web browser 4010. The plug-in manager 4025 also allows the web browser 4010 to manage the plug-ins. For example, through the plug-in manger 4025, the web browser 4010 can add, remove, or update a plug-in.

The browser services interface 4033 allows the cube-browsing plug-in client 4030 to access services provided by the host browser. Those services may be provided through a set of APIs. In some embodiments, the browser services interface 4033 requests service from the host browser by calling those APIs. The plug-in interface 4036 registers the cube-browsing plug-in client 4030 with the host browser and receives instructions from the host browser.

In some embodiments, the cube-browsing plug-in client 4030 functions similar to a regular cube-browsing client. However, as a plug-in component, the cube-browsing plug-in client 4030 cannot function independently. In other words, the plug-in component relies on the services provided by the web browser 4010.

In the example illustrated in FIG. 40, the browser services interface 4033 invokes the APIs provided by the network services manager 4015 and the UI services manager 4020 in order to perform its networking and UI functionalities. The plug-in interface 4036 registers the cube-browsing plug-in client 4030 with the web browser 4010 through a request to the plug-in manger 4025. The plug-in interface 4036 also receives instructions from the plug-in manger 4025. As a result of adding the cube-browsing plug-in client 4030 into the web browser 4010, the web browser is able to browse multidimensional data.

C. Alternate Cube Data Processing System

Figure 41:
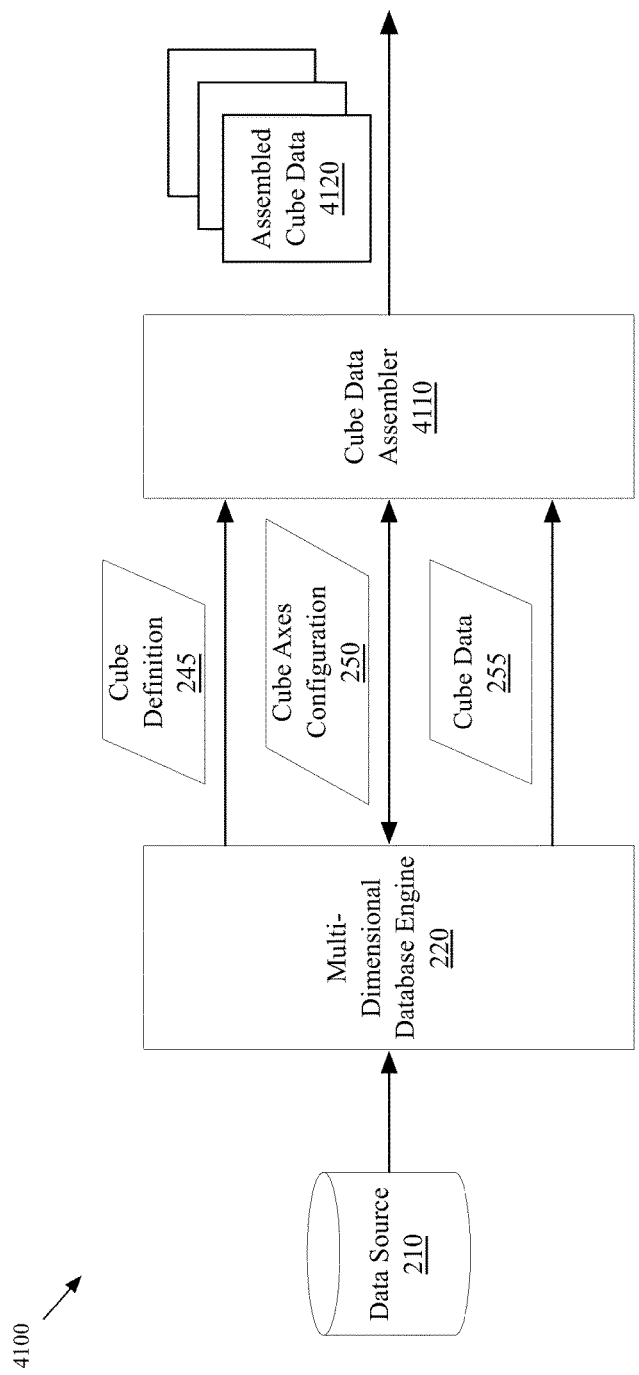
FIG. 41 illustrates an alternate cube data processing system according to some embodiments.

FIG. 41 illustrates an alternate cube data processing system 4100 according to some embodiments. In some embodiments, this alternate system 4100 is implemented as part of a larger system of interchanging data, scheduled tasks, etc. This figure is similar to FIG. 2 described above. However, in this example, a cube data assembler 4110 receives the cube definition 245, the cube axes configuration 250, and the cube data 255. In some embodiments, the cube data assembler 4110 outputs one or more assembled cube data 4120 based on one or more of the received data structures. For example, the assembler 4110 may receive one or more of these data structures and send the processed data to a data exchange system, a task scheduling system, etc.

D. Multidimensional Data Storage System

Some embodiments of the invention provide an MDDS system for managing different

MDDS cubes and provisioning these cubes for MDDS clients to access the data in these cubes. In some embodiments, an MDDS cube is a multidimensional data structure that facilitates quick viewing of data from a set of data sources. The system of some embodiments receives definitions of different MDDS cubes, and based on the definitions, performs an automated process that (1) analyzes the system's available resources (such as the data storages and data in the data storages), and (2) based on the identified system resources, identifies MDDS cubes that can be installed from several MDDS cubes that are candidates for installation. In some embodiments, the system installs MDDS cubes that the system has determined can be installed, and then processes the MDDS cube in order to populate and provision the cube to MDDS clients for consumption. The system in some embodiments installs an installable MDDS cube automatically upon determining that an MDDS cube can be installed or upon receiving input from a user to install the MDDS cube.

Figure 42:
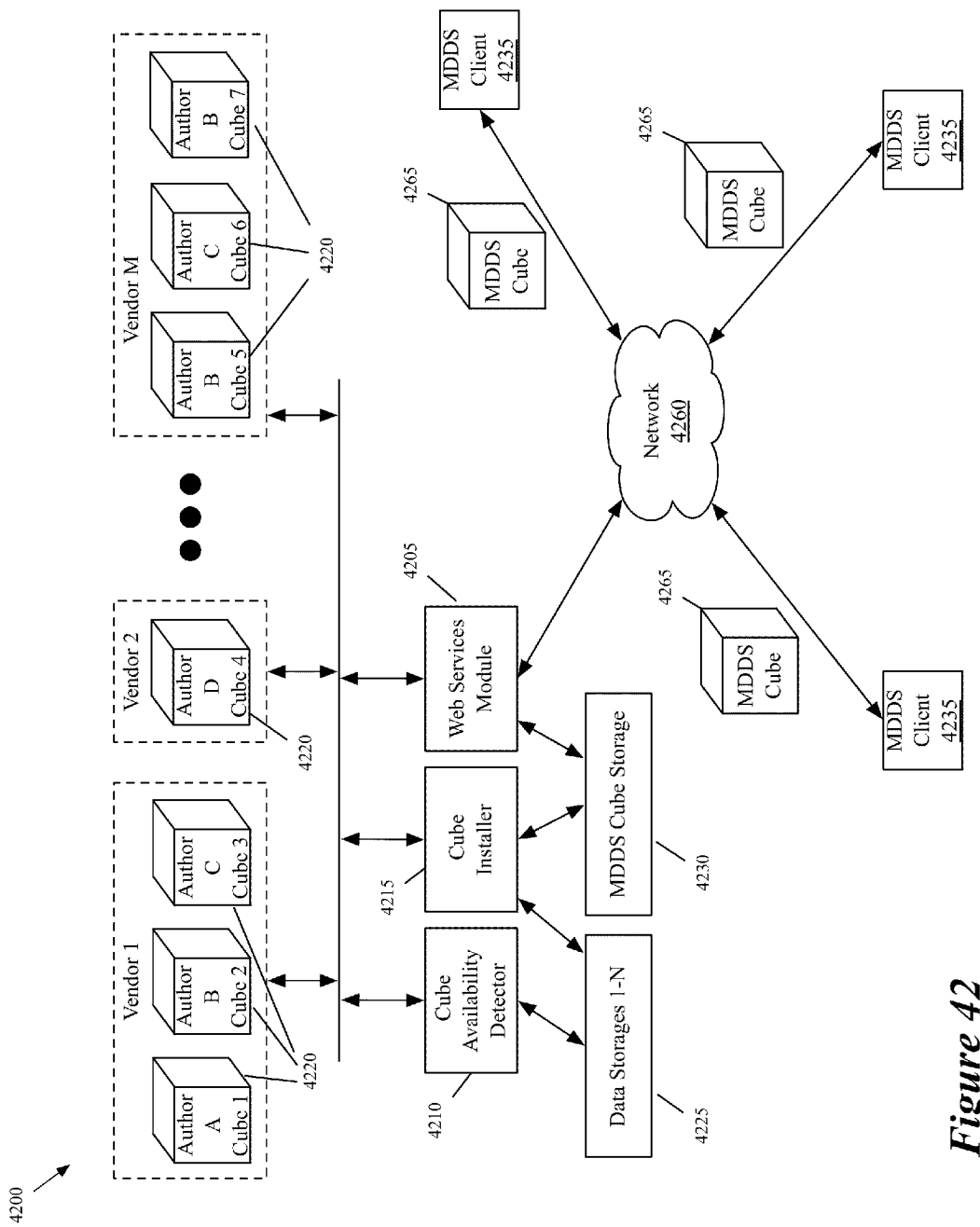
FIG. 42 conceptually illustrates a multidimensional data storage system of some embodiments.

FIG. 42 conceptually illustrates one such MDDS system 4200 of some embodiments. This system can manage and install different MDDS cubes defined by the same or different authors for different products offered by the same or different vendors. As shown, the MDDS system 4200 includes MDDS cube definitions 4220, a cube availability detector 4210, a cube installer 4215, N data storages 4225, MDDS cube storage 4230, and MDDS clients 4235. In addition, the MDDS system 4200 has a web services module 4205 that provides MDDS cube data to several MDDS clients 4235 through a network 4260. In some embodiments, the network 4260 may be a local area network (LAN), a wireless local area network (WLAN), a wide area network (WAN), the Internet, a network of networks, or any other type of network.

The N data storages 4225 store data that can be retrieved and viewed by a user through one or more MDDS cubes that are installed in the system. These N data storages 4225 are provided by M different storage vendors in some embodiments, where N and M are integer values that can differ. In some embodiments, a data storage 4225 is any type of data storage that stores data to which MDDS tools may be applied (e.g., for business intelligence purposes).

Each of the data storages 4225 may be implemented differently in different embodiments. In the example illustrated in FIG. 42, the data storages 4225 include different instances of one data storage of one product from one vendor, and include different instances of different data storages of different products from one vendor or different vendors. Examples of different storage products include Microsoft System Center Configuration Manager®, Microsoft System Center Operations Manager®, Microsoft Forefront Endpoint Protection®, Symantec Management Platform®, Symantec Endpoint Protection®, or any type of product that has data to which MDDS tools may be applied (e.g., for business intelligence purposes). In other embodiments, the system 4200 of FIG. 42 is just used with the same storage product and/or different storage products of just one vendor.

In the example illustrated in this figure, each of the products for each of the vendors 1-M generates and/or collects data, and then stores the products' data in one of the data storages 1-N. For instance, a product for vendor 1 generates and/or collects data and stores such data in data storage 1, another product for vendor 1 generates and/or collects data and stores such data in data storage 2, a product for vendor 2 generates and/or collects data and stores such data in data storage 3, a product for vendor 3 generates and/or collects data and stores such data in data storage 4, etc.

Each data storage 4225 may be implemented in any number of different ways. For instance, a data storage 4225 of some embodiments may be implemented as a database (e.g., a relational database, a hierarchical database, a flat file database, or any other type of database for storing data). Alternatively, a data storage 4225 may be implemented as a file (e.g., an XML file, a spreadsheet file, a comma-separated values (CSV) file, a text file, etc.), or as any other type of object that serves as a source of data. Each data storage 4225 in some embodiments is implemented by a single storage unit (e.g., a hard drive) or by several storage units (e.g., hard drives).

As mentioned above, each data storage stores data that can be viewed through one or more installed MDDS cubes. The system 4200 installs the MDDS cubes by using the MDDS cube definitions. Each MDDS cube definition 4220 describes a multidimensional data structure for a corresponding MDDS cube (not shown). For example, in some embodiments, an MDDS cube definition 4220 specifies data (e.g., measures) for an MDDS cube, data attributes (e.g., dimensions) for categorizing the data along a set of dimensions, and a set of data sources that contains the data and the data attributes.

In FIG. 42, an MDDS cube definition may specify data for an MDDS cube (not shown), and such data is contained in one of the data storages 1-N. For example, the MDDS cube 1 definition specifies an MDDS cube that contains data from data storage 1, the MDDS cube 2 definition specifies an MDDS cube that contains data from data storage 2, the MDDS cube 3 definition specifies an MDDS cube that contains data from data storage 3, etc. In addition, an MDDS definition of some embodiments further specifies the manner in which the data in the set of data sources is organized (e.g., database schema).

As mentioned above, the system 4200 can manage and install different MDDS cubes defined by the same or different authors for different products offered by the same or different vendors. In some embodiments, an author may be a company specializing in MDDS cube design, an MDDS cube designer, a database administrator, or any entity that develops MDDS cubes. For instance, an author may define different MDDS cubes for different vendors. As shown in FIG. 42, author C has defined an MDDS cube definition for the MDDS cube 3 for vendor 1 and an MDDS cube definition for the MDDS cube 6 for vendor 3 As another example, an author may define different MDDS cubes for different products from the same vendor. In FIG. 42, author B has defined MDDS cube definitions for the MDDS cube 5 and MDDS cube 7 for different products (not shown in FIG. 42) for the same vendor M. As illustrated, the system 4200 manages MDDS cubes that are defined by any author for any product from any vendor.

Before installing a cube, the cube availability detector 4210 of some embodiments analyzes MDDS cube definitions 4220 to determine which MDDS cubes are available and which MDDS cubes are not available. For a particular MDDS cube, the cube availability detector 4210 in some embodiments determines that the particular MDDS cube is available when this detector determines that it can access the data and data attributes that define the MDDS cube from the set of data storages 4225 to install and deploy the MDDS cube for consumption by MDDS clients. The detector in some embodiments determines that it can access such data and data attributes when it determines that the following three conditions are met: (1) a set of data storages 4225 (i.e., a set of data sources) specified in an MDDS cube definition 4220 for the MDDS cube exists, (2) data specified in the MDDS cube definition 4220 for the MDDS cube is stored in the set of data storages 4225, and (3) the data attributes for the data are stored in the set of data storages 4225. In some embodiments, the detector determines that the set of data storages 4225 specified in an MDDS cube definition 4220 for the MDDS cube exists when this detector can establish connections to, or can access data from, the set of data storages 4225.

Alternatively, the cube availability detector 4210 of some embodiments determines that a particular MDDS cube is not available when any of the three conditions mentioned above are not met. Also, in some embodiments, the cube availability detector 4210 determines that a particular MDDS cube is not available when this detector 4210 determines that the data for the MDDS cube is not organized in the set of data sources according to a schema specified for the MDDS cube. In addition, the cube availability detector 4210 of some embodiments determines that an MDDS cube is not available when the cube availability detector 4210 cannot access the data or the data attributes that define the MDDS cube.

The cube installer 4215 installs MDDS cubes that are determined to be available (e.g., by the cube availability detector 4210) and not yet installed. For a particular MDDS cube that is available, the cube installer 4215 of some embodiments installs an instance of the particular MDDS cube based on the corresponding MDDS cube definition for the particular MDDS cube. To install the particular MDDS cube, the cube installer 4215 creates a data structure according to the MDDS cube definition of the particular MDDS cube. The installing of the particular MDDS cube may also be referred to as creating an instance of the particular MDDS cube.

In some embodiments, the cube installer 4215 stores the instance of the particular MDDS cube in the MDDS cube storage 4230. In some such embodiments, the MDDS cube is stored in the MDDS cube storage 4230 in a multidimensional database while, in other such embodiments, the MDDS cube is stored in the MDDS cube storage 4230 in a relational database. In some embodiments, the MDDS cube is stored in the MDDS cube storage 4230 in a hybrid database that includes a multidimensional database and a relational database (e.g., some data may be stored in the multidimensional database and some data may be stored in the relational database).

After a particular MDDS cube is installed, the particular MDDS cube may be processed. The cube installer 4215 of some embodiments processes the particular MDDS cube by aggregating the data and data attributes specified by the MDDS cube definition from the set of data sources (e.g., by querying the data and the data attributes from the set of data sources) specified by the MDDS cube definition and populating the data structure of the particular MDDS cube with the aggregated data and data attributes. After the particular MDDS cube has been processed, the particular MDDS cube is ready for consumption by an MDDS client. For this example, the installed MDDS cubes are MDDS cubes that the cube installer 4215 has installed and processed. Thus, installed MDDS cubes may be consumed by MDDS clients.

In some embodiments, the cube installer 4215 installs an MDDS cube based on input from a user. In some instances, the MDDS system 4200 receives input (e.g., through a graphical user interface ("GUI"), a command line interface, or any other type of interface for receiving input) from a user to install and deploy an MDDS cube that the cube availability detector 4210 has determined as available.

The web services module 4205 of some embodiments is an MDDS viewing tool that allows MDDS clients to consume the installed MDDS cubes. For instance, in some embodiments, the web services module 4205 is an interface of the MDDS system 4200 through which MDDS clients consume MDDS cubes. The web services module 4205 provides a list of installed and consumable MDDS cubes to an MDDS client upon connection to the web services module 4205 in some embodiments. The web services module 4205 may receive requests to consume a particular installed MDDS cube. In response to the requests, the web services module 4205 may access the particular installed MDDS cube and transmit a portion of or all of the data and/or data attributes of the MDDS cube to the MDDS client.

Different embodiments of the web services module 4205 provide different techniques for the MDDS clients 4235 to consume MDDS cubes. For instance, the web services module 4205 of some embodiments allows the MDDS clients 4235 to consume MDDS cubes through a multidimensional expressions (MDX) query language while other embodiments of the web services module 4205 allow the MDDS clients 4235 to consume MDDS cubes through an object linking and embedding, database (OLE DB) for OLAP application programming interface (API). Still, in other embodiments, the web services module 4205 allows the MDDS clients 4235 to consume MDDS cubes through an extended markup language for analysis (XMLA). In some embodiments, the web services module 4205 provides a combination of the previously mentioned techniques and/or any other technique for consuming MDDS cubes.

In some embodiments, the web services module 4205 implements functions through a set of web services that are provided to the MDDS clients 4235 over the network 4260 (i.e., the set of web services are interfaces through which the MDDS clients 4235 consume MDDS cubes managed by the MDDS system 4200). For instance, the set of web services provided by the web services module 4205 may include (1) a service for receiving requests from the MDDS client 4235 to consume installed MDDS cubes (which are not shown in FIG. 42), (2) a service for providing a list of installed and consumable MDDS cubes to the MDDS clients 4235, (3) a service for transmitting MDDS cube definitions to the MDDS clients 4235, (4) a service for transmitting a portion of or all of the data and/or data attributes of MDDS cubes to the MDDS clients 4235 (as shown by MDDS cubes 4265), etc. In some embodiments, the web services module 4205 provides an MDX query language, an OLE DB API, XMLA, or a combination of these techniques and/or any other technique for the MDDS clients 4235 to consume MDDS cubes.

In some embodiments, an MDDS client 4235 is any application that is configured to consume MDDS cubes. An MDDS client 4235 of some embodiments consumes an MDDS cube by accessing the MDDS cube's data or retrieving data from the MDDS cube (e.g., by using an MDX query language, an OLE DB API, XMLA, etc.). Different embodiments of the MDDS clients 4235 may consume an MDDS cube differently. For example, an MDDS client 4235 of some embodiments consumes an MDDS cube by displaying a portion of or all of the MDDS cube's data and data attributes. In some embodiments, an MDDS client 4235 consumes an MDDS cube by processing the MDDS cube's data. Other embodiments of an MDDS client 4235 consume an MDDS cube by storing a portion of or all of the MDDS cube's data and data attributes. An MDDS client 4235 of other embodiments may consume an MDDS cube in other ways as well.

Different embodiments of the MDDS clients 4235 are implemented differently. In some instances, an MDDS client 4235 is implemented as a standalone application while, in other instances, an MDDS client 4235 is implemented as an application that is part of another application. In addition, an MDDS client 4235 of some embodiments is implemented as a thick client (e.g., a component that is included in the MDDS system 4200) while an MDDS client 4235 of other embodiments is implemented as a thin client (e.g., a third party web browser).

One example operation of the MDDS system 4200 that is based on an MDDS cube definition 4220 of an MDDS cube will now be described for some embodiments of the invention. The cube availability detector 4210 initially analyzes the MDDS cube definition 4220 to identify data for the MDDS cube, data attributes that categorizing the data along a set of dimensions, and a set of data sources that contains the data and the data attributes.

The cube availability detector 4210 determines that the MDDS cube is available when the set of data sources exists and the data and data attributes are stored in the set of data sources. In some embodiments, the cube availability detector 4210 determines that the set of data sources exists when the cube availability detector 4210 establishes a connection to each data source in the set of data sources and accesses data in the data sources. On the other hand, the cube availability detector 4210 determines that the MDDS cube is not available when the cube availability detector 4210 cannot establish a connection to one of the data sources in the set of data sources exists, or cannot access the data or the data attributes (e.g., some or all of the data and/or data attributes is not stored in the set of data sources).

When the cube availability detector 4210 determines that the MDDS cube is available, the cube installer 4215 installs the MDDS cube. To install the MDDS cube, the cube installer 4215 utilizes the MDDS cube definition to generate an instance of the MDDS cube. The cube installer 4215 of some embodiments stores the instance of the MDDS cube in the MDDS cube storage 4230. In some embodiments, the cube installer 4215 automatically installs the MDDS cube upon the cube availability detector 4210 determining that the MDDS cube is available while, in other embodiments, the cube installer 4215 installs the MDDS cube upon the MDDS system 4200 receiving input (e.g., through a graphical user interface ("GUI"), a command line interface, or any other type of interface for receiving input) from a user.

Once the MDDS cube is installed, the cube installer 4215 may process the instance of the MDDS cube to aggregate the data and data attributes that define the MDDS cube and populate the data structure of the MDDS cube with the aggregated data and the data attributes so that the cube may be consumed by one of the MDDS clients 4235.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 43:
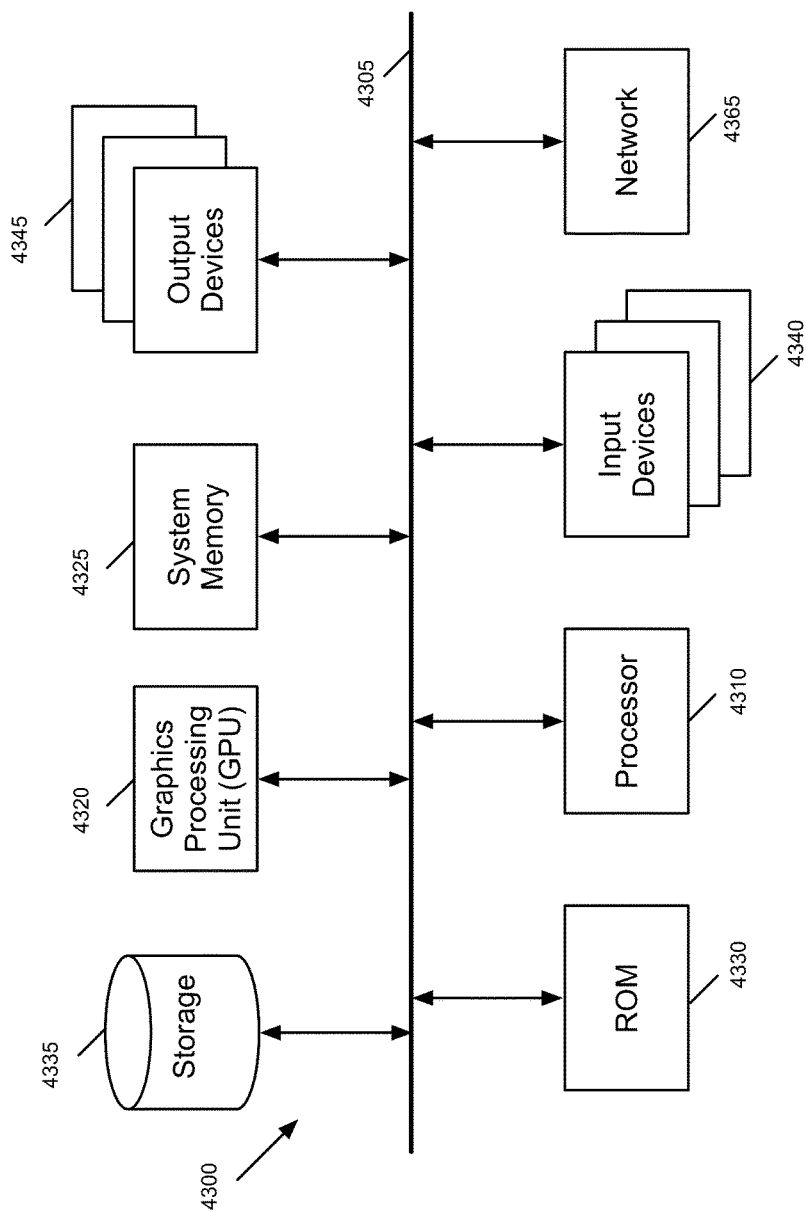
FIG. 43 conceptually illustrates an electronic system with which some embodiments of the invention are implemented.

FIG. 43 conceptually illustrates an electronic system 4300 with which some embodiments of the invention are implemented. The electronic system 4300 may be a computer (e.g., a desktop computer, personal computer, tablet computer, etc.), phone (e.g., smart phone), PDA, or any other sort of electronic device. Such an electronic system includes various types of computer readable media and interfaces for various other types of computer readable media. Electronic system 4300 includes a bus 4305, processing unit(s) 4310, a graphics processing unit (GPU) 4315, a system memory 4320, a network 4325, a read-only memory 4330, a permanent storage device 4335, input devices 4340, and output devices 4345.

The bus 4305 collectively represents all system, peripheral, and chipset buses that communicatively connect the numerous internal devices of the electronic system 4300. For instance, the bus 4305 communicatively connects the processing unit(s) 4310 with the read-only memory 4330, the GPU 4315, the system memory 4320, and the permanent storage device 4335.

From these various memory units, the processing unit(s) 4310 retrieves instructions to execute and data to process in order to execute the processes of the invention. The processing unit(s) may be a single processor or a multi-core processor in different embodiments. Some instructions are passed to and executed by the GPU 4315. The GPU 4315 can offload various computations or complement the image processing provided by the processing unit(s) 4310.

The read-only-memory (ROM) 4330 stores static data and instructions that are needed by the processing unit(s) 4310 and other modules of the electronic system. The permanent storage device 4335, on the other hand, is a read-and-write memory device. This device is a non-volatile memory unit that stores instructions and data even when the electronic system 4300 is off. Some embodiments of the invention use a mass-storage device (such as a magnetic or optical disk and its corresponding disk drive) as the permanent storage device 4335.

Other embodiments use a removable storage device (such as a floppy disk, flash drive, or ZIP® disk, and its corresponding disk drive) as the permanent storage device. Like the permanent storage device 4335, the system memory 4320 is a read-and-write memory device. However, unlike storage device 4335, the system memory 4320 is a volatile read-and-write memory, such a random access memory. The system memory 4320 stores some of the instructions and data that the processor needs at runtime. In some embodiments, the invention's processes are stored in the system memory 4320, the permanent storage device 4335, and/or the read-only memory 4330. For example, the various memory units include instructions for processing multimedia clips in accordance with some embodiments. From these various memory units, the processing unit(s) 4310 retrieves instructions to execute and data to process in order to execute the processes of some embodiments.

The bus 4305 also connects to the input and output devices 4340 and 4345. The input devices 4340 enable the user to communicate information and select commands to the electronic system. The input devices 4340 include alpha-numeric keyboards and pointing devices (also called "cursor control devices"). The output devices 4345 display images generated by the electronic system. The output devices 4345 include printers and display devices, such as cathode ray tubes (CRT) or liquid crystal displays (LCD). Some embodiments include devices such as a touchscreen that function as both input and output devices.

Finally, as shown in FIG. 43, bus 4305 also couples electronic system 4300 to a network 4325 through a network adapter (not shown). In this manner, the computer can be a part of a network of computers (such as a local area network ("LAN"), a wide area network ("WAN"), or an Intranet, or a network of networks, such as the Internet. Any or all components of electronic system 4300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

While the invention has been described with reference to numerous specific details, one of ordinary skill in the art will recognize that the invention can be embodied in other specific forms without departing from the spirit of the invention. In addition, a number of the figures (including FIGS. 6, 7, 28, 29, 30, 32, 33, 34, 35, 37, and 38) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of viewing a cube stored in a multi-dimensional data storage (MDDS), the method comprising:
   using an axes configuration manager to automatically generate presentation data for a cube that defines a set of dimension entities for an interactive matrix and storing the presentation data in a presentation file, each dimension entity having at least one member that is associated with (i) a first instance in the presentation data that indicates whether the member is expanded in the displayed matrix, and (ii) a second instance that indicates whether presentation data associated with the expanded member is generated and stored in the presentation file;
   retrieving cube data and presentation data for a member of a dimension entity, for which the second instance indicates that presentation data is not generated, from the MDDS, when the member is expanded for a first time;
   separately storing the cube data comprising cell values of the interactive matrix in a cube cache file and the presentation data in the presentation file; and
   rendering the interactive matrix on a display area using the separate cube cache file and presentation file in order to display the expanded member.

2. The method of claim 1 further comprising:
   receiving a request to modify the matrix;
   updating the presentation data based on the modification;
   determining whether the update added another dimension entity to the presentation data; and
   when no dimension entity has been added, using at least a portion of the previously stored presentation and cube data to modify the matrix; and
   when another dimension entity has been added, (i) retrieving additional cube and presentation data for that additional entity from the MDDS, (ii) storing the additional cube and presentation data in the cube cache and presentation files, respectively, and (iii) modifying the matrix using the additional cube and presentation data.

3. The method of claim 2 further comprising formulating a custom query in order to retrieve the additional cube and presentation data from the MDDS.

4. The method of claim 3, wherein modifying the matrix using the additional cube and presentation data comprises combining at least a portion of the previously stored cube and presentation data with the additional cube and presentation data.

5. The method of claim 1, wherein the first instance associated with a member of a dimension entity indicates that the member is not expanded on the interactive matrix when the member is collapsed on the interactive matrix.

6. The method of claim 1, wherein retrieving the cube data and presentation data for the member comprises dynamically formulating a customized query to the MDDS to receive the cube and presentation data.

7. The method of claim 6, wherein retrieving cube data and presentation data for the member further comprises modifying the second instance to indicate that the presentation data is now generated for the member.

8. The method of claim 1, wherein retrieving cube data and presentation data for the member comprises:
receiving an input to expand the member before retrieving the cube and presentation data;
modifying the first instance to indicate that the member is now expanded; and
modifying the second instance to indicate that the presentation data is now generated for the member.

9. The method of claim 8 further comprising:
receiving an input to collapse the member; and
modifying only the first instance to indicate that the member is not expanded, without modifying the second instance.

10. The non-transitory machine readable medium of claim 8, wherein the program further comprises sets of instructions for:
receiving an input to collapse the member; and
modifying only the first instance to indicate that the member is not expanded, without modifying the second instance.

11. The method of claim 1, wherein each dimension entity comprises one of a row of the interactive matrix and a column of the interactive matrix.

12. The method of claim 1, wherein each dimension entity member comprises a first level of a hierarchy, wherein when the member is expanded, a set of members of a second level of the hierarchy are displayed on the interactive matrix.

13. The method of claim 1, wherein generating the presentation data for the cube comprises:
receiving a selected set of cube definitions from a plurality of cube definitions that are stored in the MDDS; and
generating the presentation data based on the received selected set of cube definitions.

14. A non-transitory machine readable medium storing a program for viewing a cube stored in a multi-dimensional data storage (MDDS), the program for execution by at least one processing unit of an electronic device, the program comprising sets of instructions for:
using an axes configuration manager to generate in an automated manner presentation data for a cube that defines a set of dimension entities for an interactive matrix and storing the presentation data in a presentation file, each dimension entity having at least one member that is associated with (i) a first instance in the presentation data that indicates whether the member is expanded in the displayed matrix, and (ii) a second instance that indicates whether presentation data associated with the expanded member is generated and stored in the presentation file;
retrieving cube data and presentation data for a member of a dimension entity, for which the second instance indicates that presentation data is not generated, from the MDDS, when the member is expanded for a first time;
separately storing the cube data comprising cell values of the interactive matrix in a cube cache file and the presentation data in the presentation file; and
rendering the interactive matrix on a display area using the separate cube cache file and presentation file in order to display the expanded member.

15. The non-transitory machine readable medium of claim 14, wherein the program further comprises sets of instructions for:
receiving a request to modify the matrix;
examining the stored presentation data to identify a part of the presentation data that is needed to update the cube view; and
using the identified part of the presentation data to formulate a customized query to the MDDS to receive additional cube and presentation data.

16. The non-transitory machine readable medium of claim 15, wherein the program further comprises a set of instructions for updating the matrix based on the additional cube and presentation data received from the MDDS in response to the customized query.

17. The non-transitory machine readable medium of claim 16, wherein the set of instructions for updating comprises a set of instructions for combining at least a portion of the previously stored cube and presentation data with the additional cube and presentation data to generate the matrix.

18. The non-transitory machine readable medium of claim 15, wherein the program further comprises a set of instructions for storing the additional cube and presentation data received from the MDDS in response to the customized query in the cube cache file and the presentation file respectively.

19. The non-transitory machine readable medium of claim 14, wherein the MDDS comprises a remote data storage of a remote server while the presentation file and the cube cache file comprise local data storages of the electronic device.

20. The non-transitory machine readable medium of claim 14, wherein the set of instructions for retrieving cube data and presentation data for the member comprises sets of instructions for:
receiving an input to expand the member before retrieving the cube and presentation data;
modifying the first instance to indicate that the member is now expanded; and
modifying the second instance to indicate that the presentation data is now generated for the member.

21. The non-transitory machine readable medium of claim 14, wherein each dimension entity comprises one of a row of the interactive matrix and a column of the interactive matrix.

22. The non-transitory machine readable medium of claim 14, wherein each dimension entity member comprises a first level of a hierarchy, wherein when the member is expanded, members of a second level of the hierarchy are displayed on the interactive matrix.

23. The non-transitory machine readable medium of claim 14, wherein the set of instructions for generating the presentation data for the cube comprises sets of instructions for:
receiving a selected set of cube definitions from a plurality of cube definitions that are stored in the MDDS; and
generating the presentation data based on the received selected set of cube definitions.

24. The non-transitory machine readable medium of claim 23, wherein the set of instructions for receiving the selected set of cube definitions comprises a set of instructions for receiving the selected set from a plurality of cube definitions that are stored in the MDDS.

25. The non-transitory machine readable medium of claim 14, wherein the set of instructions for retrieving the cube data and presentation data for the member comprises sets of instructions for:
- dynamically formulating a customized query to the MDDS for receiving cube data and presentation data for a set of members of a second level of a hierarchy, wherein the member for which the presentation and cube data are to be retrieved is a first level of the hierarchy; and
- retrieving the cube data and presentation data from the MDDS based on the customized query.

26. A non-transitory machine readable medium storing a program comprising a user interface (UI), the program for execution by at least one processing unit, the UI comprising:
- an axes configuration manager for automatically generating a cube axes configuration file comprising presentation data that defines a set of dimension entities for an interactive matrix and storing the presentation data in a presentation file, each dimension entity having at least one member that is associated with (i) a first instance in the presentation data that indicates whether the member is expanded in the displayed matrix, and (ii) a second instance that indicates whether presentation data associated with the expanded member is generated and stored in the cube axes configuration file;
- a data retriever for retrieving cube data and presentation data for a member of a dimension entity, for which the second instance indicates that presentation data is not generated, from the MDDS, when the member is expanded for a first time, wherein the cube data comprises cell values of the interactive matrix and is stored separately from the cube axes configuration file in a cube cache file; and
- a cube view engine for rendering the interactive matrix on a display area using the separate cube cache file and cube axes configuration file in order to display the expanded member.

27. The non-transitory machine readable medium of claim 26, wherein the cube axes configuration manager initially populates the cube axes configuration file based on a set of cube definitions that is displayed in a cube definition display area.

28. The non-transitory machine readable medium of claim 27, wherein the cube axes configuration manager initially populates the cube axes configuration file by identifying a selected subset of the displayed set of cube definitions and generating a plurality of entities with which the axes configuration file is populated.

29. The non-transitory machine readable medium of claim 28, wherein the plurality of entities includes a set of dimension attributes, and a set of measures associated with the set of dimension attributes.

* * * * *